(12) United States Patent
Jebara

(10) Patent No.: US 8,825,566 B2
(45) Date of Patent: Sep. 2, 2014

(54) SYSTEMS, DEVICES, AND METHODS FOR POSTERIORI ESTIMATION USING NAND MARKOV RANDOM FIELD (NMRF)

(75) Inventor: Tony Jebara, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 400 days.

(21) Appl. No.: 13/298,424

(22) Filed: Nov. 17, 2011

(65) Prior Publication Data

US 2012/0066172 A1 Mar. 15, 2012

Related U.S. Application Data

(63) Continuation-in-part of application No. PCT/US2010/035665, filed on May 20, 2010.

(60) Provisional application No. 61/180,063, filed on May 20, 2009, provisional application No. 61/181,997, filed on May 28, 2009.

(51) Int. Cl.
*G06F 15/18* (2006.01)
*G06K 9/62* (2006.01)

(52) U.S. Cl.
CPC ................................. *G06K 9/6297* (2013.01)
USPC .......................................................... 706/12

(58) Field of Classification Search
USPC ................................................ 706/12, 45, 62
See application file for complete search history.

(56) References Cited

U.S. PATENT DOCUMENTS

| | | | |
|---|---|---|---|
| 6,091,424 A | 7/2000 | Madden et al. | |
| 6,714,975 B1 | 3/2004 | Aggarwal et al. | |
| 6,952,682 B1 | 10/2005 | Wellman | |
| 7,489,638 B2 | 2/2009 | Keslassy et al. | |
| 7,733,895 B2 | 6/2010 | Kesselman et al. | |
| 7,778,247 B2 | 8/2010 | Green | |
| 7,788,260 B2 | 8/2010 | Lunt et al. | |
| 7,933,915 B2 | 4/2011 | Singh et al. | |
| 8,000,262 B2 | 8/2011 | Leighton et al. | |

(Continued)

FOREIGN PATENT DOCUMENTS

| | | |
|---|---|---|
| JP | 2006-039955 A | 2/2006 |
| KR | 2007-0058046 A | 6/2007 |

OTHER PUBLICATIONS

Tommi S. Jaakkola et al., "MAP Estimation Via Agreement on Trees: Message-Passing and Linear Programming" IEEE Transactions on Information Theory, vol. 51, No. 11, Nov. 2005, XP011141509, pp. 3697-3717.

(Continued)

*Primary Examiner* — David Vincent
(74) *Attorney, Agent, or Firm* — Miles & Stockbridge P.C.; Mark A. Catan

(57) ABSTRACT

A system, method and computer-readable medium for maximum a posteriori (MAP) estimation of a graphical model are disclosed. The MAP estimation process can include obtaining an encoded data message sent over a 4G cellular wireless network and generating a graphical model representation of the message. The graphical model can be converted into a nand Markov random field (NMRF). The MAP estimation process can also include determining whether the NMRF has a perfect graph structure, and solving for a MAP estimate configuration of the NMRF. The MAP estimation process can further include outputting the MAP estimate configuration, an indication of the MAP estimate configuration, and/or a result based on a combination of the MAP estimate configuration and the encoded data message (e.g., a decoded message).

8 Claims, 33 Drawing Sheets

(56) References Cited

U.S. PATENT DOCUMENTS

| | | | |
|---|---|---|---|
| 8,078,255 B2 | 12/2011 | Bhandarkar et al. |
| 8,150,634 B1 | 4/2012 | Constantine et al. |
| 8,195,693 B2 | 6/2012 | Syeda-Mahmood |
| 8,250,600 B2 | 8/2012 | Kodialam et al. |
| 2001/0056395 A1 | 12/2001 | Khan et al. |
| 2002/0099519 A1 | 7/2002 | Srivastava |
| 2003/0140143 A1 | 7/2003 | Wolf et al. |
| 2003/0185229 A1 | 10/2003 | Shachar et al. |
| 2004/0267686 A1 | 12/2004 | Chayes et al. |
| 2005/0048456 A1 | 3/2005 | Chefd'hotel et al. |
| 2005/0226214 A1 | 10/2005 | Keslassy et al. |
| 2005/0243736 A1 | 11/2005 | Faloutsos et al. |
| 2005/0265618 A1 | 12/2005 | Jebara |
| 2006/0115267 A1 | 6/2006 | Kesselman et al. |
| 2006/0253418 A1 | 11/2006 | Charnock et al. |
| 2006/0271438 A1 | 11/2006 | Shotland et al. |
| 2007/0014247 A1 | 1/2007 | Ou et al. |
| 2007/0031003 A1 | 2/2007 | Cremers |
| 2007/0050282 A1 | 3/2007 | Chen et al. |
| 2007/0118432 A1 | 5/2007 | Vazirani et al. |
| 2007/0156617 A1 | 7/2007 | Szummer et al. |
| 2007/0185871 A1 | 8/2007 | Canright et al. |
| 2007/0239694 A1 | 10/2007 | Singh et al. |
| 2008/0027969 A1 | 1/2008 | Wen et al. |
| 2008/0052152 A1 | 2/2008 | Yufik |
| 2008/0071764 A1 | 3/2008 | Omi et al. |
| 2008/0215607 A1 | 9/2008 | Kaushansky et al. |
| 2008/0243735 A1 | 10/2008 | Rish et al. |
| 2008/0256034 A1 | 10/2008 | Chang et al. |
| 2008/0260230 A1 | 10/2008 | Gotardo et al. |
| 2008/0275861 A1 | 11/2008 | Baluja et al. |
| 2008/0275899 A1 | 11/2008 | Baluja et al. |
| 2008/0307097 A1 | 12/2008 | Sabatelli et al. |
| 2009/0022403 A1 | 1/2009 | Takamori et al. |
| 2009/0110089 A1 | 4/2009 | Green |
| 2009/0262664 A1 | 10/2009 | Leighton et al. |
| 2010/0251290 A1 | 9/2010 | Kodialam et al. |
| 2010/0257054 A1 | 10/2010 | Martin et al. |
| 2011/0040619 A1 | 2/2011 | Jebara et al. |

OTHER PUBLICATIONS

Kyomin Jung et al., "Approximate message-passing inference algorithm", Information Theory Workshop, 2007, IEEE, Sep. 2-6, 2007, XP031136599, pp. 224-229.

Sujay Sanghavi et al., "Networking Sensors Using Belief Propagation", Communication, Control, and Computing, 2008 Forty-Sixth Annual Allerton Conference, IEEE, Sep. 23-26, 2008, XP031435179, pp. 384-391.

David A. Smith et al., "Dependency Parsing by Belief Propagation", Proceedings of the 2008 Conference on Empirical Methods in Natural Language Processing, Oct. 2008, XP055098477, pp. 145-156.

Extended European Search Report for corresponding EP Patent Application No. 10778422 dated Feb. 5, 2014.

Chinese Office Action with English translation for corresponding Chinese Patent Application No. 200980156712.X dated Jan. 13, 2014.

Pandit et al., Netprobe: A Fast and Scalable System for Fraud Detection in Online Auction Networks, 2007, WWW '07: Proceedings of the 16th International Conference on World Wide Web, pp. 201-210.

Huang et al., Loopy belief propagation for bipartite maximum weight b-matching, 2007, Proceedings of the Eleventh International Conference on Artificial Intelligence and Statistics, pp. 1-8.

Bayati et al., Maximum weight matching via max-product belief propagation, In Proc. of the IEEE International Symposium on Information Theory, 2005.

Fremuth-Paeger et al., Balanced network flows, 1. a unifying framework for design and analysis of matching algorithms, Networks, 33(1):1-28, 1999.

Jaakkola et al., Maximum-margin matrix factorization, In Advances in Neural Information Processing Systems 17, MIT Press, Cambridge, MA, 2004.

Jebara et al., B-matching for spectral clustering, In Proc. of the European Conference on Machine Learning, ECML, 2006.

Marlin et al., Collaborative filtering and the missing at random assumption, In Proceedings of UAI 2007, 2007.

Marlin, B., Modeling user rating profiles for collaborative filtering. In Advances in Neural Information Processing Systems 17. MIT Press, 2004.

McDiarmid, Colin, On the method of bounded differences, Surveys in Combinatorics, p. 148188, 1989.

Morris et al., Denoising and untangling graphs using degree priors, In Advances in Neural Information Processing Systems 16, MIT Press, Cambridge, MA, 2003.

Ng et al., On spectral clustering: Analysis and an algorithm, In Neural Information Processing Systems, 2001.

Rennie et al., Fast maximum margin matrix factorization for collaborative prediction, In ICML '05: Proceedings of the 22nd international conference on machine learning, pp. 713-719, New York, NY, USA, 2005, ACM.

Sanghavi et al., Linear programming analysis of loopy belief propagation for weighted matching, In Advances in Neural Information Processing Systems 20, pp. 1273-1280, MIT Press, Cambridge, MA, 2008.

Srebro et al., Weighted low rank approximations, In Proceedings of the 22nd international conference on machine learning, 2003.

Shi et al., Normalized Cuts and Image Segmentation, In IEEE Transactions on Pattern Analysis and Machine Intelligence, vol. 22, No. 8, Aug. 2000.

Alon, Eigenvalues and expanders. Combinatorica, 6(2):83-96, 1986.

Alon et al., λ1, isoperimetric inequalities for graphs, and superconcentrators. Journal of Combinatorial Theory, Series B, 8:73-88, 1985.

Ambuhl, et al., Inapproximability results for sparsest cut, optimal linear arrangement and precendence constrained scheduling. In Foundations of Computer Science, 2007.

Arora, et al. Expander flows, geometric embeddings and graph partitioning. In Symposium on Theory of Computing, 2004.

Sanghavi et al., Linear programming analysis of loopy belief propagation for weighted matching. In Advances in Neural Information Processing Systems, 2005.

Spielman et al., Spectral partitioning works: Planar graphs and finite element meshes. In IEEE Symposium on Foundations of Computer Science, 1996.

Shaw et al., Structure preserving embedding. In Danyluk et al. (2009), p. 118. ISBN 978-1-60558-516-1.

Duan et al., Approximating maximum weight matching in near-linear time. In Proceedings 51st IEEE Symposium on Foundations of Computer Science (FOCS), 2010.

Huang et al., Exact graph structure estimation with degree priors. In M. Wani, M. Kantardzic, V. Palade, L. Kurgan, and Y. Qi, editors, ICMLA, pp. 111-118. IEEE Computer Society, 2009. ISBN 978-0-7695-3926-3.

Karatzoglou et al., Collaborative filtering on a budget. In Y. Teh and M. Titterington, Editors, Proceedings of the Thirteenth International Conference on Artificial Intelligence and Statistics (AISTATS), vol. 9, pp. 389-396, 2010.

Kolmogorov et al., Blossom v: a new implementation of a minimum cost perfect matching algorithm. Mathematical Programming Computation, 1:43-67, 2009. ISSN 1867-2949. URL http://dx.doi.org/10.1007/s12532-009-0002-8. 10.1007/s12532-009-0002-8.

Sankowski et al., Maximum weight bipartite matching in matrix multiplication time. Theor. Comput. Sci., 410(44): 4480-4488, 2009.

Shaw et al., Minimum volume embedding. In M. Meila and X. Shen, editors, Proceedings of the 11th International Conference on Artificial Intelligence and Statistics, vol. 2 of JMLR: W&CP, Mar. 2007.

Mohsen Bayati et al., "Belief-Propagation for Weighted b-Matchings on Arbitrary Graphs and its Relation to Linear Programs with Integer Solutions", Technical Report, ARXIR: 0709.1190, Microsoft Research, Sep. 2007, 22 pages.

Sujay Sanghavi et al., "Belief Propagation and LP relaxation for Weighted Matching in General Graphs", In Proceedings of NIPS, Dec. 2007, 17 pages.

http://eventseer.net/e/2936, "Call for Papers—AISTATS 2007", last downloaded Oct. 20, 2013, 2 pages.

(56) References Cited

OTHER PUBLICATIONS

International Search Report for PCT/US12/32318 mailed Jul. 17, 2012.
Huang et al., Loopy Belief Propagation for Bipartite Maximum Weight b-Matching, AISTATS 2007, Proceedings of the Eleventh International Conference on Artificial Intelligence and Statics, Mar. 21-24, 2007, Puerto Rico.
Huang et al., Maximum likelihood graph structure estimation with degree distributions, NIPS 2008 Workshop on analyzing Graphs: Theory and Applications Dec. 12, 2008 in Whistler, BC, Canada.
Jebara et al., Graph Construction and b-Matching for Semi-Supervised Learning, posted on Columbia university Website May 13, 2009.
Weiss et al., MAP Estimation, Linear Programming and Belief Propagation with Convex Free Energies, School of Computer Science and Engineering, The Hebrew University of Jerusalem, Jerusalem, Israel, Proceedings of Uncertainty in Artificial Intelligence (UAI), 2007, Jul. 19-22, 2007.
European Extended Search Report for EP 09832595.4 mailed Dec. 5, 2013.
EPO: Notice from the European Patent Office dated Oct. 1, 2007 concerning business methods, Official Journal of the European Patent Office, vol. 30, No. 11, Nov. 1, 2007, pp. 592-593, XP007905525.

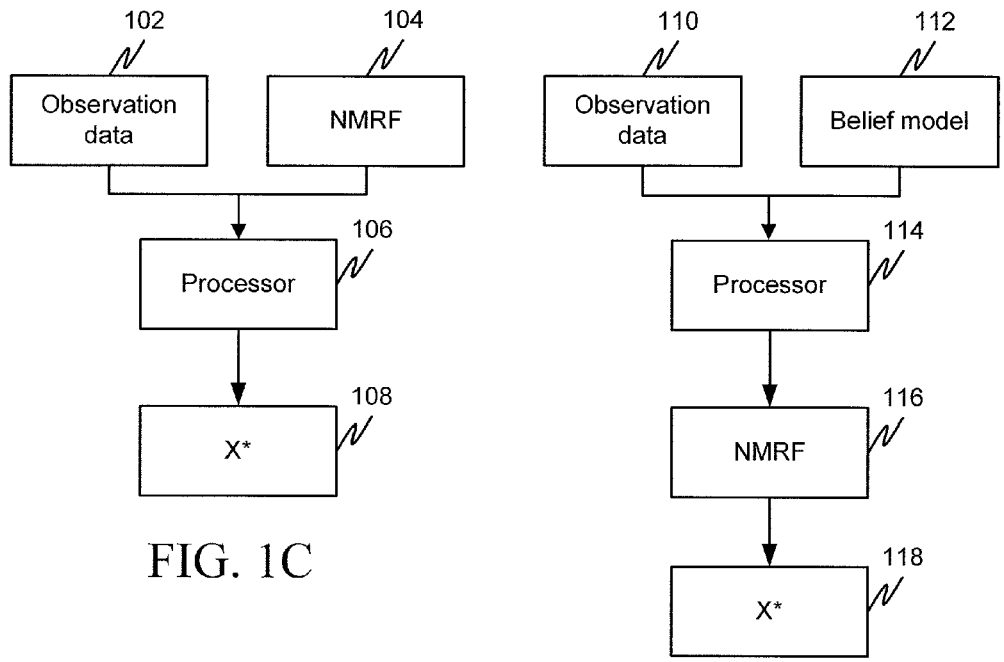
FIG. 1C
FIG. 1D
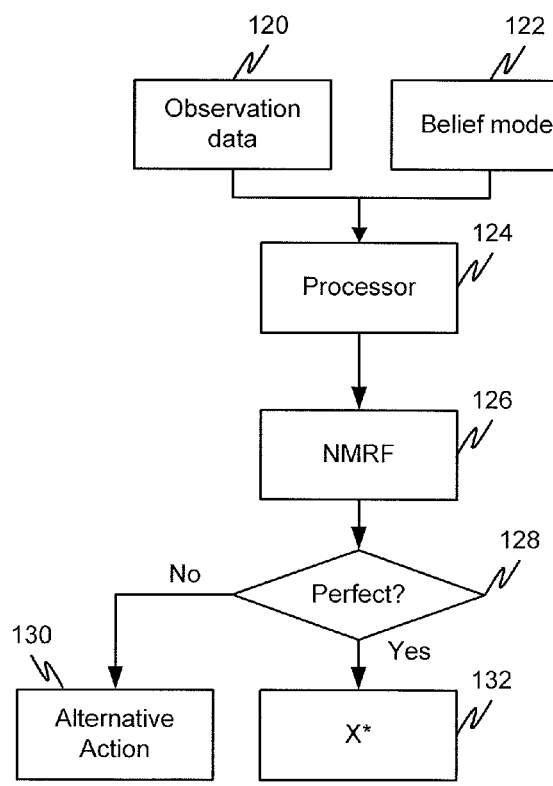
FIG. 1E

2400

|  | W1 | W2 | W3 |
|---|---|---|---|
| M1 | 1 | 2 | 3 |
| M2 | 4 | 5 | 6 |

|  | M1 | M2 | W1 | W2 | W3 |
|---|---|---|---|---|---|
| M1 | 0 | 0 | 1 | 2 | 3 |
| M2 | 0 | 0 | 4 | 5 | 6 |
| W1 | 1 | 4 | 0 | 0 | 0 |
| W2 | 2 | 5 | 0 | 0 | 0 |
| W3 | 3 | 6 | 0 | 0 | 0 |

| 5 x 5 Weight Matrix | Degree Distribution Marginals for each M and W (on respective rows) |
|---|---|
| Transpose of Degree Distribution Marginals for each M and W (on respective cols) | Zero Quadrant |

Degree Distributions
M1 = { 0.2, 0.6, 0.2 }
M2 = { 0.8, 0.1, 0.1 }
W1 = { 0.2, 0.6, 0.2 }
W2 = { 0.8, 0.2, 0 }
W3 = { 0.2, 0.8, 0 }

2408

| 0 | 0 | 1 | 2 | 3 | -0.2 | -0.4 | 0.4 | 0.2 | 0 |
|---|---|---|---|---|------|------|-----|-----|---|
| 0 | 0 | 4 | 5 | 6 | -0.8 | 0.7 | 0 | 0.1 | 0 |
| 1 | 4 | 0 | 0 | 0 | -0.2 | -0.4 | 0.4 | 0.2 | 0 |
| 2 | 5 | 0 | 0 | 0 | -0.8 | 0.6 | 0.2 | 0 | 0 |
| 3 | 6 | 0 | 0 | 0 | -0.2 | -0.6 | 0.8 | 0 | 0 |
| -0.2 | -0.8 | -0.2 | -0.8 | -0.2 | 0 | 0 | 0 | 0 | 0 |
| -0.4 | -0.7 | -0.4 | 0.6 | -0.6 | 0 | 0 | 0 | 0 | 0 |
| 0.4 | 0 | 0.4 | 0.2 | 0.8 | 0 | 0 | 0 | 0 | 0 |
| 0.2 | 0.1 | 0.2 | 0 | 0 | 0 | 0 | 0 | 0 | 0 |
| 0 | 0 | 0 | 0 | 0 | 0 | 0 | 0 | 0 | 0 |

SYSTEMS, DEVICES, AND METHODS FOR POSTERIORI ESTIMATION USING NAND MARKOV RANDOM FIELD (NMRF)

CROSS REFERENCE TO RELATED APPLICATIONS

This application is a continuation-in-part of PCT Application No. PCT/US10/35665, entitled "Systems Devices and Methods For Estimating" and filed on May 20, 2010, which claims the benefit of U.S. Provisional Application No. 61/180,063, entitled "System and Method for Maximum a Posteriori Estimation Of Graphical Models Having Perfect Graphs" and filed May 20, 2009; and U.S. Provisional Application No. 61/181,997, entitled "System and Method for Maximum a Posteriori Estimation of Graphical Models Having Perfect Graphs" and filed May 28, 2009, each of which is incorporated herein by reference in its entirety.

BACKGROUND

Computers are finding new and useful applications in the quasi-intelligent areas of making predictions, and recognizing patterns and objects. Brief consideration of how the human brain makes predictions or estimates based on incomplete information reveals how numerous and varied the useful applications for such a capacity are. This is, in many cases, because computers can take in and process large amounts of the most tedious information round the clock to provide valuable intelligence that can be used to augment or supplement human decisions and provide automated control and information. Such computer implemented methods and systems go by various popular names such as inference engines, pattern recognition, artificial intelligence, etc.

The mathematical basis for making these kinds of estimates often leads to extremely complex problems which are hard to solve in a reasonable time on a computer. One kind of estimate is called a Bayesian inference, which is a statistical inference based on evidence, descriptive data, or observations that are combined to infer the probability of an event or object or other thing that can be inferred from the data. The more data, the more reliable the inference. With large amounts of data and many conditions defining interrelationships among them, many Bayesian inferences of practical importance take a long time on computers. There is a perennial need to find more efficient ways to process such problems to permit new applications of such computer implemented technology.

In Bayesian statistics, the posterior probability of an event or other thing is the conditional probability estimate in view of all evidence. Many useful problems seek the most likely configuration of a system, or a best estimate from the posterior probabilities called maximum a posteriori (MAP) estimate. The system is usually described by a Bayesian network. When the configuration is discrete, estimations can be NP hard, that is, answers can be verified quickly, and a quick algorithm to solve the problem can solve other NP problems quickly. Many problems have been solved using message passing or belief propagation techniques, which can be efficiently implemented on computers. However, there is a need for ensuring and determining the exactness of these methods.

SUMMARY

The disclosed subject matter and embodiments thereof include systems, methods, and devices for finding the MAP estimate of graphical models. The subject matter extends the set of graphs where MAP estimation is polynomial and where message passing recovers the exact solution to the family of perfect graphs.

BRIEF DESCRIPTION OF THE DRAWINGS

FIGS. 1C-1E are diagrams showing high-level data flows for various techniques of using an NMRF to generate an output from observation data, according to some embodiments of the disclosed subject matter.

FIGS. 24A-24D are diagrams showing an initial weight matrix being expanded to include degree distribution data according to some embodiments of the disclosed subject matter.

DETAILED DESCRIPTION OF THE DRAWINGS AND EMBODIMENTS

Figure 1A:
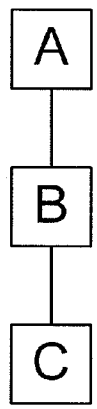
FIG. 1A is a diagrammatic illustration of a graphical model.

Embodiments of the disclosed subject matter relate generally to solving problems that be represented as graphical models. More particularly, one or more embodiments relate to a system, computer-implemented method and computer-readable storing methods for solving one or more graphical model problem by finding a maximum a posteriori estimate configuration of the graphical model.

In solving many important problems it can be helpful to determine the most likely configuration of a system, known as maximum likelihood estimation and, more generally, maximum a posteriori (MAP) estimation. The system is usually described by a Bayesian network. When the configuration is a discrete one, such estimation problems can be NP hard. However, recently, solutions to many problems have been implemented using a method called message passing or loopy belief propagation. Characterizing and ensuring the exactness of these methods (and situations where decoding is P rather than NP) is of interest in artificial intelligence, digital communications, and many other application areas.

Applications of MAP estimation in Bayesian networks and graphical models include signal processing, image processing, generalized matching and digital communications. For example, MAP estimation with loopy belief propagation can be used for turbo codes. Of all practical error correction methods known to date, turbo codes and low-density parity-check codes (LDPCs) come closest to approaching the Shannon limit, the theoretical limit of maximum information transfer rate over a noisy channel. In electrical engineering and digital communications, turbo codes are a class of high-performance error correction codes developed in 1993 which are finding use in deep space satellite communications and other areas where designers seek to achieve maximal information transfer over a limited-bandwidth communication link in the presence of data corrupting noise.

General MAP estimation is NP hard and loopy belief propagation (also known as message passing) may fail to give the MAP estimate. Embodiments of the disclosed system and method can perform a conversion of the Bayesian network into a nand random field (or nand Markov random field). If the resulting nand random field is a perfect graph, the message passing algorithms and/or linear programming techniques described herein are guaranteed to be efficient and will exactly provide the MAP estimate (which is then in P). The strong perfect graph theorem (and the ability to verify perfection in polynomial time) was recently solved by Chudnovsky et al. Embodiments of the disclosed system and method connect the combinatorial results of the perfection verification method to inference and decoding with general graphical models through one or more of belief propagation, message passing, and linear programming.

Methods to solve several important applied decoding and inference problems have been implemented by linear programming, belief propagation, and/or message passing. By using conversion to nand random fields and verifying if the graphs are perfect, it is now possible, with an embodiment in accordance with this disclosure, to see if these applied problems are guaranteed optimal or are suboptimal. Also, it is possible to now verify what changes to these current graphs are necessary to guarantee optimality. In particular, generalized matching problems are in this category since they form perfect graphs. Other perfect graphs should benefit from the disclosed systems and methods in applications such as image processing, computer vision, and digital communications. Also, embodiments can be used in connection with turbo codes, LDPC codes and other satellite communication codes. Embodiments can characterize when decoding (such as turbo codes) is guaranteed exact and can allow extensions to the coding schemes which do not violate exactness of the encoding and decoding procedures. Applications include 3G mobile telephony, terrestrial mobile television (e.g., the MediaFLO system from Qualcomm), space vehicles such as the Mars Reconnaissance Orbiter (which now uses turbo codes as an alternative to RS-Viterbi codes), wireless networks (such as networks based on IEEE 802.16—the wireless metropolitan network standard—which uses turbo coding such as block turbo coding and/or convolutional turbo coding), and other digital and/or satellite communications systems.

Embodiments of the disclosed system and method can generalize the guaranteed algorithm used to solve generalized matching and b-matching. The b-matching problems are a particular instance of perfect graphs. It is believed that all other perfect graphs inherent the same guarantees.

Graphical models can use a graph over dependent random variables to compactly write a probability density function as a product of functions over maximal cliques in the graph. Recovering the maximum a posteriori (MAP) configuration of random variables in a graphical model is an important problem with applications to specific problems such as protein folding, image processing, computer vision, error-correcting codes, distributed data association and estimation using sensing and wireless communication nodes with constrained capacities, multiple target tracking with distributed sensor networks, speech recognition, medical diagnosis, probabilistic decoding of channel codes to enhance the performance of digital communications systems or to increase the reliability of data retrieval in a data storage system, human behavior recognition, and wireless signal detection, many others.

One embodiment includes a system for maximum a posteriori (MAP) estimation of a graphical model. The system comprises a computer-readable medium, a MAP estimation processor coupled to the computer-readable, a communication interface coupled to the MAP estimation processor. The communication interface is adapted to receive and/or transmit electronic observation data to and from the MAP estimation processor, respectively.

The computer-readable medium has software instructions stored on it that, when executed by the MAP estimation processor, cause the MAP estimation processor to perform operations. The operations include obtaining at the MAP estimation processor, the observation data via the communication interface, converting the observation data into a representation of a graphical model (e.g., by combining observation data with belief data in a graphical model framework), and converting the graphical model into a nand Markov random field (NMRF). The operations can also include determining whether the NMRF has a perfect graph structure, and if the NMRF has a perfect graph structure, solving for a MAP configuration estimate for the NMRF. The operations can further include outputting the MAP estimate.

The operations can also include pruning the NMRF to remove minimum configuration nodes prior to the determining and merging the NMRF after the pruning and prior to the determining, and then merging pairs of nodes having the same connectivity within the NMRF. The determining operation can include determining whether the NMRF is a Berge graph. The determining can also include using linear programming to determine whether the NMRF has a perfect graph structure. The solving operation can include using belief propagation message passing or linear programming operations.

Another embodiment includes a computer implemented method for maximum a posteriori (MAP) estimation of a graphical model. The method comprises obtaining, at a MAP estimation processor, observation data via a communication interface, and converting, using the MAP estimation processor, the observation data into a graphical model into an electronic representation of a nand Markov random field (NMRF). The method can also include determining, using the MAP estimation processor, whether the NMRF has a perfect graph structure, and if the NMRF has a perfect graph structure, solving, using the MAP estimation processor, for a MAP estimate configuration of the NMRF. The method can further include outputting the MAP estimate configuration from the MAP estimation processor to an outside of the using the MAP estimation processor using the communication interface.

Yet another embodiment includes a computer-readable storage medium having stored thereon software instructions that, when executed by a processor, cause the processor to perform operations. The operations can include obtaining observation data, generating a graphical model by combining the observation data with belief data (or other conditional data) in a graphical framework, and converting the graphical model into a nand Markov random field (NMRF). The operations can also include determining whether the NMRF has a perfect graph structure by determining if the NMRF is a Berge graph, and if the NMRF has a perfect graph structure, solving for a MAP estimate configuration of the NMRF using belief propagation. The operations can further include outputting the MAP estimate configuration.

Still another embodiment includes a method for solving perfect graphs using belief propagation. The method includes converting a graphical model representation of observation data into a nand Markov random field (NMRF). Diagnosing the NMRF to determine whether it is a perfect graph. For a perfect graph, solving the maximum a posteriori (MAP) using linear programming or belief propagation (message passing).

Another embodiment includes a system for solving perfect graphs. The system includes a memory having a database stored therein, the database including a data structure adapted to store a graphical model representing a physical object or article. The system includes a computer specifically configured to solve perfect graph problems (e.g., those discussed above) using belief propagation. The computer is coupled to the memory and includes computer software instructions that, when executed by the processor, cause the computer to perform operations including converting the graphical model into an equivalent graphical model having a nand Markov random field (NMRF). The operations further include diagnosing the NMRF graphical model to determine if it contains a perfect graph, and, if the graph is perfect, generating a maximum a posteriori (MAP) estimate using a linear programming technique or a message passing technique. The system can also output the MAP estimate for the graphical model.

Optionally, the NMRF graphical model can be pruned by applying a Disconnect function (or procedure) followed by a Merge function. The Disconnect function includes applying the Disconnect function to nodes in the NMRF that correspond to the minimal configuration of each clique. The Disconnect function includes removing edges that have no effect on MAP score.

The Merge function includes merging pairs of disconnected nodes that have the same connectivity to the rest of the graph and combining them into a single variable. The Merge function returns a graph whose nodes are merged. The graph generated from Disconnect and Merge can provide for a more efficient MAP estimation due to simplification of the graph.

Efficiently finding the maximum a posteriori configuration of a graphical model is an important problem which can be implemented using message passing methods and systems, such as those described below. The optimality of conventional message passing processes may only be well established for singly-connected graphs and other limited settings. Embodiments extend the set of graphs where MAP estimation is in P and where message passing recovers the exact solution to the family of perfect graphs. This result leverages recent progress in defining the family of perfect graphs (the strong perfect graph theorem) and progress in demonstrating the convergence of message passing to the linear program relaxation of the MAP problem. An embodiment can convert graphical models that have been generated based on received observation data into nand Markov random fields which can be relaxed into linear programs where integrality can be established in general by testing for graph perfection. This perfection test is performed efficiently using a polynomial time algorithm. Thus, a general graph framework is provided for determining when MAP estimation in any graphical model is in P, has integral linear program relaxation and MAP can be recovered by message passing.

Recovering the maximum a posteriori (MAP) configuration of random variables in a graphical model is an important problem with applications ranging from protein folding to image processing, among others as mentioned above. Graphical models use a graph over dependent random variables to compactly write a probability density function as a product of functions over maximal cliques in the graph. For a general graphical model, the MAP problem is NP-hard. A popular algorithm for approximating the MAP solution is max-product belief propagation and its variants which operate by sending messages between neighboring cliques until convergence. It is known that max-product belief propagation converges to the optimum on singly-linked graphs and junction-trees. More recently, it was shown to also converge to the optimum on graphs with a single loop, maximum weight bipartite matchings, and maximum weight bipartite b-matchings. In the last three settings, the graphs contain loops and message passing algorithms are often referred to as loopy belief propagation or loopy message passing. While the single loop case is of limited practical use, the matching and b-matching message passing algorithms have many applications and lead to competitive methods for solving matching problems. Subsequently, additional results for matching and b-matching problems were produced by examining the linear program (LP) relaxation of the integer problem being solved during MAP. Loosely speaking, if the LP relaxation of the matching problem has an integral solution, message passing converges to the MAP solution. In principle, this extends convergence arguments for matching from bipartite settings (where LP relaxation is integral) to some unipartite settings if the LP relaxation has integral solution. Of course, matchings and b-matchings are known to be exactly solvable for both the bipartite and the more general unipartite case in $O(n^3)$ time using the famous Edmonds' Blossom algorithm. However, belief propagation methods are faster in practice and, under mild assumptions, find solutions in $O(n^2)$ time (see below).

Disclosed is a method and system for identifying general conditions on graphical models such that the linear program relaxation is integral and such that message passing will converge to the optimum MAP assignment. This extends the current list of graphical models where MAP is known to be efficient and message passing is exact to the broader family of perfect graphs. Perfect graphs subsume trees, bipartite matchings and b-matchings and lead to a generalization of König's theorem, the so-called weak perfect graph theorem which states that a graph is perfect if and only if its complement is perfect. Recently, the strong perfect graph theorem was proved which states that all perfect graphs are Berge graphs. Furthermore, a polynomial time algorithm was discovered that verifies if a graph is perfect. A system and method is disclosed to convert general graphical models into an alternative form referred to as a nand Markov random field on which integrality of linear programming relaxation can be easily verified by recognizing perfect graphs. This makes it possible to precisely characterize which loopy graphs have the appropriate topology for exact MAP estimation via either linear programming or message passing.

Before commencing with a description of some embodiments, it may be helpful to present an overview of the mathematics underlying certain features. In general, a graphical model is an undirected graph used to represent the factorization properties of a probability distribution. Consider an undirected graph $G=(V, E)$ with vertices $V=\{v_1, \ldots, v_n\}$ and edges $E: V \times V \to B$. Denote the set of vertices by $V$ $(G)$ and the neighbors of a node $v_i$ by $Ne(v_i)$. The graph $G$ describes the dependencies between a set of random variables $X=\{x_1, \ldots, x_n\}$ where each variable $x_i$ is associated with a vertex $v_i$ in the graph (these will be used interchangeably). We will assume that each $x_i \in Z$ is a discrete variable with $|x_i|$ settings. If $x_i$ is a binary variable, $0 \le x_i < 2$ and $|x_i|=2$. A graphical model describes a probability density over all random variables $p(X)$ which obeys the following factorization:

$$p(X) = \frac{1}{Z} \prod_{c \in C} \psi_c(X_c) \qquad (1)$$

where $Z$ is a normalizing scalar partition function, $C$ is the set of maximal cliques in the graph $C \subseteq G$ and $\psi_c(X_c)$ are positive compatibility functions over variables in each clique c, in other words $X_c=\{x_i | i \in c\}$. Without loss of generality, it is assumed all $\psi_c(X_c)$ are uniformly scaled such that $\psi_c(X_c) > 1$ (and $Z$ is scaled appropriately for normalization) as follows:

$$\psi_c(X_c) \leftarrow \frac{\psi_c(X_c)}{\min_{X_c} \psi_c(X_c)} + \varepsilon$$

where $\varepsilon$ is an infinitesimal quantity.

It is possible to convert the above Equation 1 into an equivalent pairwise Markov random field (MRF) over binary variables at the expense of increasing the state space. Such an approach is followed below, but restricted as to the conversion by requiring that all potential functions enforce nand relationships among binary variables.

Any generic graphical model with graph G in Equation 1 can be converted into an equivalent graphical model with graph G which will be referred to as a nand Markov random field (NMRF). In this form, all clique functions involve a nand operation over binary variables as $\psi_c(X_c)=\delta(\Sigma_{x \in X_c} x \le 1)$ where we take the function $\delta \in B$ to equal 1 if the statement inside is true and 0 otherwise. Indeed, graphical models for solving maximum weight matchings are usually in this form. The NMRF form helps produce linear program relaxations of the MAP problem which have desirable properties as detailed below.

Consider forming an NMRF from G which places a distribution over a set X of N binary variables $x \in B$. For each clique $c \in C$ in the original graph G, introduce binary variables $x_{c,k}$ for each configuration of the arguments of the clique function $\psi_c(X_c)$. In other words, for clique $X_c$, define a set of binary variables $X_c=\{x_{c,1}, \ldots, x_{c,|X_c|}\}$ with $|X_c|=\Pi_{i \in c}|x_i|$. The NMRF involves a distribution over all such variables $X=\cup_{c \in C} X_c$ and since all $X_c$ are disjoint (with redundant instantiations of the variables corresponding to $X_c$), this state space of the NMRF has cardinality $$|X| = \sum_{c \in C} \left( \prod_{i \in c} |x_i| \right). \qquad (2)$$

Given a setting of $X=\{x_1, \ldots, x_n\}$ the corresponding setting of $X=\{x_1, \ldots, x_N\}$ is given by:

$$x_{c,k} = \prod_{i=1}^{n}\left(\left(k - \prod_{j=1}^{i-1}|x_j|^{\delta(j \in c)}\right)\bmod|x_i| = x_i\right)^{\delta(j \in c)} \quad (3)$$

which is a mapping from X to a setting of X as an injection since some settings of X yield invalid settings of X if they involve disagreement in the configurations of the potential functions. The expression says that when $X_c$ is in its k'th configuration from among its total of $\Pi_{i \in c}|x_i|$ possible configurations, we must have $x_{c,k}=1$ in the NMRF.

It is now possible to write an equivalent function $\rho(X)$ which mimics Equation 1. This need not be a normalized probability density function over the space X since we are only interested in its maximization for the MAP estimate. The function $\rho(X)$ is as follows $$\rho(X) = \prod_{c \in C} \Psi_c(X_c) \prod_{k=1}^{|X_c|} e^{f_{c,k} x_{c,k}} \prod_{\substack{d \in C \\ d \neq c}} \prod_{l=1}^{|X_d|} \Phi(x_{c,k}, x_{d,l})^{z_{c,k,d,l}} \quad (4)$$

Where, once again, C is the set of maximal cliques in the graph $C \subseteq G$ and $\Psi_c(X_c)$ are compatibility functions over sets of binary variables. Furthermore, to mimic the original p(X), the factorization contains a product over $\exp(f_{c,k} x_{c,k})$ involving non-negative scalars $$f_{x,k} = \log \psi_c(X_c)$$

Where $X_c$ and $\hat{X}_c$ are recovered from (c, k) as determined by the relationship in Equation 3. Note that all $f_{c,k} > 0$ since $\psi_c(X_c) > 1$. Finally, the factorization contains additional potential functions $\Phi(x_{c,k}, x_{d,l})$ for each pair of variable $x_{c,k}$ and $x_{d,l}$ if the binary variable $z_{c,k,d,l}$ equals unity (otherwise, the functions are taken to the power of 0 and disappear from the product). The important difference with this model and the one in Equation 1 is that all its (non-singleton) clique potential functions $\Psi_c(X_c)$ and separator functions $\Psi(x_{c,k}, x_{d,l})$ accept binary values and produce binary outputs as nand operations $$\Psi_c(X_c) = \begin{cases} 1 & \text{if } \sum_{k \in c} x_{c,k} \leq 1 \\ 0 & \text{otherwise} \end{cases}$$

$$\Phi(x_{c,k}, x_{d,l}) = \begin{cases} 1 & \text{if } x_{c,k} + x_{d,l} \leq 1 \\ 0 & \text{otherwise.} \end{cases}$$

The binary variable $z_{c,k,d,l}$ indicates a potential disagreement between the settings in $x_{c,k}$ and $x_{d,l}$ over settings of the variables in X they are involved in. This is defined more formally as follows:

$$z_{c,k,d,l} = 1 - \prod_{i=1}^{n}\left(\left(k - \prod_{j=1}^{i-1}|x_j|^{\delta(j \in c)}\right)\bmod|x_i|\right)^{\delta(i \in c)\delta(i \in d)}$$

$$= \left(l - \prod_{j=1}^{i-1}|x_j|^{\delta(j \in d)}\right)\bmod|x_i|\right)^{\delta(i \in c)\delta(i \in d)}$$

where we take $0^0=1$.

It is now straightforward to consider the undirected graph $G=(V, E)$ implied by Equation 4. This graph contains nodes $V=\{v_{c,k}: \forall c \in C, k=1, \ldots, |X_c|\}$ where each node $v_{c,k}$ is associated with a corresponding variable $x_{c,k}$. The graph G then has edges between all pairs of nodes $v_{c,k}$ corresponding to variables in the clique $X_c$ for $c \in C$. Furthermore, all pairs of nodes $v_{c,k}$ and $v_{d,l}$ are connected if $z_{c,k,d,l}=1$. The precise formula for the set of edges in G is:

$$E(v_{c,k}, v_{d,l}) = \max(\delta(c=d)\delta(k \neq l), z_{c,k,d,l}).$$

This results in an undirected graph G. Any pair of binary variable nodes in this graph that are connected by an edge cannot both be equal to one simultaneously. This is because an edge can exist between all binary variables corresponding to configuration of the cliques $X_c$ that have disagreements. For instance, the clique functions $\Psi_c(X_c)$ place edges between all variables corresponding to differing configurations of $X_c$ only one of which may be active (i.e. equal to one) at any time. We enforce a nand relationship, however: only one or fewer such variables may be instantiated (equal to unity) if they correspond to vertices adjacent to an edge. Thus, the potential functions in this graphical model are acting as nand gates and edges in the graph enforce a nand relationship between the nodes they are adjacent to (at most one can be instantiated). This is reminiscent of the MRF used previously which had xor potential functions requiring that the variables inside cliques sum strictly to 1. The NMRF, on the other hand, requires a nand relationship and a summation to less than or equal to 1.

Figure 1B:
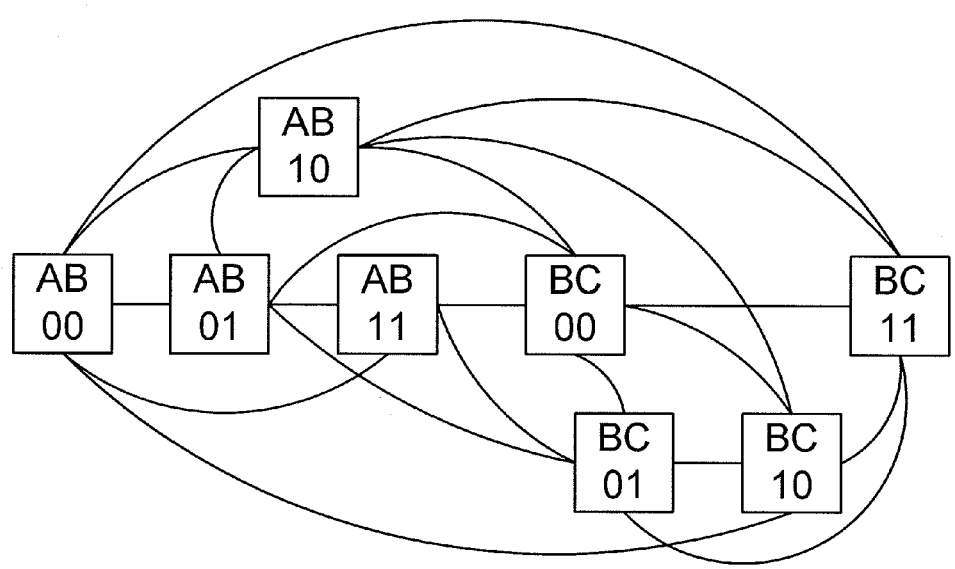
FIG. 1B is a diagrammatic illustration of a binary nand Markov random field corresponding to the graphical model of FIG. 1A.

FIG. 1A is a diagrammatic illustration of a graphical model and FIG. 1B is a diagrammatic illustration of a binary nand Markov random field corresponding to the graphical model of FIG. 1A. The graphical model has cliques {A,B} and {B,C}.

It remains to show that the MAP estimate $X^*$ of $\rho(X)$ corresponds to a valid MAP estimate $X^*$ of $p(X)$ despite the surjective relationship between X and $X^*$. Since the variables in X correspond to possibly disagreeing settings of $X^*$, only some binary configurations are admissible in $X^*$. This is because every clique $X_c$ must be in at least one configuration and overlapping cliques may not disagree in their configurations. However, the constraints in Equation 4 only require $\Sigma_{k \in c} x_{c,k} \leq 1$ which permits the possibility that some cliques will simply not be assigned a configuration when we recover the MAP estimate from Equation 4. In other words, it may be the case that $\Sigma_{k \in c} x_{c,k}=0$. The next theorem shows that the MAP estimate $X^*$ will produce $\Sigma_{k \in c} x_{c,k}=1$ for all $c \in C$. In other words, at the maximum, the $\Psi$ potential functions (not the $\Phi$ potential functions) in the NMRF will have 1 as their argument.

Theorem 1 Given the MAP estimate $X^*=x^*_1, \ldots, \{x^*_{|X|}\}$ of Equation 4, all variables in cliques $c \in C$ satisfy $\Sigma_{k \in c} x^*_{c,k}=1$.

Proof 1 The MAP solution involves binary settings $x^*_{c,k} \in \{0,1\}$ for all variables in $X^*$. Setting X to all zeros produces a value $\rho(X)=1$ since all clique functions $\Psi$ and $\Phi$ are satisfied and all the values of $f_{c,k}$ are multiplied by zero prior to exponentiation. Therefore, assume that the maximizer is not the all zeros configuration and we strictly have $\rho(X^*) > 1$, since, otherwise, all settings of X trivially produce a MAP estimate. Requiring $\rho(X^*) > 1$ corresponds to having at least one nonzero setting in $X^*$. At least one binary variable $x^*_{\hat{c},\hat{k}}=1$ and satisfies $\Sigma_{k \in c} x^*_{\hat{c},\hat{k}}=1$ to produce $\rho(X^*) > 1$ since $f_{c,k} > 0$ and $\exp(f_{c,k} x_{c,k}) > 1$. Since $\rho(X^*) > 1$, there can be no disagreement between the configurations of overlapping cliques since pairwise potential functions $\Phi(x_{c,k}, x_{d,l})$ exist between all pairs of binary variables when $z_{c,k,d,l}=1$ and setting binary variables corresponding to conflicting assignments for $X_c$ and $X_d$ will force $\rho(X)=0$. Thus, there can be no disagreement in the configurations of the cliques. If $\rho(X^*)>1$, it must be the case that either of the following holds: $\rho_{k\in c}x_{c,k}=1$ or $\rho_{k\in c}x_{c,k}=0$ for all $c\neq\hat{c}$. Consider finding a clique $\tilde{c}\in C\backslash\hat{c}$ where the latter case is true. There, $\tilde{c}$ has no assigned configuration for its variables $X_{\tilde{c}}$ and $\Sigma_{k\in \tilde{c}}x_{\tilde{c},k}=0$. For any such clique $\tilde{c}$ there is always a configuration that may be selected which agrees with neighboring cliques. Since every value of $f_{\tilde{c},k}>0$, it is always possible to preserve agreement and set one of the $x_{\tilde{c},k}$ to unity to strictly increase $\rho(X)$ while preserving agreement. Repeating this line of reasoning on all remaining cliques only further increases $\rho(X)$ until all cliques satisfy $\rho_{k\in c}x_{c,k}=1$. Thus, the NMRF produces a MAP estimate satisfying $\rho_{k\in c}x^*_{c,k}=1$ for all cliques $c\in C$.

Lemma 1 The MAP estimate of Equation 4 corresponds to the MAP estimate of Equation 1.

Proof 2 Since all configurations are in agreement and $\Sigma_{k\in c}x_{c,k}=1$ then the maximizer $X^*$ of Equation 4 corresponds to a valid setting of $X^*$ and we can associate $X^*$ with $X^*$. It is straightforward to see that $\rho(X^*)/Z=p(X^*)$. Since $\rho(X^*)\geq\rho(X)$ for all $X$ and $X$ spans a strict superset of the configurations of $X$, then $p(X^*)\geq p(X)$ for all $X$.

Next we show that, when G corresponds to a perfect graph, the linear programming relaxation of Equation 4 is integral. In those settings the MAP estimate can be recovered by linear programming.

Consider the linear programming relaxation of the MAP estimation problem on the NMRF in Equation 4 (which was shown to be equivalent to MAP estimation with the graphical model in Equation 1). A linear program is an optimization over a vector of variables $\vec{x}\in R^N$ which are used as surrogates for the binary variables $X$ in the MAP problem on the NMRF. If the LP is tight and gives back an integral solution, then $\vec{x}$ recovers the exact MAP estimate. Denote the all-ones vector $\vec{1}\in R^N$. In general, linear programming (or any convex optimization problem) can be solved in time cubic in the number of variables. The following theorem strictly characterizes when an LP in so-called Chvátal form (also known as a packing linear program) yields integral solutions $\vec{x}^*\in\{0,1\}^N$.

Theorem 2 For every non-negative vector $\vec{f}\in R^N$, the linear program $$\beta = \max_{\vec{x}\in R^N} \vec{f}^T\vec{x} \text{ subject to } \vec{x}\geq 0 \text{ and } A\vec{x}\leq\vec{1}$$

recovers a vector $\vec{x}$ which is integral if and only if the (undominated) rows of A form the vertex versus maximal cliques incidence matrix of some perfect graph.

We say the i'th row of a matrix A is undominated if there is no row index $c\neq d$ such that $A_{cj}\leq A_{dj}$ for all $j=1,\ldots,N$. Let G be a graph with vertices $V=\{v_1,v_2,\ldots,v_N\}$ and $\{V_1,\ldots,V_{|C|}\}$ (its (inclusion-wise) maximal cliques. We define the incidence matrix of G as $A\in B^{|C|\times N}$ where $A_{cj}=1$ if $v_j\in V_c$ and $A_{cj}=0$ otherwise.

Theorem 2 describes when the above LP will yield an integer solution. For general graphs G and general Markov random fields G, the MAP estimate is NP. Remarkably, by examining the topology of the graph G, it is possible to characterize exactly when the linear programming relaxation will be integral or otherwise for the NMRF G. If the graph G is a perfect graph, then its LP relaxation is integral and the MAP estimate can be recovered in polynomial (cubic) time. This is summarized in the following theorem.

Theorem 3 The MAP estimate of the nand Markov random field in Equation 4 is in P if the graph G is perfect and MAP estimation takes at most $O(|V(G)|^3)$ by linear programming if G is perfect.

Proof 3 The linear programming relaxation of the MAP estimate of the nand Markov random field directly produces a Chátal linear program. Given the graph G, it is straightforward to recover its corresponding vertex versus maximal cliques incidence matrix A. Taking the logarithm of Equation 4 shows that the MAP optimization is exactly equivalent to the LP in Theorem 2. The LP is a direct relaxation of the binary variables in Equation 4 and the matrix A corresponds to the graph G, the vector $\vec{x}=\text{vec}(X)$ is the concatenation of all the binary random variables and the vector $\vec{f}$ is set to equal the singleton potential functions:

$$\vec{f}=[\log(\phi_{c,k}(1)):\forall c\in C, k=1,\ldots,|X_c|]^T.$$

Recall that $\log(\phi_{c,k}(1))$ is always positive since all clique potential function values in $\psi(X_c)>1$ in the original graph G. Therefore, Equation 4 corresponds directly to the LP in Theorem 2. If G is a perfect graph, the integrality of the LP is established via Theorem 2 and linear programming achieves the MAP estimate.

A test is to show that G is (or is not) a perfect graph which determines conclusively if the LP is (or is not) integral. It is then possible to relate the result on the NMRF above to general graphical models via the following.

Corollary 1 The MAP estimate of any graphical model with cliques $c\in C$ over variables $\{x_1,\ldots,x_n\}$ that corresponds to a nand Markov random field as in Equation 4 with a perfect graph G is in P and can be computed in at most $O((\Sigma_{c\in C}(\Pi_{i\in c}|x_i|))^3)$.

Proof 4 Theorem 1 ensures that the MAP estimate of the nand Markov random field produces the MAP estimate of the graphical model. Theorem 3 shows that recovering the MAP estimate of the NMRF is in P and is cubic in the number of vertices. The number of vertices of the NMRF is given by Equation 2.

In summary, if graph G is a perfect graph, the linear program relaxation is integral and recovers the MAP estimate of the NMRF in Equation 4 as well as the MAP estimate of the graphical model in Equation 1. While linear programming is cubic in the number of variables, an alternative algorithm (belief propagation) is described below, which often obtains better efficiency in practice. First, however, we discuss perfect graphs in more detail and, in particular, a recent polynomial time algorithm that answers if a graph is perfect or is not.

A perfect graph is a graph where every induced subgraph has chromatic number equal to its clique number. The clique number of a graph G is denoted $\omega(G)$ and is the size of the maximum clique (fully connected subgraph) of G. The chromatic number of G is $\chi(G)$, the minimum number of colors needed to label vertices such that no two adjacent vertices (vertices connected by an edge) have the same color. Perfect graphs have the remarkable property, $\omega(H)=\chi(H)$ for every induced subgraph $H\subseteq G$.

In recent work, the strong perfect graph conjecture was proved. Namely, a graph is perfect if an only if it is Berge. A Berge graph is a graph that contains no odd hole and whose complement also contains no odd hole, both terms are defined below.

Definition 1 (Complement) The complement $\bar{G}$ of a graph G is a graph with the same vertex $V(G)$ set as G, where distinct vertices u, $v\in V(G)$ are adjacent in $\bar{G}$ just when they are not adjacent in G. The complement of the complement of a graph gives back the original graph.

Definition 2 ( ) hole of a graph G is an induced subgraph of G which is a chordless cycle of length at least 5. An odd hole is a cycle with odd length and an even hole is a cycle with even length.

The proof of the strong perfect graph conjecture shows that Berge graphs are perfect graphs and contain no odd hole and no odd hole in their complement. The proof also specifies that any Berge graph must belong to one of the following categories:
- bipartite graphs
- complements of bipartite graphs
- line graphs of bipartite graphs
- complements of line graphs of bipartite graphs Or the graph can have one of four structural faults: a 2-join, a 2-join in the complement, an M-join or a skew partition. In earlier work, the structural fault involving M-joins was deemed unnecessary. Note, a line graph L(G) of a graph G is a graph which has a vertex for each edge of G and where two vertices of L(G) are adjacent if and only if they correspond to two edges of G with a common end vertex.

The family of perfect graphs makes it possible to precisely characterize which graphical models G (or their equivalent nand Markov random field G) admit efficient MAP estimation. Also, remarkably, verifying if any graph is perfect is efficient. Recently, a polynomial time algorithm (in the number of vertices of the graph) was introduced to test if a graph is perfect.

Theorem 4 Determining if graph G is perfect is P and takes at most $O(|V(G)|^9)$.

The algorithm detects either that G is not Berge, or that G contains no odd hole. To test Bergeness, the algorithm is run on both G and G. If both procedures give a negative result, the graph is perfect. The procedure itself breaks into four steps as follows.
- Detect if the graph contains a pyramid structure by computing shortest paths between all nonuples of vertices.
- Detect if the graph contains a jewel structure or other easily detectable configuration.
- Perform a cleaning procedure. A vertex in the graph is C-major if its set of neighbors in C is not a subset of the vertex set of any 3-vertex path of C. C is clean if there are no C-major vertices in the graph.
- Look for the shortest odd hole in the graph by computing the shortest paths between all triples of vertices.

This polynomial time algorithm leads to the following straightforward corollary for graphical models (via the conversion to NMRFs).

Corollary 2 Verifying if MAP estimation is efficient for any graphical model with cliques $c \in C$ over variables $\{x_1, \ldots, x_n\}$ is in P and takes at most $O((\Sigma_{c \in C}(\Pi_{i \in c}|x_i|))^9)$ time.

Therefore, a general framework is possible for verifying if MAP estimation of any graphical model is in P. The model is first converted into a nand Markov random field form with a graph G=(V, E) and then the resulting graph is efficiently tested using the algorithm of Chudnovsky et al. If the resulting graph is perfect, the linear programming relaxation efficiently recovers the MAP estimate. Unfortunately, the current running time of the perfect graph verification algorithm prohibits practical application. Only trivially small graphical models G can be efficiently tested to date: those that map to a corresponding NMRF graph G with less than a dozen nodes. It may be helpful to consider the faster heuristic algorithm of Nikolopoulos and Palios (2004) which only requires $O(|V|+|E|^2)$. This algorithm only verifies if a graph contains any hole or chordless cycle with 5 or more nodes. Thus, if the graph and its complement contain no holes (even or odd), the algorithm can quickly confirm that G is perfect. However, if the graph contains holes, it is still unclear whether these are only even holes or if there are some odd holes in the graph. Therefore, the algorithm of Chudnovsky et al. is preferable as the conclusive test for graph perfection in that case.

We can now check some standard graphical models where MAP estimation is known to be easy to see if they indeed produce NMRFs with perfect graphs. First consider graphical models where G is a tree.

Lemma 2 A graphical model with a tree G produces an NMRF with a perfect graph G.

Proof 5 Assume G was obtained from a graph G which is a tree. Each clique $X_c$ in G forms a clique $X_c$ which separates G into two subgraphs. Each clique $X_c$ is fully connected and has no odd holes and is therefore perfect. It remains to be shown that there are no odd holes in the subgraphs across neighboring cliques $X_c$ and $X_d$. Consider two variables $x_{c,k}$ and $x_{d,l}$ from neighboring cliques that are connected by an edge. The variable $X_{c,k}$ agrees with (is disconnected from) the neighbors of $x_{d,l}$. Thus, the connections across neighboring cliques form a bipartite graph which is perfect. Since G joins perfect graphs in a tree that each individually disconnect the tree into disjoint subgraphs, there can be no odd holes and the graph G has no odd holes. The same line of reasoning can be used to show that G has no odd holes and therefore G is a perfect graph.

Next consider the case where the graphical model G corresponds to a maximum weight bipartite matching problem which is known to produce integral linear programming relaxations.

Lemma 3 The LP relaxation of the graphical model for maximum weight bipartite matching $$p(X) = \prod_{j=1}^{n} \delta\left(\sum_{j=1}^{n} x_{ij} \le 1\right) \delta\left(\sum_{j=1}^{n} x_{ji} \le 1\right) \sum_{k=1}^{n} e^{f_{ik} x_{ik}}$$

with non-negative $f_{ij} \ge 0$ and binary $x_{ij}$ for all i, j=1, ..., n is integral and produces the MAP estimate.

Proof 6 The graphical model is in NMRF form so G and G are equivalent. G is the line graph of a (complete) bipartite graph (i.e. a Rook's graph). Therefore, G is perfect, the LP is integral and recovers the MAP estimate via Theorem 2.

A generalization of the bipartite matching problem is the unipartite matching problem. It is known that the standard linear programming relaxation for such problems is not always integral. The nonintegrality of the LP in unipartite matching is why additional Blossom inequalities constraints are imposed in Edmonds' algorithm. To ensure integrality for any graph, one introduces an exponential number of Blossom inequalities: for every set of edges between an odd sized set of vertices and the remaining vertices, the sum over the set of edge weights is at least 1. However, belief propagation produces the MAP estimate in the unipartite case if the linear programming relaxation is integral. It is now possible to show when the LP is integral by once again recognizing perfect graphs and guaranteeing the convergence of belief propagation a priori.

Lemma 4 The LP relaxation of the graphical model G=(V, E) for maximum weight unipartite matching $$p(X) = \prod_{i \in V} \delta\left(\sum_{j \in Ne(i)} x_{ij} \le 1\right) \prod_{ij \in E} e^{f_{ij} x_{ij}}$$

with non-negative $f_{ij} \ge 0$ and binary $x_{ij}$ for all $ij \in E$ is integral and produces the MAP estimate if G is a perfect graph.

Proof 7 The graphical model is in NMRF form and graphs G and G are equivalent. By Theorem 2, the LP relaxation is integral and recovers the MAP estimate if G is a perfect graph.

Clearly, if the original graphical model G has some clique functions that are already nand functions (such as the matching problems), expansion into an NMRF may be wasteful. Therefore, only when the variables are involved in clique functions that are not nand structured, would the mapping from $X_c$ to $X_c$ be implemented.

In addition, the following two procedures are provided, which are useful for pruning the NMRF prior to verifying perfection of the graph as well as prior to performing MAP estimation via linear programming. Two procedures are provided: Disconnect and Merge which can be applied to G optionally. Both are efficient to apply and may simplify the NMRF without affecting the MAP estimate.

First, obtain a graph Disconnect(G) from G by applying the Disconnect procedure to all nodes in the NMRF that correspond to the minimal configurations of each clique $\psi_c(X_c)$. In other words, for each $c \in C$, denote the minimal configurations of c as the set of nodes $\{x_{c,k}\}$ for $k = \epsilon c$ such that $f_{c,k} = \min_{K=f_{c,K}} = \log(1+\epsilon)$. Disconnect removes the edges between these nodes and all other nodes in the clique $\Psi_c(X_c)$. This is because the minimal configurations, if asserted (set to unity) or otherwise, have no effect on the MAP score. Therefore, if they violate the nand relationship with other variables in $\Psi_c(X_c)$ and are set to unity in addition to the other variables in $X_c$, an equivalent MAP estimate can be found by setting these variables to zero while preserving a MAP estimate. In other words, given the MAP estimate of $\rho(X)$ in the graph Disconnect(G), if more than one setting in $X_c$ is active, only the maximal setting is preserved as a post-processing. Since minimal configurations are allowed to be redundantly asserted by the Disconnect procedure and may conflict with the true assignment, these are set to zero by a final post processing procedure. After MAP estimation, given all asserted variables in $X^*_c$, only one $x_{c,k}$ is kept asserted: the one which corresponds to the largest $f_{c,k}$ and all others which have $f_{c,k} = \log(1+\epsilon)$ get set to zero which does not change the score of the MAP estimate. The Disconnect procedure only requires $O(|V(G)|)$.

Second, apply another procedure to the current NMRF called Merge. This procedure returns a graph where nodes are merged. For any pair of disconnected nodes $x_{c,k}$ and $x_{d,l}$ in the NMRF that have the same connectivity to the rest of the graph Merge combines them into a single equivalent variable $x_{c,k}$ with the same connectivity and updates the corresponding $f_{c,k} \leftarrow f_{c,k} + f_{d,l}$. Then, following MAP estimation, the setting for $x_{d,l}$ is recovered simply by setting it to the value of $x_{c,k}$. It is straightforward to see that the procedure Merge requires no more than $O(|V(G)|^3)$. Thus, once the NMRF G is obtained, the following is obtained: $G' = \text{Merge}(\text{Disconnect}(G))$ which potentially can be more readily tested for perfection and admits more efficient MAP estimation due to the simplification of the graph. Given the MAP estimate from $G'$, it is straightforward to recover the MAP estimate for G and then reconstruct the MAP estimate of G.

While linear programming can be used to solve for the MAP configuration whenever the NMRF has a perfect graph, a faster approach is to perform message passing since such algorithms exploit the sparse graph topology more directly. Guarantees for the exactness and convergence of max-product belief propagation are known in the case of singly linked graphs, junction trees, single loop graphs and matching problems. A more convergent algorithm was recently proposed which is known as convergent message passing. For binary MAP problems, it recovers the solution to the LP relaxation.

It is thus investigated here as a natural competitor to linear programming for MAP estimation on the NMRF. To apply this method to an NMRF with graph $G=(V,E)$, it helps to rewrite the objective as follows:

$$\log \rho(X) = \sum_{ij \in E} \theta_{ij}(x_i, x_j).$$

Here are defined the following potential functions:

$$\theta_{ij} = x_i \frac{f_i}{|Ne(i)|} + x_j \frac{f_j}{|Ne(j)|} = \log \delta(x_i + x_j \leq 1)$$

where Ne(i) indicates all neighbors of the node i. The algorithm is sketched below.

---

Convergent Message Passing:

Input: Graph $(G) = (V, E)$ and $\theta_{ij}$ for $ij \in E$.
1. Initialize all messages to any value.
2. For each $ij \in E$, simultaneously update $$\lambda_{ji}(x_i) \leftarrow -\frac{1}{2} \Sigma_{k \in Ne(i)\setminus j} \lambda_{ki}(x_i) +$$

$$\frac{1}{2} \max_{x_j} [\Sigma_{k \in Ne(j)\setminus i} \lambda_{kj}(x_j) + \theta_{ij}(x_i, x_j)]$$

$$\lambda_{ij}(x_j) \leftarrow -\frac{1}{2} \Sigma_{k \in Ne(j)\setminus i} \lambda_{kj}(x_j) +$$

$$\frac{1}{2} \max_{x_i} [\Sigma_{k \in Ne(i)\setminus j} \lambda_{ki}(x_i) + \theta_{ij}(x_i, x_j)]$$

3. Repeat 2 until convergence.
4. Find $b(x_i) = \Sigma_{j \in Ne(i)} \lambda_{ji}(x_i)$ for all $i \in V$.
5. Output $x_i = \text{argmax}_{x_i} b(x_i)$ for all $i \in V$.

---

The algorithm iterates until convergence and produces approximate solution denoted $X = \{x_1, \ldots, x_N\}$. A key property of the algorithm is that it recovers the same solution as LP when the variables are binary.

Theorem 5 With binary variables $x_i$, fixed points of convergent message passing recover the optimum of the LP.

Thus, for binary problems, instead of solving the LP, it is possible to simply run message passing. We previously showed that when the graph G is a perfect graph the LP is integral and thus, in such settings, message passing recovers the MAP assignment. This permits the following corollary.

Corollary 3 Convergent message passing on an NMRF with a perfect graph finds the MAP estimate.

The above thus generalizes the possible settings in which message passing converges to the MAP estimate from singly linked graphs, single loop graphs and matching graphs to the broader set of perfect graphs.

In general, a system or method for estimating in accordance with the present disclosure can receive, obtain or generate observation data as input data. For example, observation data can include signals from sensors, radio frequency signals, or other types of signals where MAP estimation may be useful. The input data may be in graphical model form when inputted, or the input data may represent raw observation data that can be combined with belief data to form a graphical model of the observation data. The belief data can include a belief network or other information characterizing the observation data.

Next, a nand Markov random field (NMRF) is obtained. The NMRF can be a previously generated NMRF that is retrieved from a data storage device. The retrieved NMRF can be used as is, or may be modified based on the observation data. For example, the NMRF weights, connectivity, or both may be modified based on the observation data, depending on a contemplated MAP estimate application. Alternatively, the NMRF can be generated based on the graphical model of the observation data.

Once the NMRF is obtained, it can be solved for the maximum a posteriori estimate configuration. There are at least three methods for solving the NMRF to obtain the MAP estimate: convergent message passing, linear programming, and semidefinite programming of a Lovasz theta function.

The convergent message passing can done using a fixed degree variant (see, e.g., FIGS. 9-12 and corresponding description below) or a degree distribution variant (see, e.g., FIGS. 13-24, and corresponding description). The convergent message passing can be performed on an NMRF that is unipartite or bipartite. Further, the messages being passed in the convergent message passing can be of a single scalar type or of a multiple scalar type (see, e.g., description of 514 of FIG. 5 below).

Once the MAP estimate configuration of the NMRF is obtained, it can be used directly or mapped back into the original graphical model for use in downstream processing. For example, in an image processing problem for distinguishing foreground from background, the MAP estimate may be used directly to indicate a binary condition (e.g., 0=background, 1=foreground) or may be mapped back in to the original graphical model to produce an output based on the MAP estimate (e.g., a result image showing only the foreground pixels of the input image).

FIGS. 1C-1E are diagrams showing high-level data flows for various techniques of using an NMRF to generate an output from observation data, according to some embodiments of the disclosed subject matter. In particular, FIG. 1C shows observation data 102 and an NMRF 104 being provided to a processor 106 as input. In FIG. 1C, the NMRF 104 is a preexisting NMRF that is retrieved from a data storage device, for example. The NMRF 104 can contain conditional dependencies. The NMRF 104 can be used as is, or may be modified based on the observation data 102. For example, weights, connectivity, or both, of the NMRF 104 may be modified based on the observation data 102, depending on a contemplated MAP estimate application.

The processor 106 is programmed to determine a MAP estimate configuration of the NMRF 104, which is represented as X* 108. X* 108 represents the best possible solution for the NMRF 104 that gives the largest value of p(X) or, more precisely, p(X|O) the "probability of X given observations O." X* 108 can be, or can be convertible to, an output image, a cleared up signal, recognized features, or the like, depending on a particular application.

FIG. 1D shows observation data 110 and a belief model 112 being combined by a processor 114 to generate an NMRF 116, which can then be solved to obtain X* 118. In the configuration of FIG. 1D, the NMRF 116 is created based on the observation data 110 and belief model 112. The NMRF 116 can contain conditional dependencies. The approach shown in FIG. 1C can be used for solving problems in which a preexisting NMRF would not be desirable. For example, in situations where observation data 110 may affect table entries inside the $\Psi_c(X_c)$ tables of the NMRF 116 or may affect connectivity of the NMRF 116, it may be beneficial to regenerate the NMRF based on each received set of observation data 110.

FIG. 1E shows observation data 120 and a belief model 122 being combined by a processor 124 to generate an NMRF 126. Similar to the configuration of FIG. 1D, in the configuration shown in FIG. 1E, the NMRF 126 is created and/or modified based on the observation data 120 and belief model 122.

The observation data (102, 110 and 120) may be an input image, sensor data, or encrypted or corrupted communication signals, or the like. The X* (108, 118 and 132) can be, or can be convertible to, an output image, a cleared up signal, recognized features, or the like, depending on a particular application.

Once the NMRF 126 has been generated, it can be determined at 128 whether the NMRF 126 has a perfect graph structure. If the NMRF 126 has a perfect graph structure, X* 132 is generated. If the NMRF 126 does not have a perfect graph structure, the system can take an alternative action 130, such as discarding the NMRF 126 and/or outputting an indication that the NMRF 126 did not contain a perfect graph. The alternative action 130 could also include continuing to solve for X* 132 despite the lack of perfect graph structure in the NMRF 126. An indication of the absence of a perfect graph structure can be provided so that a result of the continuing to solve can be evaluated with the knowledge that X* 132 may exhibit different properties in cases where a perfect graph structure does not exist and/or the solving process may need to be altered to accommodate the non-perfect NMRF 126 (e.g., a different termination condition may need to be used in case solving the non-perfect NMRF 126 does not converge).

Figure 2:
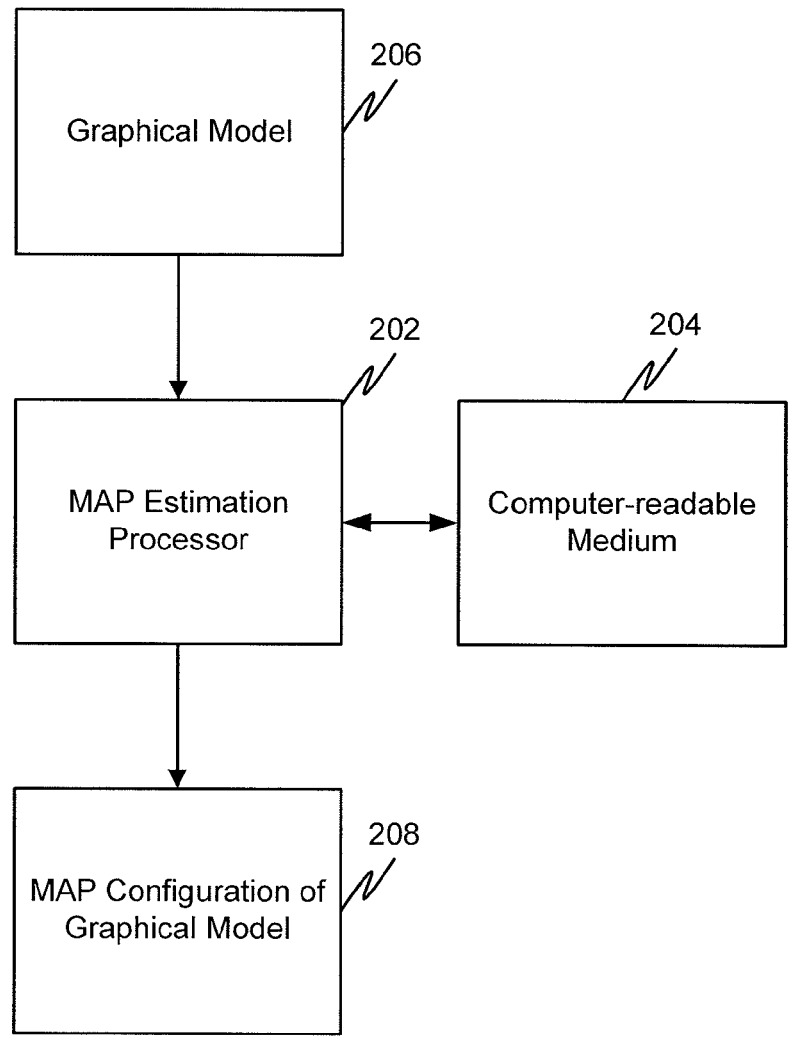
FIG. 2 is a system for MAP estimation of a graphical model, according to some embodiments of the disclosed subject matter.

FIG. 2 is a system for MAP estimation of a graphical model, according to some embodiments of the disclosed subject matter. In particular, the system 200 includes a MAP estimation processor 202 coupled to a computer-readable medium 204. The computer-readable medium 204 can be used to store and retrieve program code and data. The computer-readable medium can include an electronic (e.g., RAM, ROM, flash memory, EEPROM, or the like), optical (CDROM, DVD, or the like) or magnetic (hard disk, floppy disk, or the like) data storage medium.

In operation, the MAP estimation processor 202 receives a graphical model 206 as input. For example, the input could be represented by a graphical model characterizing what is to be inferred from received observed data. Let us call the observations O and the answer (or solution) being sought X. Or, more concretely, X*, the best possible solution for X that gives the largest value of p(X) or, more precisely, p(X|O) the "probability of X given observations O." For example, in an image processing problem, the observations O might be pixel values and X might be a labeling of the pixels as foreground/background.

In addition to providing observation data O, a graphical model may also be specified which indicates how some X's interact with each other (e.g., it is unlikely to have a foreground pixel surrounded on all sides with background pixels). Essentially, the observations "O" can help determine what data to put as table values in the clique functions $\Psi hd c(X_c)$. Once this is done, the processor can compute or solve the problem of finding X which maximizes p(X) which is a product of the clique functions.

Using techniques described herein, the MAP estimation processor produces a MAP configuration 208 of the graphical model 206 as output.

The MAP estimation processor 202 can include a microprocessor, microcontroller, digital signal processor, FPGA, ASIC or the like. Also, the MAP estimation processor 202 can be a single processor or a co-located or distributed multiprocessor system, having a parallel processing architecture, a cloud computing architecture or the like.

Figure 3:
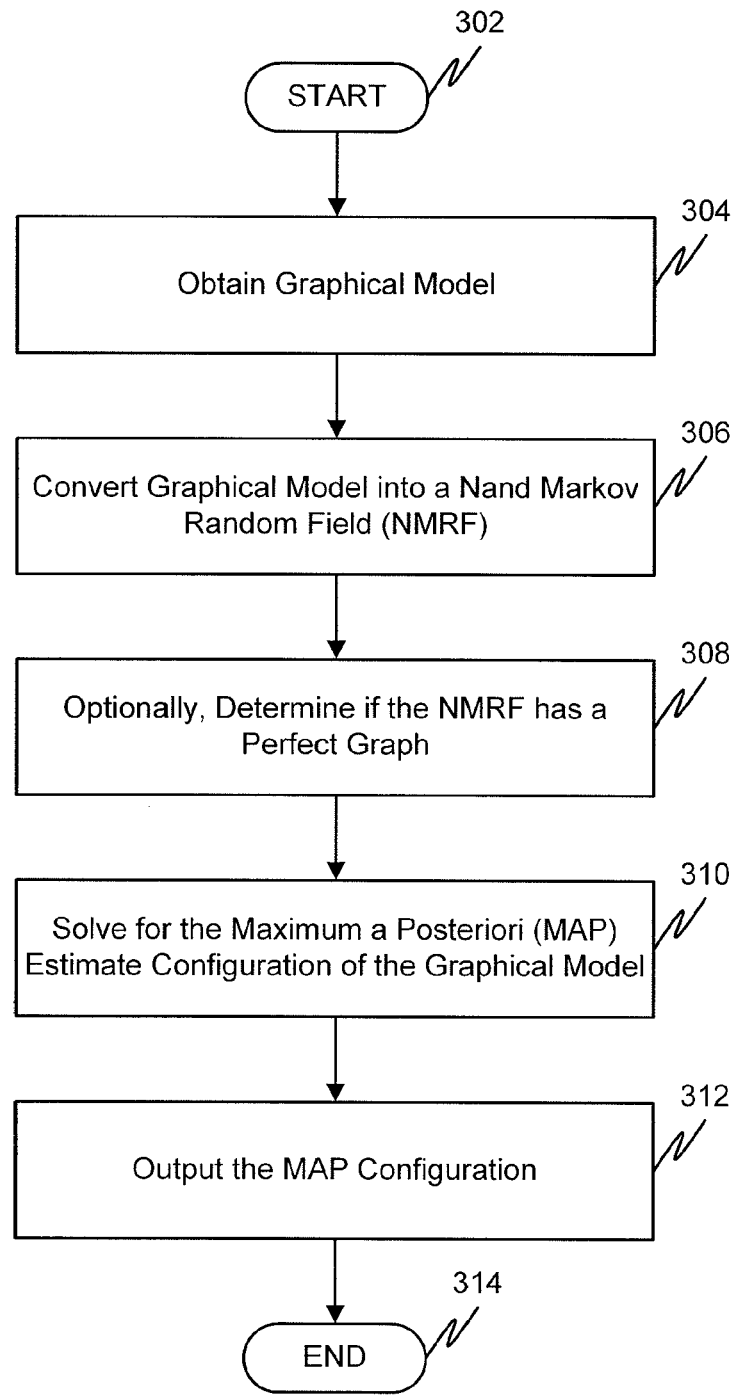
FIG. 3 is a chart showing a method for MAP estimation of a graphical model, according to some embodiments of the disclosed subject matter.

FIG. 3 is a chart showing a method 300 for MAP estimation of a graphical model, according to some embodiments of the disclosed subject matter. Processing begins at 302 and continues to 304.

At 304, a graphical model is obtained. For example, the graphical model can represent a probability distribution over variables. Also, the graphical model can represent observation data that has been combined with belief data provided in a graphical model framework. Processing continues to 306.

At 306, the graphical model is converted into a nand Markov random field (NMRF) or a pre-existing NMRF is retrieved from data storage. The NMRF can be created by initializing an empty graph data structure and populating the empty graph data structure according to the algorithm presented above. In some situations, the receiver will not need to create a different NMRF for each situation (e.g., each set of observations). However, since the observations can affect the table entries inside the $\Psi_c(X_c)$ tables and the NMRF connectivity can depend on those values, there may be situations where the NMRF connectivity changes depending on the input. Further, when using a pre-existing NMRF, the NMRF may be adjusted according to the received observation data or used as is. For example, there may be some situations where the observation data may affect the "weights" on the NMRF nodes and there may be other situations where the observation data may affect both the "weights" and the "connectivity" of the NMRF. In some situations, the NMRF structure will be the same regardless of the observation data, for example, when executing a b-matching problem with an NMRF. However, a situation may occur in which observation data (e.g., a radio signal) may require creating a new NMRF different than a stored pre-existing NMRF. Processing continues to 308.

At 308, optionally, it is determined whether the NMRF has a perfect graph structure. This determination can be accomplished using linear programming or through the use of the Berge algorithm, which determines if the graph is a Berge graph. This step can be skipped in applications where it may be more efficient to proceed straight to solving the NMRF. Processing continues to 310.

At 310, the NMRF is solved for a MAP estimate configuration. Processing continues to 312.

At 312, the MAP configuration is output. The output can be in the form of an electronic transmission to another system, a graphical display or other electronic signal. Processing continues to 314, where processing ends.

It will be appreciated that 304-312 can be repeated in whole or in part in order to accomplish a contemplated MAP estimate task.

The method of FIG. 3 can be implemented via a programmed processor having access to software instructions stored on a computer-readable medium. The software instructions, when executed, cause the processor to perform operations. For example, the software instruction can cause operations to be performed according to the pseudo code listed below:

```
// Begin Pseudo Code
Input: graphical model G representing probability distribution over
variables X where objective is a product of functions on cliques c
in the graph:
p(X) = 1/Z \prod_c \psi_c(X_c)
For each \psi_c
    For min over all \psi_c(X_c) \neq 0
        Replace each \psi_c(X_c) with \psi_c(X_c)/min
```

-continued

```
Initialize H as an empty graph
For each clique c in graph G do {
    For each configuration k in X__c where \psi__c(k) > 1 do {
        add a corresponding binary node y__{c,k} to H
        set weight of y__{c,k} equal to \log \psi__c(k)
        For each y__{d,l} in H which is incompatible with y__{c,k}
            connect y__{c,k} and y__{d,l} with an edge
    }
}
// Merge:
Until converged:
    For each connected pair y__{c,k} and y__{d,l} with same neighborhood
        replace y__{d,l} with y__{c,k} and set new weight to max of old
        weights
    For each unconnected pair y__{c,k} and y__{d,l} with same
    neighborhood
        replace y__{d,l} with y__{c,k} and set new weight to sum of old
        weights
// Solve:
Provide resulting nand Markov Random Field H to maximum weight
independent set solver which can be any one of the following:
    a) Convergent message passing (see description of FIG. 5 below)
    b) Linear programming algorithm
    c) Semidefinite programming of Lovasz theta function
Convert solution on y on H to solution on X in original graphical model G
// End pseudo code
```

Figure 4:
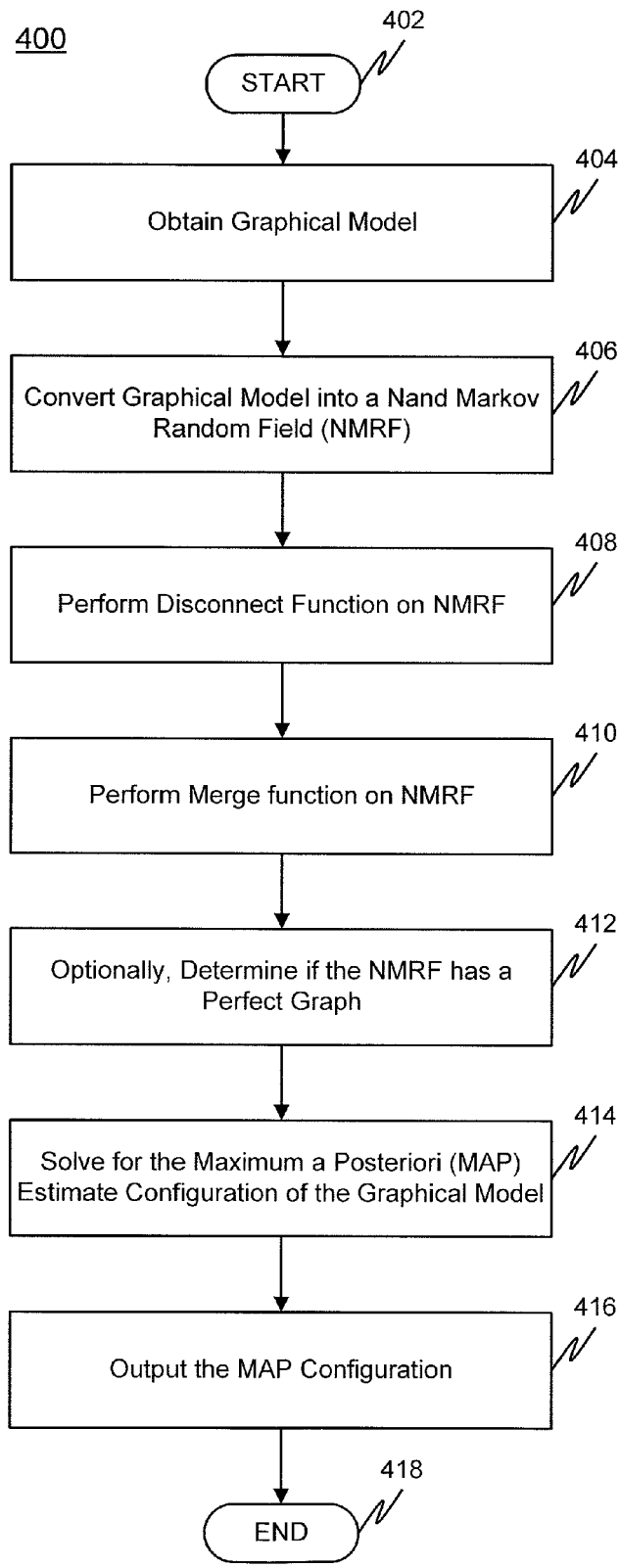
FIG. 4 is a chart showing a method for MAP estimation of a graphical model, according to some embodiments of the disclosed subject matter.

FIG. 4 is a chart showing a method 400 for MAP estimation of a graphical model, according to some embodiments of the disclosed subject matter. Processing begins at 402 and continues to 404.

At 404, a graphical model is obtained. The graphical model may be received as input data or may be generated based on received input data (e.g., observation data) as described above. Processing continues to 406.

At 406, the graphical model is converted into a nand Markov random field (NMRF) or a pre-existing NMRF is retrieved from storage. Processing continues to 408.

At 408, the NMRF is pruned by first applying the disconnect function and then, at 410, by applying the merge function. Processing continues to 412.

At 412, it is determined whether the NMRF has a perfect graph structure. This determination can be accomplished using linear programming or through the use of the Berge algorithm, which determines if the graph is a Berge graph. Processing continues to 414.

At 414, if it has been determined that the graph has a perfect graph structure, the NMRF is solved for a MAP estimate configuration. Processing continues to 416.

At 416, the MAP configuration is output. The output can be in the form of an electronic transmission to another system, a graphical display or other electronic signal. Processing continues to 418, where processing ends.

It will be appreciated that 404-416 can be repeated in whole or in part in order to accomplish a contemplated MAP estimate task.

Figure 5:
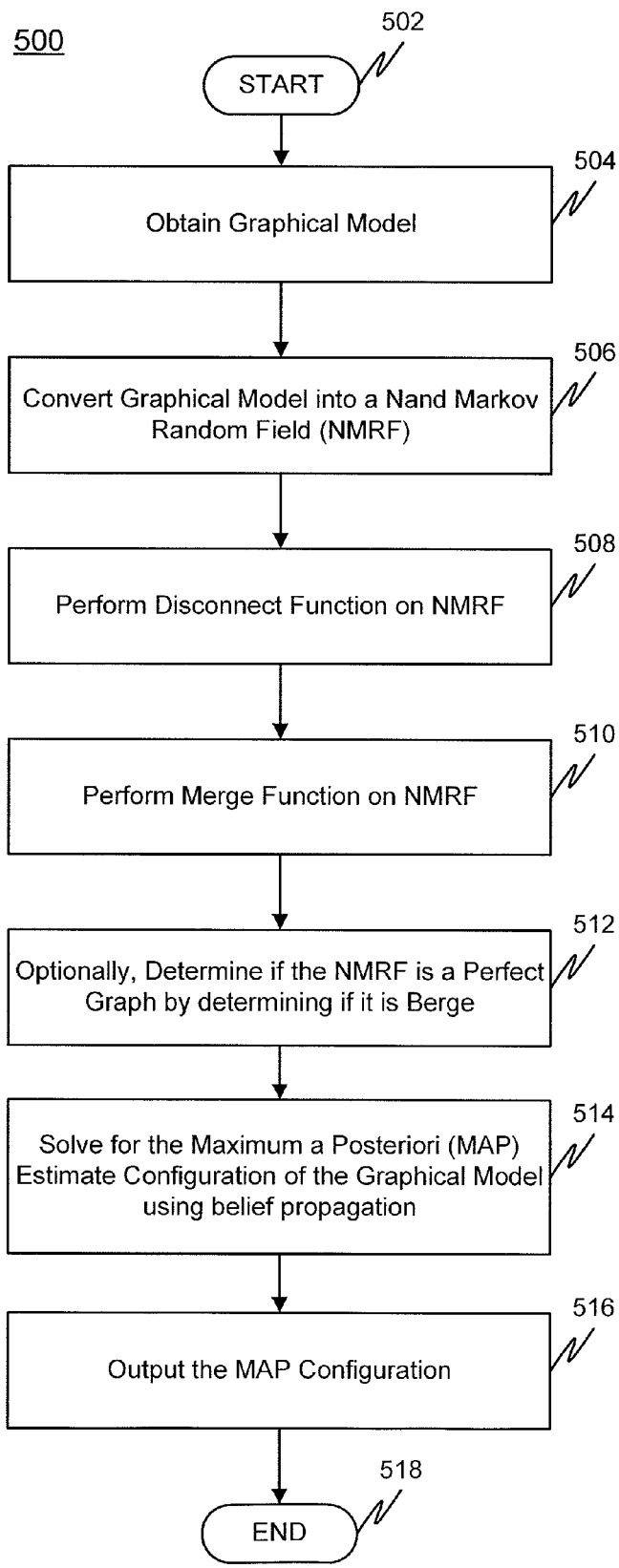
FIG. 5 is a chart showing a method for MAP estimation of a graphical model, according to some embodiments of the disclosed subject matter.

FIG. 5 is a chart showing a method 500 for MAP estimation of a graphical model, according to some embodiments of the disclosed subject matter. Processing begins at 502 and continues to 504.

At 504, a graphical model is obtained. The graphical model representing observation data. Processing continues to 506.

At 506, the graphical model is converted into a nand Markov random field (NMRF). Processing continues to 508.

At 508, the NMRF is pruned by applying the disconnect function and then, at 510, by applying the merge function. Processing continues to 512.

At 512, optionally, it is determined whether the NMRF has a perfect graph structure. This determination can be accomplished using linear programming or through the use of the Berge algorithm, which determines if the graph is a Berge graph. Processing continues to 414.

At 514, the NMRF is solved for a MAP estimate configuration using a belief propagation technique described below. For example, the processing at 514 can be implemented as software instructions stored on a nontransitory computer readable storage medium. A non-transitory computer readable storage medium includes a hard drive, a compact disc, flash memory, volatile memory, an optical memory, an optical loop memory, a loop memory, a regenerated memory, a removable memory, RAM, ROM, PROM, EPROM, EEPROM, cache, remote memory, local memory, buffer, and any other non-transitory medium but does not include a transitory signal per se. The software instructions, when executed, cause a processor to perform belief propagation according to the following pseudo code:

```
Begin Pseudo Code
// define data structures and variables
data structure GraphNode {   float received_msgs_mu[ max_num_of_neighbors ];
                             float received_msgs_nu[ max_num_of_neighbors ]};
GraphNode node_group_1 [num_group1_nodes];
GraphNode node_group_2 [num_group2_nodes];
int Profit_Matrix [num_group1_nodes] [num_group2_nodes];
int b=3;
Boolean Message_Changed = true;
// to compute messages first time around
initialize all received_msgs_mu and received_msgs_nu to 1;
initialize Profit_Matrix with bid values;
// start a main loop to continue until no messages are changed
while ( Message_Changed == true ) {
    Message_Changed = false; // switch off loop unless a message changes
    // send messages from node_group_1 to node_group_2
    for i=1 to num_group1_nodes {
        for j=1 to num_group2_nodes {
        sorted_msgs[ ] =
            sorted list of node_group_1[i].received_msgs_mu[ ] *
                corresponding exp(Profit_Matrix[ ][ ]) values
                excluding that from node group 2 node j combined with
                node_group_1[i].received_msgs_nu[ ] *
                corresponding exp(Profit_Matrix[ ][ ]) values
                excluding that from node group 2 node j;
            L = original index of sorted_msgs[b]; // get index (or
                node) of the bth received msg*profit;
            old_rcvd_msg_mu = node_group_2[j].received_msgs_mu[i];
            old_rcvd_msg_nu = node_group_2[j].received_msgs_nu[i];
            node_group_2[j].received_msgs_mu[i] =
                exp(Profit_Matrix[i][j]) / (exp(Profit_Matrix[i][L]) *
                node_group_1[i].received_msgs_mu[L]);
            node_group_2[j].received_msgs_nu[i] =
                exp(Profit_Matrix[i][j]) / (exp(Profit_Matrix[i][L]) *
                node_group_1[i].received_msgs_nu[L]);
            if old_rcvd_msg_mu not equal to node_group_2[j].received_msgs_mu[i] or
                old_rcvd_msg_nu not equal to
                    node_group_2[j].received_msgs_nu[i]
                then Message_Changed = true;
        } end j loop
    } end i loop
    // send messages from node_group_2 to node_group_1
    for j=1 to num_group2_nodes {
        for i=1 to num_group1_nodes {
            sorted_msgs[ ] = sorted list of node_group_2[j].received_msgs_mu[ ] *
                corresponding exp(Profit_Matrix[ ][ ]) values
                excluding that from node group 1 node I combined with
                node_group_2[j].received_msgs_nu[ ] *
                corresponding exp(Profit_Matrix[ ][ ]) values
                excluding that from node group 1 node i;
            L = original index of sorted_msgs[b]; // get index (or
                node) of the bth received msg*profit;
            old_rcvd_msg_mu = node_group_1[i].received_msgs_mu[j];
            old_rcvd_msg_nu = node_group_1[i].received_msgs_nu[j];
            node_group_1[i].received_msgs_mu[j] =
                exp(Profit_Matrix[i][j]) / (exp(Profit_Matrix[L][j]) *
                node_group_2[j].received_msgs_mu[L]);
            node_group_1[i].received_msgs_nu[j] =
                exp(Profit_Matrix[i][j]) / (exp(Profit_Matrix[L][j]) *
                node_group_2[j].received_msgs_nu[L]);
            if old_rcvd_msg_mu not equal to node_group_1[i].received_msgs_mu[j] or
                old_rcvd_msg_nu not equal to node_group_1[i].received_msgs_nu[j]
                then Message_Changed = true;
        } end i loop
    } end j loop
} end while loop - we are now done - no messages are changing
// now get the belief values for a node of interest
for i=1 to num_group1_nodes {
    result = phi function - max of {0, sum function of node_group_2[node of
```

-continued interest].received_msgs_mu[i]; (see equation details below)
    belief_values[i] = 1 if result is positive or 0 if result is negative;
} end i loop
output belief_values[ ];
End Pseudo Code The above pseudo code represents an example of a linear implementation of the belief propagation method described generally below. Several simplifications have been made for purposes of illustration including assuming that each node exchanges messages with all nodes of the corresponding type. In an actual implementation, nodes may only exchange messages with their respective neighbor nodes. Also, the pseudo code example continues until no messages are changed. As described herein, there are other termination conditions that can be used with the belief propagation method. As mentioned above, the b value for the original graph nodes is constant set to the size of one of the groups of the original graph structure (e.g., n) for all.

The belief propagation module can be a general-purpose computer adapted for generalized matching using belief propagation, one or more a special-purpose computers for generalized matching using belief propagation, a programmed microprocessor or microcontroller and peripheral integrated circuit element, an ASIC or other integrated circuit, a digital signal processor, a hardwired electronic or logic circuit such as a discrete element circuit, a programmed logic device such as a PLD, PLA, FPGA, PAL, or the like.

The computer-readable medium can be a data storage system such as a relational database or any other suitable arrangement of data. The data can be stored in a physical computer readable media such as a volatile or nonvolatile electronic memory, a magnetic storage device, and/or an optical storage device, or any known or later developed computer readable media.

The pseudo code above contains another difference with respect to the messages being passed when compared to the more general approach described below. The above pseudo code contains a message have two scalar values (e.g., mu and nu). Earlier belief propagation techniques have employed a single scalar value as the message. For example, one earlier technique, which may not have been guaranteed to converge, passed a message and provided a result according to the following equations:

$$\mu_{ij} = \max\left\{\begin{array}{c}\theta_{ij}^{01}, \theta_{ij}^{11} + \theta_i^1 - \theta_i^0 + \\ \sum_{k \in Ne(i)\backslash j} \mu_{ki}\end{array}\right\} - \max\left\{\begin{array}{c}\theta_{ij}^{00}, \theta_{ij}^{10} + \theta_i^1 - \theta_i^0 + \\ \sum_{k \in Ne(i)\backslash j} \mu_{ki}\end{array}\right\}$$

$$\log \frac{P(x_i = 1)}{P(x_i = 0)} = \theta_i^1 - \theta_i^0 + \sum_{k \in Ne(i)\backslash j} \mu_{ki}$$

Another earlier technique, which may have been guaranteed to converge, passed a message according to the following equation:

$$\mu_{ij} = -\frac{1}{2}\sum_{k \in Ne(i)\backslash i} \mu_{kj} +$$

-continued $$\frac{1}{2}\max\left\{\theta_{ij}^{11} + \sum_{k \in Ne(i)\backslash j} \mu_{ki}, \theta_{ij}^{01}\right\} - \frac{1}{2}\max\left\{\theta_{ij}^{10} + \sum_{k \in Ne(i)\backslash j} \mu_{ki}, \theta_{ij}^{00}\right\}$$

The pseudo code above incorporates two different types of messages. Each node sends both types of messages to its connected neighbor nodes. Recipient nodes receive and process both messages from a neighbor node. As can be seen in the message equations below that have been developed for solving an Ising problem, each equation contains a max function. Once the message passing using the two message types converges or another termination condition is met, the nodes can be set to a binary result value based on the third equation below.

$$\lambda_{ij \to i}^{11 \to 0} = \mu_{ji}$$

$$= -\frac{1}{4}\sum_{k \in Ne(i)\backslash j} \mu_{ki} + \frac{1}{4}\mu_{ij} - \frac{1}{4}(\theta_i^0 - \theta_i^1) -$$

$$\max\left\{0, \frac{1}{2}\nu_{ji} + \frac{1}{4}\theta_{ij}^{11}\right\}$$

$$\lambda_{i \to ij}^{0 \to 11} = \nu_{ij}$$

$$= -\frac{1}{2}\nu_{ji} + \frac{1}{4}\theta_{ij}^{11} -$$

$$\max\left\{0, \frac{1}{4}\sum_{k \in Ne(i)\backslash j} \mu_{ki} - \frac{1}{4}\mu_{ij} + \frac{1}{4}(\theta_i^0 - \theta_i^1)\right\}$$

$$\log \frac{P(x_i = 1)}{P(x_i = 0)} = \frac{1}{2}\theta_i^1 - \max\left\{0, \frac{1}{2}\sum_{k \in Ne(i)} \mu_{ki} + \frac{1}{2}\theta_i^0\right\}$$

The above message value equations follow the variable naming conventions discussed above.

Once the belief propagation message passing converges or is otherwise terminated, processing continues to 516.

At 516, the MAP configuration is output. The output can be in the form of an electronic transmission to another system, a graphical display or other electronic signal. The output can be direct from the transformed NMRF graphical model, or the NMRF result can be mapped back into the original input graphical model for output. Processing continues to 518, where processing ends.

It will be appreciated that 504-516 can be repeated in whole or in part in order to accomplish a contemplated MAP estimate task.

Figure 6:
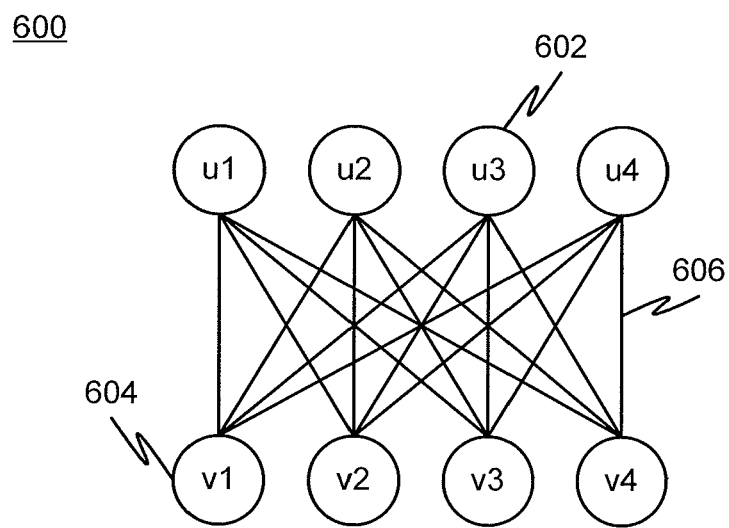
FIG. 6 is a schematic diagram of a graphical matching problem represented as a bipartite graph showing unmatched elements.
Figure 7:
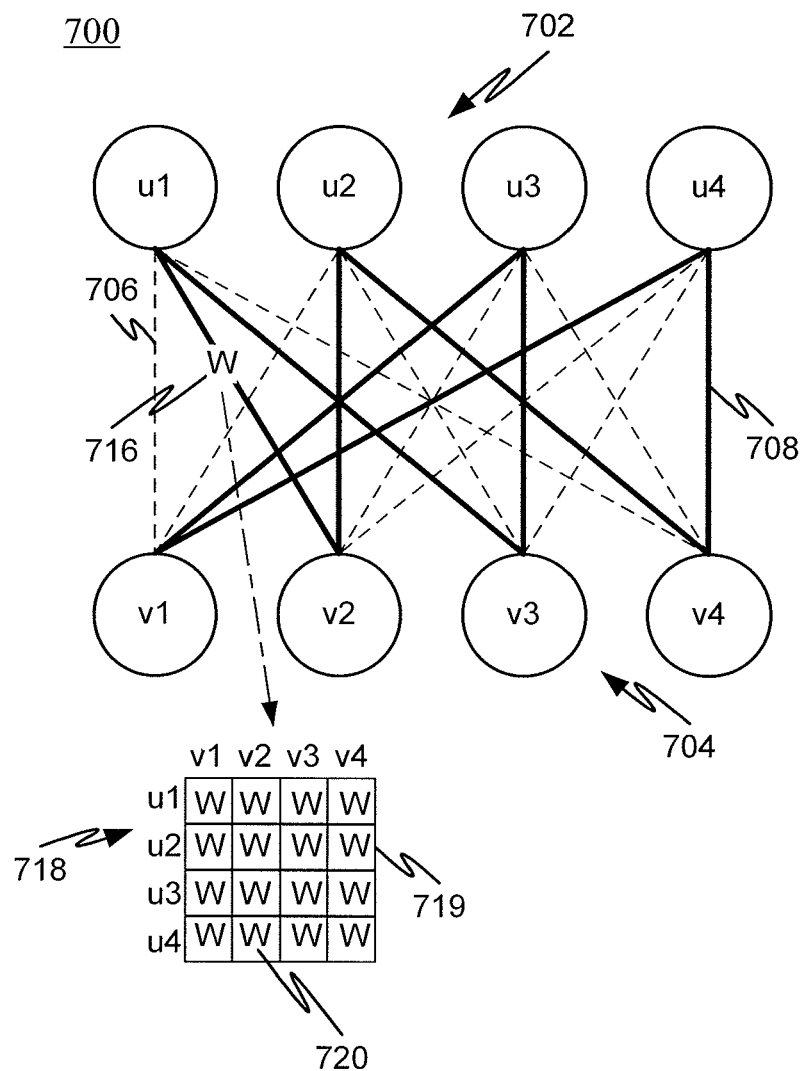
FIG. 7 is a schematic diagram of a matching problem represented as a bipartite graph showing matched elements, unmatched elements and a weight matrix, according to some embodiments of the disclosed subject matter.

FIGS. 6 and 7 are schematic diagrams of a matching problem represented as a bipartite graph. FIG. 6 shows unmatched elements, while FIG. 7 shows matched elements, unmatched elements and a weight matrix.

In FIG. 6, a bipartite graph 600 is shown having a first group of nodes 602 (u1-u4) matched to a second group of nodes 604 (v1-v4) potentially connected by edges 606.

In FIG. 7, a bipartite graph 700 shows a first group of nodes 702 (u1-u4) matched to a second group of nodes 704 (v1-v4).

The first group may represent a first group of entities or things such as goods, people, or resources and the second group may represent a second group of entities or things such as consumers, people, or resource users. The nature of the objects or entities that can make up these first and second groups are numerous as should be clear from the instant disclosure, but a common feature in most embodiments is that entities of the first group are to be matched to entities of the second group as a part of some kind of a transaction and the precise matching may correspond to some kind of aggregate value such as maximum total revenue. The matching problem posed by the context of the particular first and second groups and the aggregate value sought may also involve constraints such as the number of first group of things that are to be matched to a given second group of thing. Groups could be distinguished by any classification and groupings are not limited by the examples given.

In FIG. 7, dashed lines (e.g., 706) represent possible edges and solid lines (e.g., 708) represent b-matched edges. By b-matched, it is meant that the problem illustrated results in a desired b matches between each of the first group of things to one or more second group of things. In the case shown on the bipartite graph 700, b=2 for each node of groups 702 and 704, so that each node 702 or 704 is connected to two other nodes 704 or 702 with matched edges 708.

Typically, the information representing the potential assignment as indicated by all of the lines 706 and 708 can be supplemented with additional information, generally, weights, which indicate something about the value or cost associated with making each assignment. Here a weight W value of an edge is represented at 716. This weight information may serve as a basis for selecting an assignment that provides some optimum or provides a basis for discriminating the goodness of one assignment scheme versus another. The additional information may be represented in the form of any suitable data structure to store a weight for each edge, such as a weight matrix 718 with each row corresponding to a member of the first group and each column corresponding to a member of the second group with each cell 720 at an intersections indicating the respective weight of an edge connecting each pair of members. The weight matrix 718 represents different weights for each combination of buyer and seller.

The problem of matching of members of one group to another can be described in terms of a bipartite graph. Given a bipartite graph (which can be represented by 700) and associated weight data, a method can be used to perform a matching based on belief propagation. Here the example of a situation where it is desired to match suppliers with customers will be used to illustrate the method. One or more computers may be provided with information defining supplier and customers, which are referred here to as "nodes" which information may be considered to define a bipartite graph 700. Each supplier node (u 702 or v 704) is connected to a customer node (v 704 or u 702) by an edge 708 so the one or more computers are supplied with the potential edges 708 of all the nodes 702, 704 mapping from a supplier node to a customer node. The one or more computers are also provided with access to weight data, for example a matrix 718 with a weight value 719 for each edge of the bipartite graph data structure. The process executed by the one or more computers is such that information is recorded and updated for each respective node, such that a subprocess is performed for each node that communicates with other nodes. In this example, the weight data may be total cost of goods and the optimum matching would coincide with maximum exchange of revenue between buyers and sellers.

Figure 8:
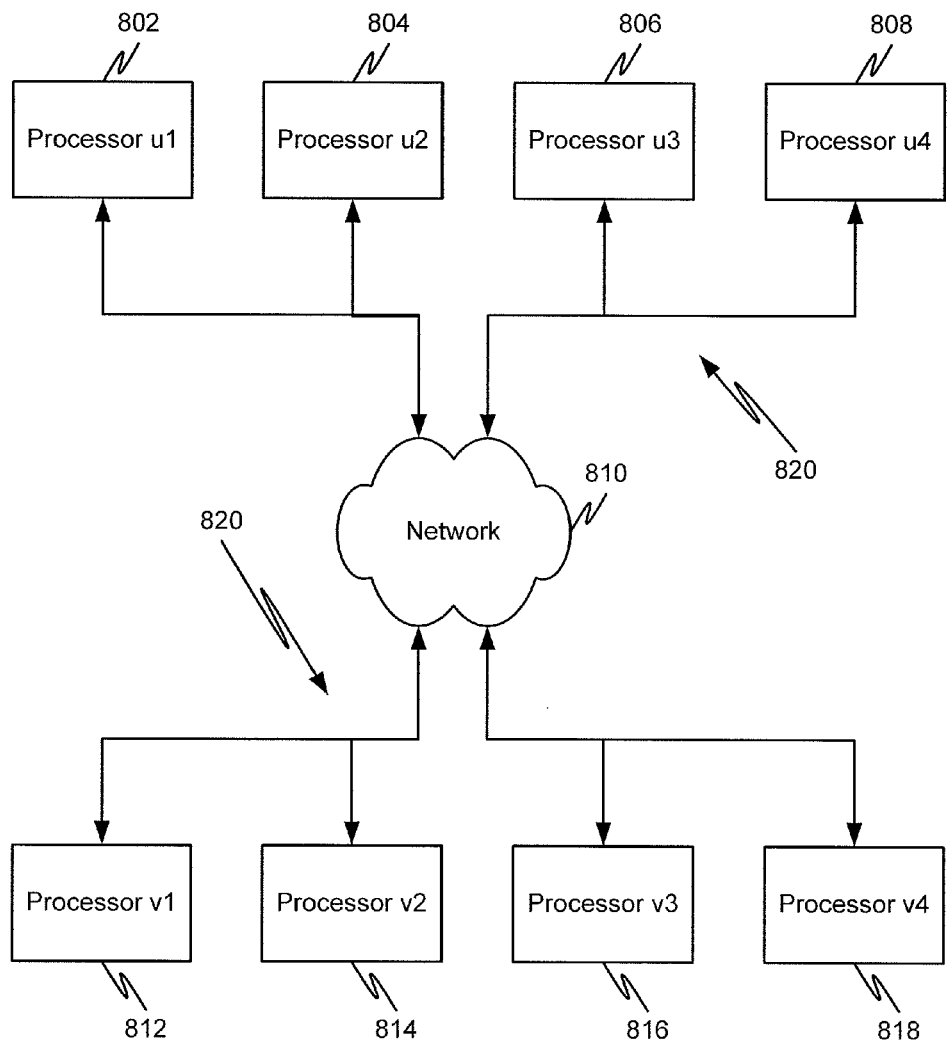
FIG. 8 is a diagram of an arrangement for distributed processing for performing MAP estimation and/or belief propagation according to some embodiments of the disclosed subject matter.

Referring now also to FIG. 8, according to this and other embodiments, the matching problem may be distributed in a system 800 among multiple processors 802-808 and 812-818 communicating over a network 810 such that each can send and receive messages via wired or wireless links being depicted figuratively as connecting lines 820. For the present example, each node shown in FIG. 7 may correspond to a respective node processor 802-808 and 812-818 in FIG. 8. An alternative would be that each processor would correspond to multiple nodes, but for the sake of discussion, the case where there is a separate processor for each node will be assumed. In such a case only a portion of the weight data in the weight matrix 718 may be provided to each supplier node processor (802-808), the portion being sufficient to indicate the weights of the edges that connect each supplier to all its potential customers (e.g., all the other customers). Similarly, only a portion of the weight matrix 718 may be provided to each customer node processor (812-818) indicating the weights of the edges that connect the customer to all its potential suppliers. The node processors can access the respective weight information on common (e.g. central) or distributed data stores (e.g., respective of each node or community of node processors).

FIG. 8 is a diagram of an arrangement of distributed processors for generalized matching using belief propagation according to some embodiments of the disclosed subject matter. In particular, in this example, a first group of node processors (802-808) correspond to nodes u1-u4 of the graph shown in FIG. 7, respectively. A second group of node processors (812-818) correspond to nodes v1-v4 of the graph shown in FIG. 7, respectively. Each of the node processors (802-808 and 812-818) are independently coupled to a network 810 (e.g., the Internet, a local area network, wide area network, wireless network, virtual private network, custom network, bus, backplane, or the like). By being interconnected through the network 810, each of the node processors (802-808 and 812-818) can communicate with the others and send/receive messages according to the belief propagation method described above. Also, each of the node processors (802-808 and 812-818) can be queried independently for its b-matched list generated by the belief propagation method described above. Not only can each node be independently queried, but each node can arrive at its optimal b-matched solution without requiring knowledge of the other nodes' solutions (i.e., the belief propagation method is "privacy protecting" with respect to each node).

The solutions for each node can be aggregated in a central data storage location or may be retained individually at each node, or grouped according to a criterion (e.g., grouping all supplier matches into a list and all customer matches into another list).

The network 810 can be a network such as the Internet, a local area network (LAN), a wide area network (WAN), a virtual private network (VPN), a direct connection network (or point-to-point), or the like. In general, the network can include one or more now known or later developed technologies for communicating information that would be suitable for performing the functions described above. The selection of network components and technologies can depend on a contemplated embodiment.

In FIG. 8, one processor is shown for each node for clarity and simplicity of illustrating and describing features of an embodiment. It will be appreciated that each processor may perform the belief propagation method for more than one node.

A matching can be obtained that progressively seeks an optimization of the above problem by having each customer node keep a score of, for example, how much better buying from each supplier node is than buying from other suppliers. Also, each buyer node may keep a score of how much better selling to each customer node is than selling to other customers. Initially, the score may be just the dollar values represented by the weights. In the process described below, figuratively speaking, as the scores are updated, the supplier nodes tell the customer nodes how much potential money is lost if they are chosen according to their current scores and the customers tell the suppliers similarly. All the scores are continuously updated using this data which may be described as passing messages among the nodes, where the messages contain the information to keep score. Eventually, if the scores are updated according to subject matter described below, the scores progress toward an optimum sorted list of suppliers for each customer and a sorted list of customers for each supplier. Then each supplier or customer node's information can be used to select that supplier or customer's best one or more matches.

In the approach described, each node updates a value corresponding to each of the supplier nodes and customer nodes, with a processor. The process may be described as "belief propagation," and entails passing messages between adjacent nodes. An important aspect of the approach is knowing when to stop passing messages and determine the best matchings from the node's data. Because the approach progresses toward an optimal solution, the basis for sorting the matches by each node gets better and better as each message is processed. Thus, the one or more one or more computers could be programmed to stop after a period of time or after a threshold number of messages. An optimal solution can be obtained upon the realization of another termination condition as described below.

Once the termination condition is met, the one or more computers, a predetermined number of supplier nodes and a predetermined number of respective customer nodes matching each selected supplier node, may be selected and provided to a client process, for example the matchings may be displayed on a terminal for a user to see.

Note that the graphs 600, 700 and 800 include a limited number of nodes and edges for illustration purposes. The number of nodes and edges in an actual graph data structure for the embodiments described below may include a greater or lesser number of nodes/edges than the number of nodes/edges shown in FIGS. 6-8. Also, the b value for each node in a particular implementation may be assigned a value other than 2 depending on the contemplated matching problem to be solved by the implementation.

Figure 9:
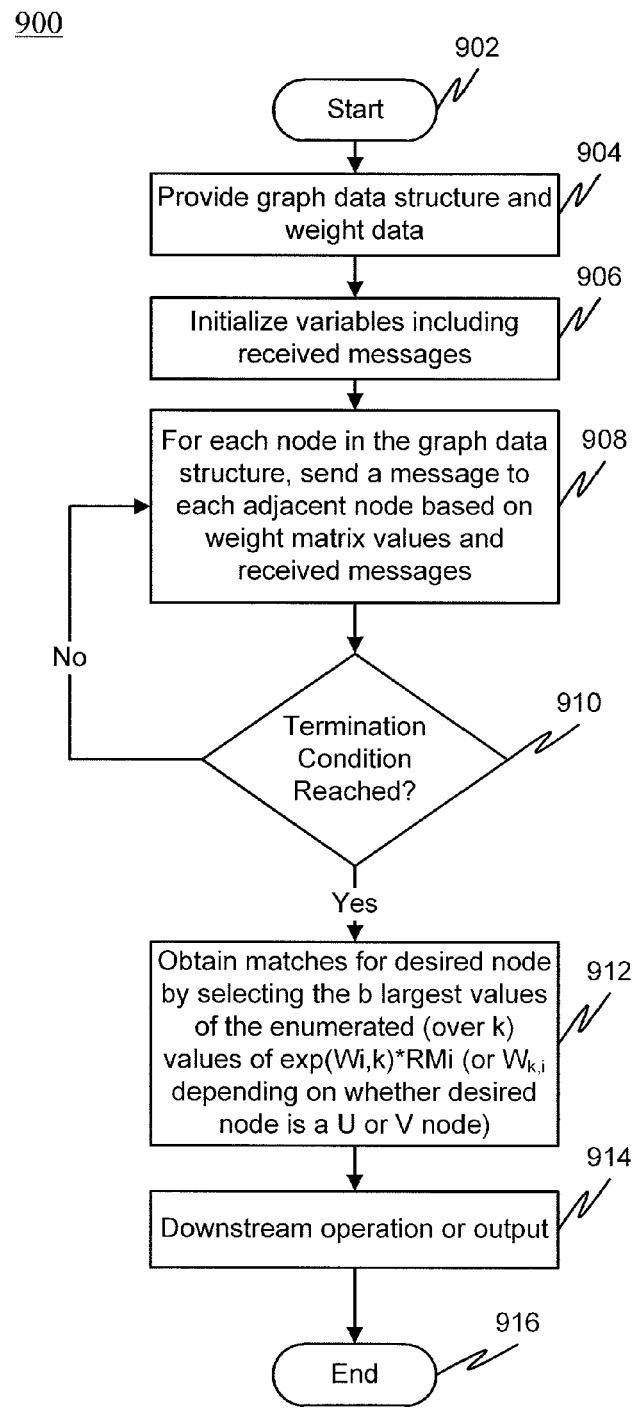
FIG. 9 is a chart of a method for matching a first class of things to a second class of things based upon belief propagation according to some embodiments of the disclosed subject matter.
Figure 10A:
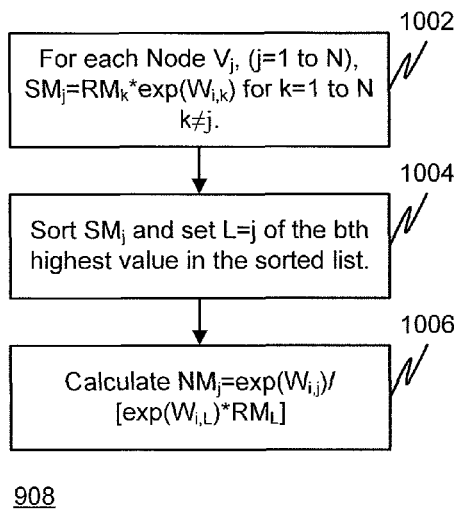
FIG. 10A illustrates an embodiment of operations within 908 of FIG. 9.
Figure 10B:
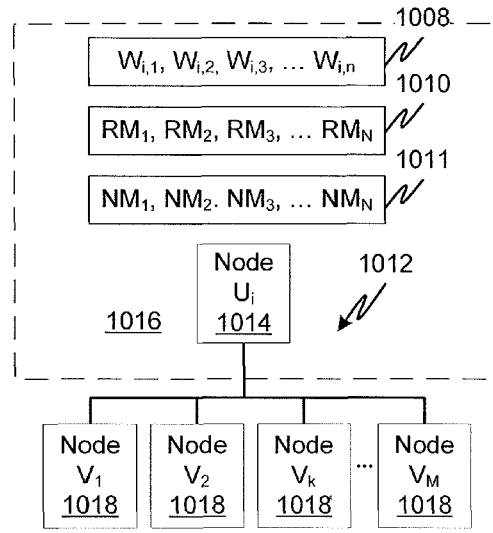
FIG. 10B shows operations a node in the second set V of the bipartite graph.

FIG. 9 is a chart of a method for matching a first class of things to a second class of things based upon belief propagation according to some embodiments of the disclosed subject matter. This technique can be used to solve for a MAP estimation of an NMRF. Referring now to FIGS. 9 and 10A-10D, after providing the graph data structure and the edge weight data (e.g., weight matrix or vectors to all the node processors) as indicated by the operation 904 of chart 900, variables are initialized as indicated by the operation 906. The latter operation may include initializing values of data storage elements that store the values of the most recent messages received by the node. An iterative process is performed at 908 by each node processor 1014, 1034 (See node processors in FIGS. 10B and 10D) to generate messages and to process received messages until a termination condition 910 is met. Referring to FIGS. 10A and 10B, the multiple customer node processors 1014 contain various updateable data stores 1008, 1010, and 1011 which hold a weight vector 1008, a received message vector 1010, and a new message vector 1011. Each node processor 1014 also may store data indicating the potential supplier nodes to which the node corresponding to the node processor 1018 to may be potentially matched. This additional data may be inherent in the data stored at 1008, 1010, and 1011 depending on the data structure employed since the weight matrices, received message values, and new message values are each respective of one of these attached node processors 1018. Also, multiple supplier node processors 1034 contain various updateable data stores 1026, 1028, and 1030 which hold a weight vector 1026, a received message vector 1028, and a new message vector 1030. Each node processor 1034 also may store data indicating the potential nodes to which the node corresponding to the node processor 1038 to which it may be potentially optimally matched but this data may be inherent in the other data as discussed above.

The node processor 1014 receives messages from, and transmits messages to, node processors 1018 to which it is connected, each of which corresponds to another node in the respective disjoint set. In this example, each node processor 1014 and 1018 corresponds to a node of a bipartite graph which has two disjoint sets U and V. The node processors 1018 each have the features of node processor 1014. The function of each node processor 1014 may be to derive messages from the data in the data stores 1008, 1010, 1011 and transmit such messages and to receive messages and update the data in the data stores 1008, 1010, and 1011. This is done iteratively, in the subprocess 908, as shown in process 900 of in FIG. 9.

Figure 10C:
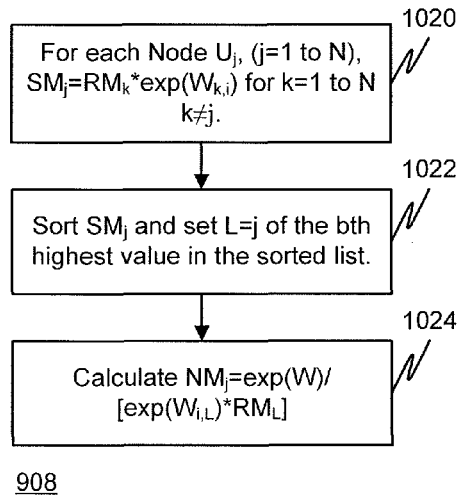
FIG. 10C illustrates an embodiment of operations within 908 of FIG. 9.
Figure 10D:
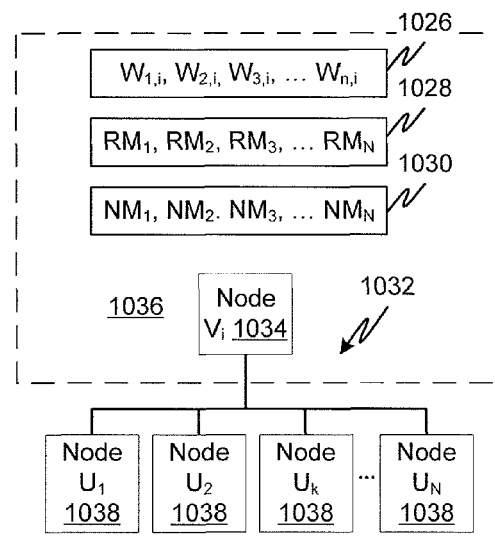
FIG. 10D shows operations a node in the second set U of the bipartite graph.

FIG. 10A illustrates an embodiment of operations within 908 of FIG. 9. FIG. 10B shows operations a node in the second set V of the bipartite graph. FIG. 10C illustrates an embodiment of operations within 908 of FIG. 9. FIG. 10D shows operations a node in the second set U of the bipartite graph. The operations are the same, but the operand indices are different in order to account for the set to which the node belongs.

However illustrated in FIG. 9, the operations of FIG. 10A may be done by separate processors respective of one or more nodes in the single bipartite graph, by processors corresponding to subsets of nodes or by a single processor. Thus, the iteration illustrated as a single process at 908 may be performed by separate processors in an independent fashion based on messages shared between them.

Referring in particular to FIG. 10A, at 1002, the node processor 1014 performs calculations corresponding to node $U_i$. At 1002, intermediate values $SM_j$ are calculated for each node $V_j$ to which node $U_i$ may be matched using messages received from the $V_j$ node processors. These intermediate values are simply $SM_j = RM_k * \exp(W_{i,k})$ for k=1 to N with k≠j. ("exp" denotes exponentiation based on the natural logarithm and * represents multiplication) That is, the contribution of the term for the message $RM_k$ where k=j is skipped over. At 1004, the list of intermediate values $SM_j$ are sorted and the term corresponding to the supplier having the bth highest value is identified. The suppliers are indicated by the index j, so a value L is set to this index. At 1006, new messages $NM_j$ are calculated to be sent to each supplier node processor 1018 according to: $NM_j = \exp(W_{i,j})/[\exp(W_{i,L}) * RM_L]$.

Referring in particular to FIG. 10C, at 1020, the node processor 1034 performs calculations corresponding to node $V_i$. At 1020, intermediate values $SM_j$ are calculated for each node $U_j$ to which node $V_i$ may be matched using messages received from the $U_j$ node processors. These intermediate values are simply $SM_j = RMk * \exp(W_{k,i})$ for k=1 to N with k≠j. ("exp" denotes exponentiation based on the natural logarithm and * represents multiplication) That is, the contribution of the term for the message $RM_k$ where k=j is skipped over. At

1022, the list of intermediate values $SM_j$ are sorted and the term corresponding to the customer having the bth highest value is identified. The customers are indicated by the index j, so a value L is set to this index. At 1268, new messages $NM_j$ are calculated to be sent to each customer node processor 1038 according to: $NM_j = \exp(W_{j,i})/[\exp(W_{i,L})*RM_L]$.

Referring back to FIG. 9, the new messages are passed between all the node processors 1018 and 1038 until a termination condition 910 is reached. Operation proceeds based on whether the termination condition has been reached, as indicated at 910. The termination condition may be expiration of a watchdog timer, a number of messages received by each processor. Another alternative, and one that provides an optimum solution, is for each node processor to terminate when the messages stop changing. That is, the more recent message is compared to the previous message and if they are the same, the processor stops processing for sending node or when all messages are the same as corresponding prior messages processing for all nodes can be halted. The operation 910 may also include updating the data stores 1010 or 1028.

As mentioned, the termination condition can be defined as reaching a steady state with respect to message updating, that is, the changes in messages stops. Alternatively, the steady state can be defined as no further message updates being sent if the sending processor makes the determination that the updates are not changing, or when a number of update message being sent or received is below a certain threshold. Alternatively, the termination condition can be defined in terms of a number of iterations of message updating or a number of messages sent (either an aggregate number or a number per node). In another alternative, the termination condition can be defined as the elapsing of a predetermined period of time. If the termination condition has been reached, processing continues with the selection, for an input node, of a predetermined number of supplier nodes or a predetermined number of customer nodes, as indicated at 914. Otherwise processing returns to the operation indicated at 908 and discussed above.

At 912, each node can calculate a vector showing the optimal matches. This can be done by U nodes by enumerating the values of $\exp(W_{i,k})*RM_i$ over k and selecting the b largest values. This can be done by V nodes by enumerating the values of $\exp(W_{k,i})*RM_i$ over k and selecting the b largest values. Note that the RM values are respective of the U of V node for which the calculation is done.

Note that the graph data structure can be any type of data structure suitable for use with generalized matching using belief propagation, such as a bipartite graph data structure. The graph data structure can contain one or more nodes of the same group (unipartite case) or different groups (bipartite case). For example, the graph data structure can include supplier nodes and customer nodes, where each supplier node can be connected to one or more customer nodes, and vice versa. In respective embodiments, the graph node data structure elements correspond to physical entities such as suppliers, customers, goods and/or services. In addition, in embodiments, the nodes correspond to other entities as described below with respect to other embodiments.

The weight data such as represented by the weight matrix discussed above may represent a profit value for each edge between two nodes of the graph data structure. The weight matrix could also be a cost matrix representing a cost associated with a respective matching with suitable values for the terms to suit the computations methods. In the case of a profit matrix, the matching process typically includes a function to enhance and/or maximize profit. And in the case of a cost matrix, the matching process typically includes a function to reduce and/or minimize cost. The values in the profit matrix can be negative, zero, positive or a combination of these values.

An exemplary weight matrix may be represented by a data structure having a record corresponding to each node. The record for each node can include a list of adjacent nodes and a profit value for each of the adjacent nodes. The term "adjacent" refers to the nodes to which a given node may be connected in the same (unipartite case) or a disjoint set (bipartite case). The items of data in the profit matrix can represent physical entities or values such as actual supplier capacity, actual customer demand, monetary amounts of bidding or asking prices, monetary amounts of profit, distances, monetary costs, and/or the like. A portion of the profit matrix can be selected and provided to a respective node processor. The selected portion can represent only the profit matrix record corresponding to each respective node processor. By providing only a portion of the profit matrix to each node processor, data storage and transfer requirements can be reduced.

In operation 908, electronic messages are passed between adjacent nodes, which may be networked or communicate by a bus or any other data communication system. The node processor can be a computer, a single processor on a device with multiple processors, or any suitable machine capable of making the described computations and sending and receiving the described data. As described above, value (or data content) of each message is determined according to a compressed message update rule. Received messages may be stored by the processor in an electronic memory, such as, for example, RAM, non-volatile storage, a database or any suitable data store. The operation 912 can be performed using the respective node processors. Downstream processing 914 may include a process that corresponds to the particular application. For example, if the bipartite graph may describe an application in which search queries or other key words terms appearing on web pages are assigned to bidders, as described in U.S. patent application Ser. No. 11/285,126 (Published as US 2007/0118432) to Vazirani et al. and filed Nov. 21, 2005, which is hereby incorporated by reference in its entirety. In that case, a first set of nodes would be the bidders and a second set of nodes would be the sellers and the downstream operation would include placing the advertisements corresponding to the bidders to corresponding locations on one or more web pages, for example, alongside search results or on other web pages.

The nodes selected at 914 are matched based on updated belief values. For example, in a b-matching problem, the b nodes having the highest belief values with respect to an input node are selected. Ties can be handled in a number of ways including by using a "coin toss" to select between tying nodes, or, alternatively or in addition, a small random value can be added to the weight or profit matrix value for each edge so that no two nodes are likely to tie. The selected nodes can be provided as output to another process or system. Processing then terminates at 1216.

It will be appreciated that the 902-916 procedure may be repeated in whole or in part in order to accomplish a contemplated belief propagation b-matching function. For example, the belief values may be updated for the entire graph data structure and then matching results may be provided for a plurality of nodes on interest before the belief values of the graph are updated. Alternatively, because the matching may result in changes to one or more nodes in the graph as a result of being selected as matching nodes (e.g., a supplier's amount of available goods may be reduced or a customer's requirement for goods may have been met), the belief values may need to be recomputed each time a matching is performed for a node.

Figure 11:
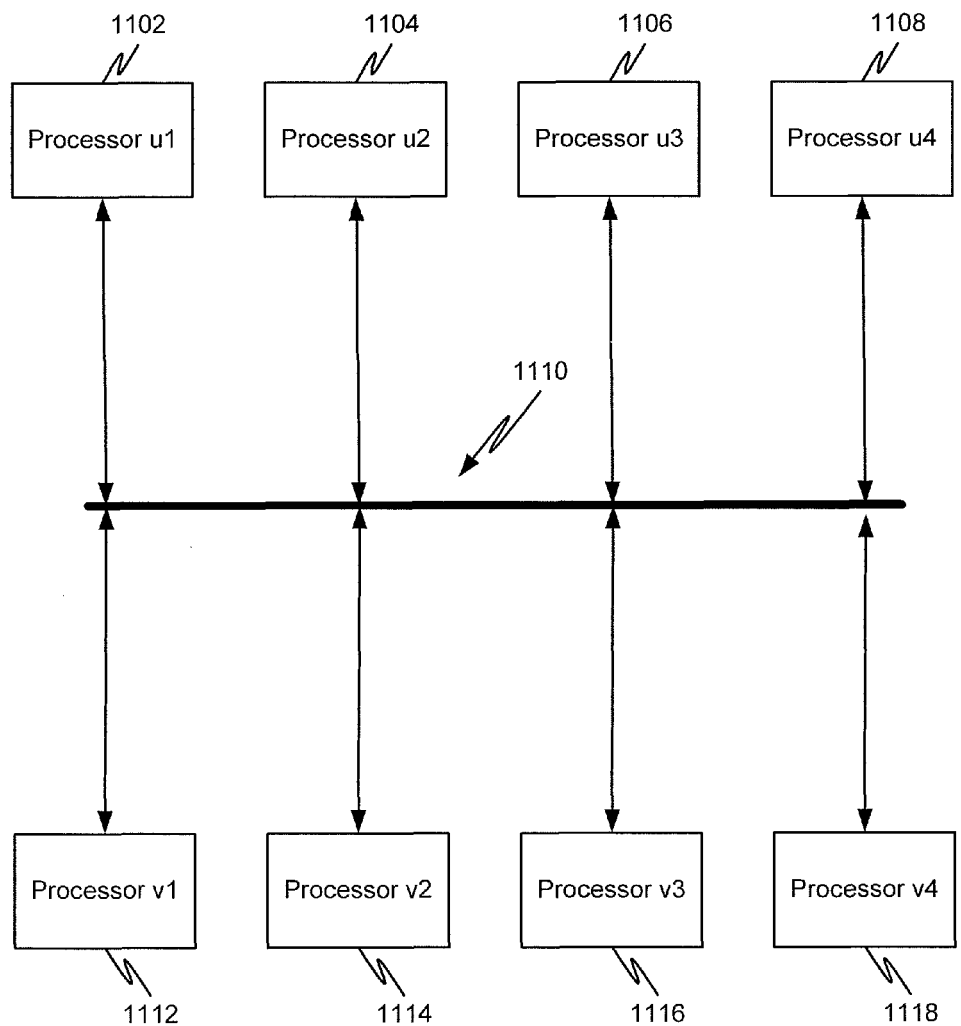
FIG. 11 is a diagram of a plurality of MAP estimation and/or belief propagation processors implemented in hardware according to some embodiments of the disclosed subject matter.

FIG. 11 is a diagram of a plurality of MAP estimation/belief propagation processors implemented in hardware according to some embodiments of the disclosed subject matter. In particular, a system 1100 includes a plurality of belief propagation processors (1102-1108 and 1112-1118). Each of the processors is coupled to a bus 1110. The belief propagation processors are constructed for operating as nodes in a belief propagation system for matching as described above. The system 1100 can include processors that are stand-alone or can represent a single semiconductor device having multiple belief propagation processors constructed thereon.

Figure 12:
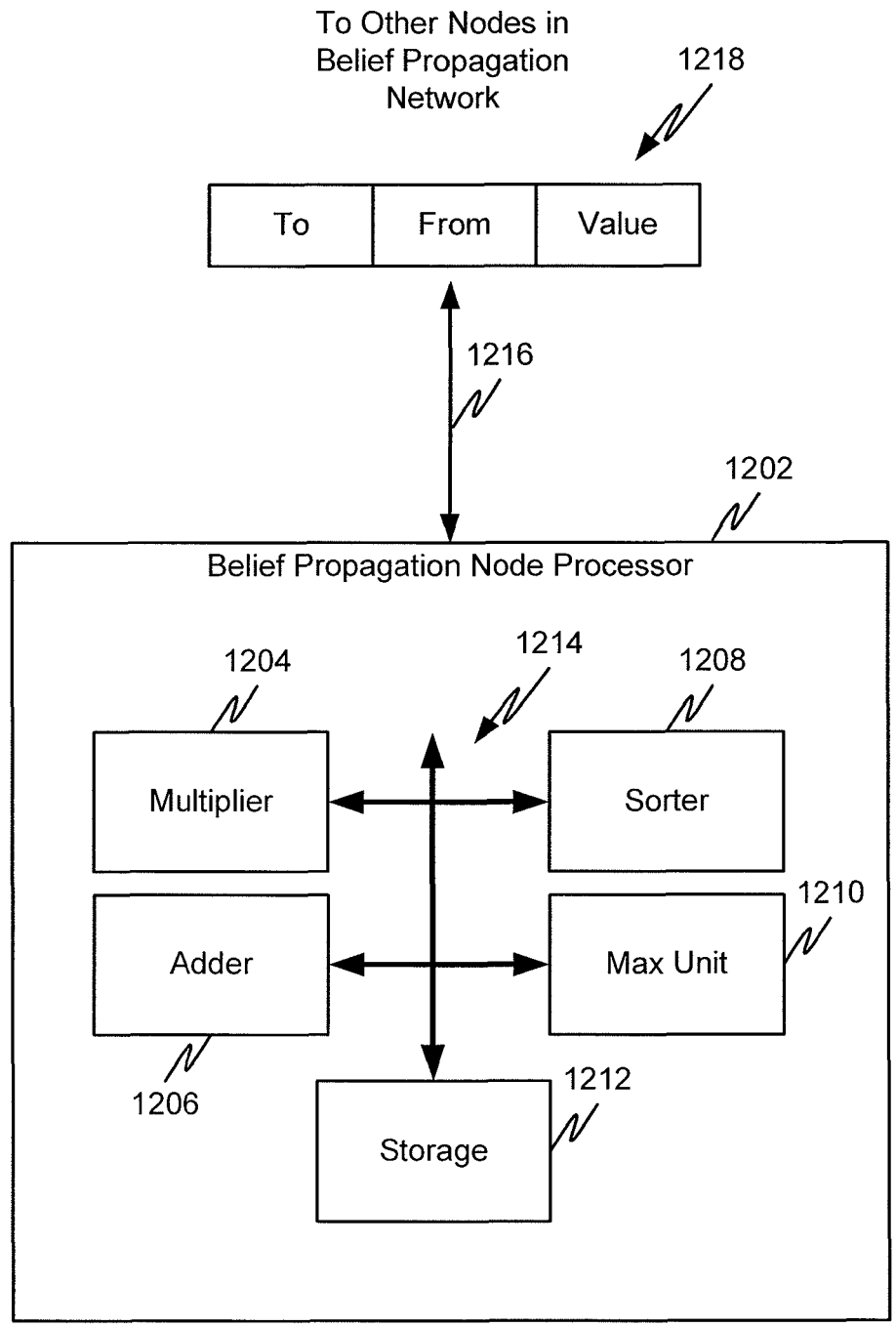
FIG. 12 a diagram of a hardware MAP estimation/belief propagation processor according to some embodiments of the disclosed subject matter.

In operation, each hardware belief propagation processor performs the belief propagation method described above for a single node. The hardware details are shown in FIG. 12, which is a diagram of a hardware matching using a MAP estimation/belief propagation processor according to some embodiments of the disclosed subject matter.

In particular, the hardware belief propagation processor 1202 includes a multiplier section 1204, an adder section 1206, a sorter section 1208, a max unit 1210, a storage 1212 each coupled to an internal bus 1214. The processor 1202 is coupled to an external bus 1216 in order to communicate with other processors and exchange messages 1218. The messages 1218 include a "to" field, a "from" field and a value field. The "to" field specifies an intended recipient node of the message, the "from" field specifies the sending node, and the value field contains the message value as calculated according to the message update rule described above.

In operation, the processor 1202 listens to messages on the external bus 1216. When a message is intended for the processor 1202, the processor 1202 receives the message and stores it in the storage at a location corresponding to the sender node of the message. Processor 1202 can then calculate an updated message value to the nodes stored in its storage as neighbor or adjacent nodes and can send the updated messages to each corresponding neighbor node. The sections and units of the processor 1202 are used to perform the calculations required for determining updated messages and belief values. The processor 1202 can also transmit its b-matching nodes to another processor or system via the external bus 1216.

The processor 1202 may be implemented as a stand alone device or may be incorporated into a device having other circuitry including other belief propagation processor nodes.

The following paragraphs describe various specific embodiments of techniques matching using degree distribution that may be used as a basis for a variety of devices, systems, and methods.

Figure 13:
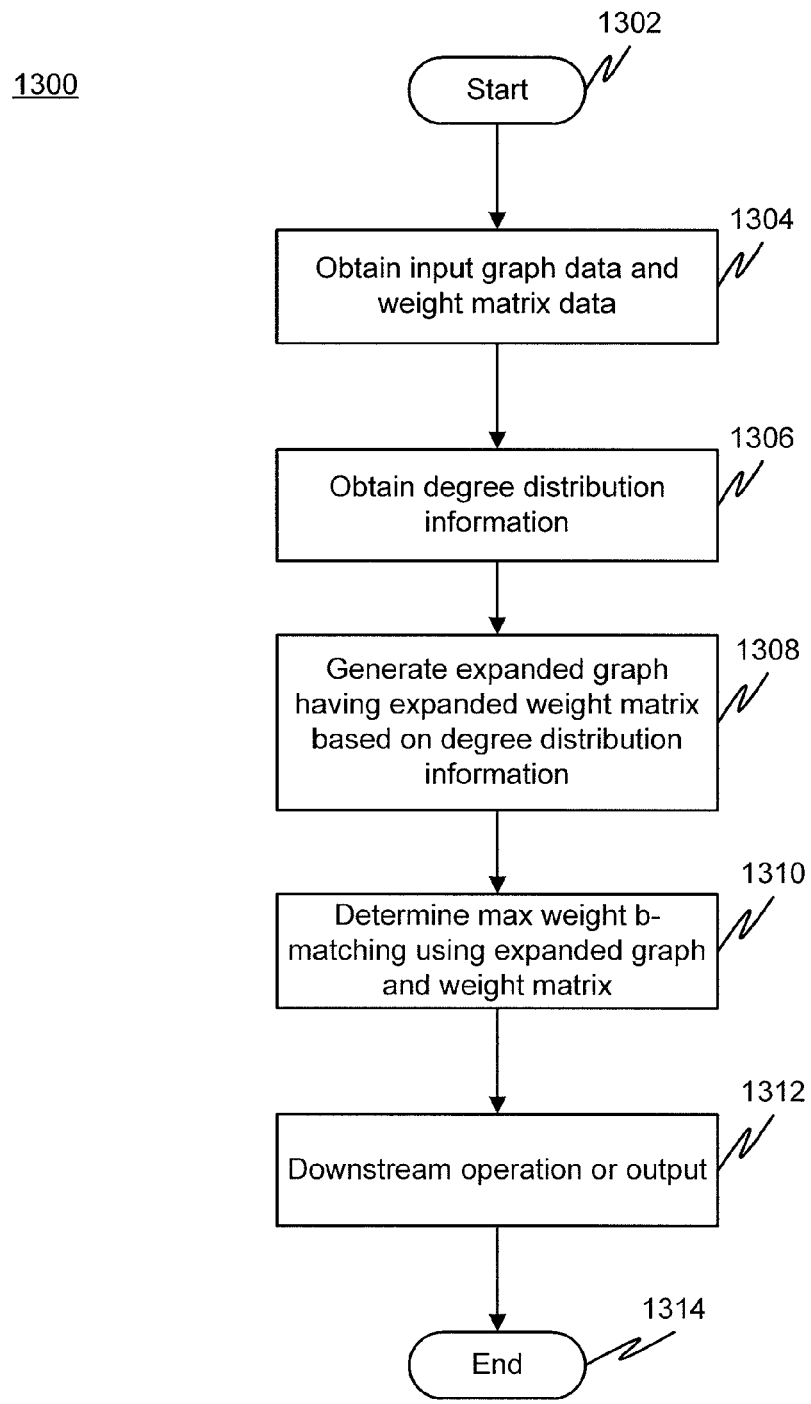
FIG. 13 is a chart of a method for matching using degree distribution information according to some embodiments of the disclosed subject matter.

FIG. 13 is a chart of a method for matching using degree distribution information according to some embodiments of the disclosed subject matter. In particular, in method 1300 processing begins at 1302 and continues to 1304.

At 1304, an input graph data structure and corresponding weight data are obtained. The input graph data structure can be a unipartite, bipartite, or other type of graph data structure. The weight data represents a weight (or a profit, cost, or other measure) of an edge between two nodes in the graph data.

At 1306, degree distribution information is obtained. The degree distribution information includes degree distribution information for each node in the input graph data structure. The degree distribution information can include prior distribution over node degrees, degree information inferred from statistical sampling properties, degree distributions learned empirically from data, given degree probabilities, or the like. The degree distribution for each node can be specified by a term $\psi_j$.

At 1308, a new graph data structure is generated that includes dummy nodes in addition to the nodes of the input graph data structure. There are an additional number of dummy nodes equal to each set of nodes in the input graph. An expanded weight matrix is generated using the input weight matrix as the weight values for the input nodes in the expanded weight matrix and degree distribution information is used to determine a weight value for edges between input nodes and dummy nodes, according to the following formula:

$$w(v_i, d_{i,j}) = \phi_i(j-1) - \phi_i(j).$$

Processing continues to 1310.

At 1310, a maximum weight b-matching operation is performed on the expanded graph data structure and weight matrix. Depending on the structure of the input graph data, a max flow method can be used to determine the maximum weight b-matching or, when the graph a bipartite graph, a belief propagation method can be used to determine the maximum weight b-matching. During the maximum weight b-matching, b is set to the size of a dimension of the original weight matrix (e.g., if the original weight matrix is an n×n matrix, then b=n). The b-matching operation solves the following problem:

$$\hat{\varepsilon}_b = \operatorname{argmax}_{\hat{\varepsilon}_b \subseteq \varepsilon_b} \sum_{(v_i, d_{i,j}) \in \varepsilon_b} w(v_i, d_{i,j}) + \sum_{(i,j) \in \varepsilon_b} W_{ij}$$

subject to $deg(v_i, \hat{\varepsilon}_b) = N_i$ for $v_i \in V$.

Where, v is a node, d is a dummy node, W is an edge potential or weight value, and $N_i = deg(v_i, \varepsilon)$ is the size of the neighborhood of node $v_i$.

At 1312, an output operation is performed. For example, a result graph or matrix, or a portion of a result graph or matrix can be provided to another module within the same system, provided to another system or provided to a user or operator for use in another process. Processing continues to 1314 where processing ends. It will be appreciated that 1304-1312 can be repeated in whole or in part in order to accomplish a contemplated matching using degree distribution.

Figure 14:
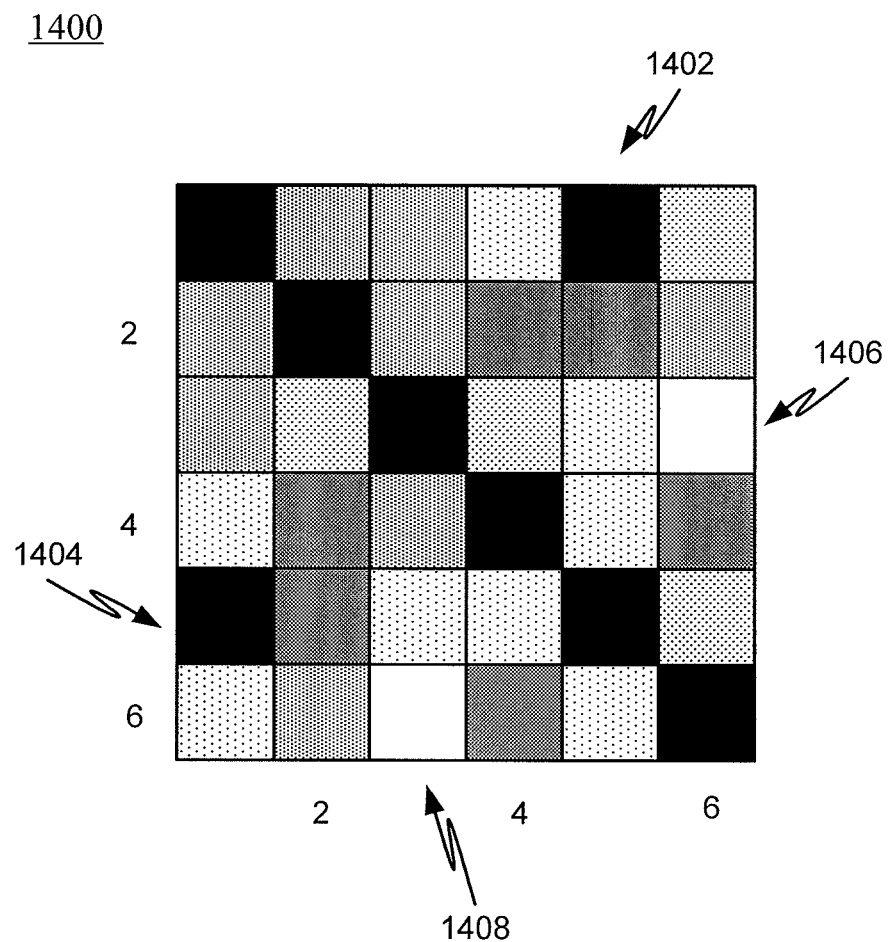
FIG. 14 is a schematic diagram of a weight matrix according to some embodiments of the disclosed subject matter.

FIG. 14 is a schematic diagram of a weight matrix according to some embodiments of the disclosed subject matter. In particular, a weight matrix 1400 is shown graphically with cells having shading representing various weight values. The diagonal is shaded black to indicate no weight value for a node connecting to itself. Other node cells shaded black (e.g., 1402 and 1404) indicate a low weight value to reduce or eliminate the potential for the result to contain an edge for those respective nodes (e.g., between nodes 1 and 5). Also, the weight matrix may be adjusted to force or encourage the result to contain an edge between two nodes by containing a high weight value at weight matrix locations corresponding to an edge between two nodes (e.g., 1406 and 1408).

Figure 15:
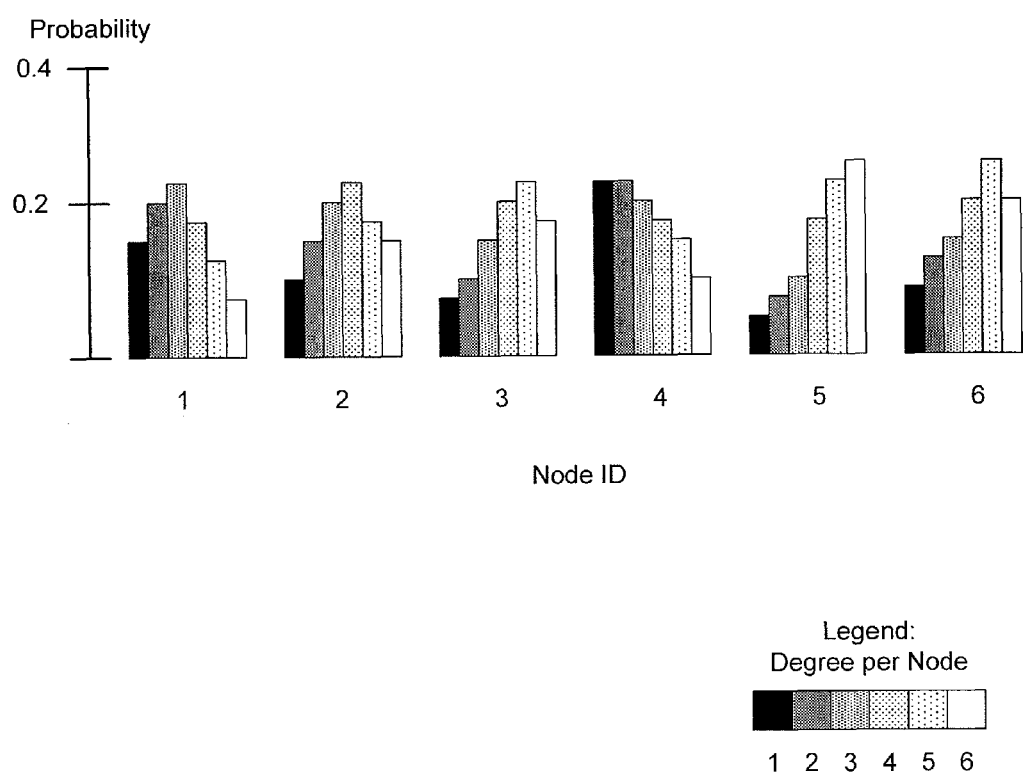
FIG. 15 is a schematic diagram of degree distribution information according to some embodiments of the disclosed subject matter.

FIG. 15 is a schematic diagram of degree distribution information according to some embodiments of the disclosed subject matter. The graphical representation of node degree distributions in FIG. 15 visually illustrates the information provided by degree distribution data. For example, Node 4 has a preference for a lower degree (say 1 or 2), while Node 5 has a preference for a higher degree (say 5 or 6). The matching system and method of this disclosure can pedal in matching while accommodating differing degree distribution priors or preferences by incorporating degree distribution information into an expanded weight matrix use to determine a matching result.

Figure 16:
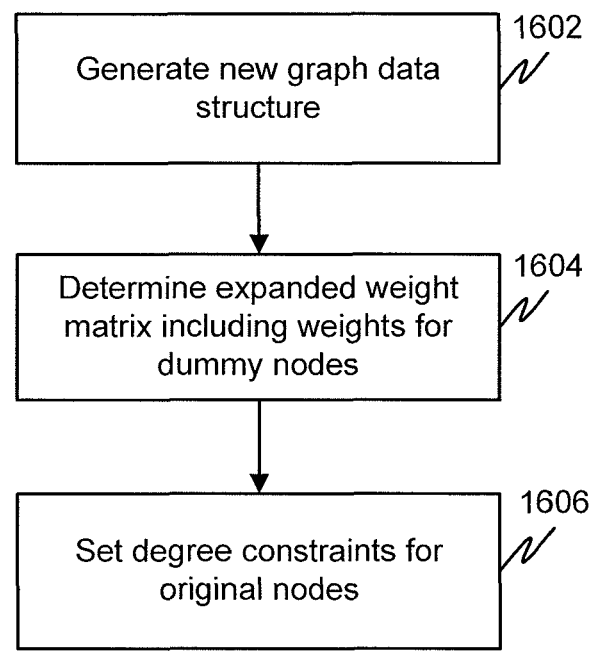
FIG. 16 is a chart of a method for generating an expanded weight matrix according to some embodiments of the disclosed subject matter.

FIG. 16 is a chart of a method for generating an expanded weight matrix according to some embodiments of the disclosed subject matter. In particular FIG. 16 expands on 1308 from FIG. 13. Processing begins at 1602 where a new graph structure is generated. The new graph structure is two times the size of the original graph structure. If the original graph structure had n nodes of each type, the new graph structure is of size n×n.

At 1604, an expanded weight matrix corresponding to the expanded graph data structure is determined. The expanded weight matrix includes the original weight matrix values in one quadrant, two quadrants containing weight matrix values based on degree distribution data and a zero quadrant, as will be described in greater detail below with respect to FIG. 17A.

At 1606, degree constraints are set for the original nodes within the expanded graph data structure. The degree constraint for the original nodes is set to the size of one side of the original weight matrix. In other words, if the original weight matrix is of size n×n, then the original nodes are constrained such the b=n when performing the b-matching on the expanded graph and expanded weight matrix.

Figure 17A:
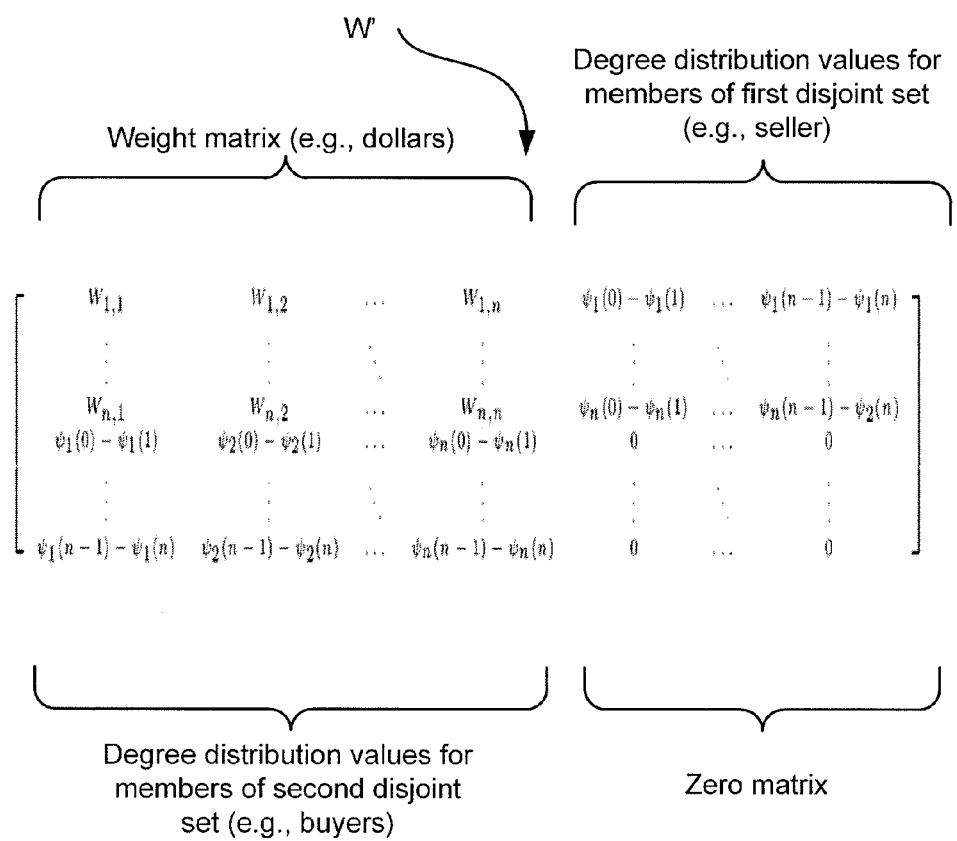
FIG. 17A is a diagram showing expanded weight matrix coefficients generated according to some embodiments of the disclosed subject matter.

FIG. 17A is a diagram showing expanded weight matrix coefficients generated according to some embodiments of the disclosed subject matter. In particular, to solve the degree distribution problem, the weight matrix W that represents the value (or relative value) of each match, is expanded doubling its size to generate an expanded weight matrix W'. The original weight matrix W (which reflects, for example, the negotiated price for a good to be sold by seller i to buyer k) forms the upper left quadrant of the expanded weight matrix W'. The upper right quadrant of the expanded weight matrix W' includes $\psi_i(j)$ delta values such as, starting at the first row: $\psi_1(0)$-$\psi_1(1)$, ..., $\psi_1(n-1)$-$\psi_1(n)$, and so on until the last row $\psi_n(0)$-$\psi_n(1)$, ..., $\psi_n(n-1)$-$\psi_n(n)$. The lower left quadrant of the expanded weight matrix W' includes $\phi_i(j)$ delta values such as, starting at the first row: $\phi_1(0)$-$\phi_1(1)$, ..., $\phi_n(0)$-$\phi_n(1)$, and so on until the last row $\phi_1(n-1)$-$\phi_1(n)$, ..., $\phi_n(n-1)$-$\phi_n(n)$. The lower right quadrant values can all be set to zero.

The bipartite graph is expanded by adding to the seller and buyer nodes, dummy nodes to double the number of sellers and buyers. Thus, if there are n buyers and n sellers, an additional n buyers and n sellers are appended. These dummy nodes correspond to the appended delta values $\psi_i(j)$, $\phi_i(j)$, or 0, respectively in the expanded weight matrix W'. In cases where the number of sellers differs from the number of buyers, the larger of the two is used as the expanded weight matrix size and the smaller side of the original weight matrix is expanded with small values (e.g., zero or negative maximum value) and dummy nodes are added to the graph data. These complete a square original and expanded weight matrix and original and expanded bipartite graph. The expanded nodes are dummy nodes similar to those used for the expanded weight matrix.

Once the expanded weight matrix W' is created and the dummy nodes are provided, methods described below can be applied to the expanded graph and weight data. In distributed processing, the number of node processors may simply be doubled, for example, to have each processor operate and receive and send messages relating to a respective node. The value of b used for solving the problem may be set to n, namely, the number of buyers and sellers (noting that some of the buyers and sellers may be dummies and not real buyers or sellers). Once the matching problem is solved on the expanded graph using the expanded weight matrix W', as a b-matching problem, (b=n), for example by using the disclosed belief propagation methods and systems, the b-matching solution for the original graph and weight matrix is obtained by extracting the upper left quadrant of a matrix representing the matches on the expanded graph (or by truncating the matrix to remove dummy nodes).

Figure 17B:
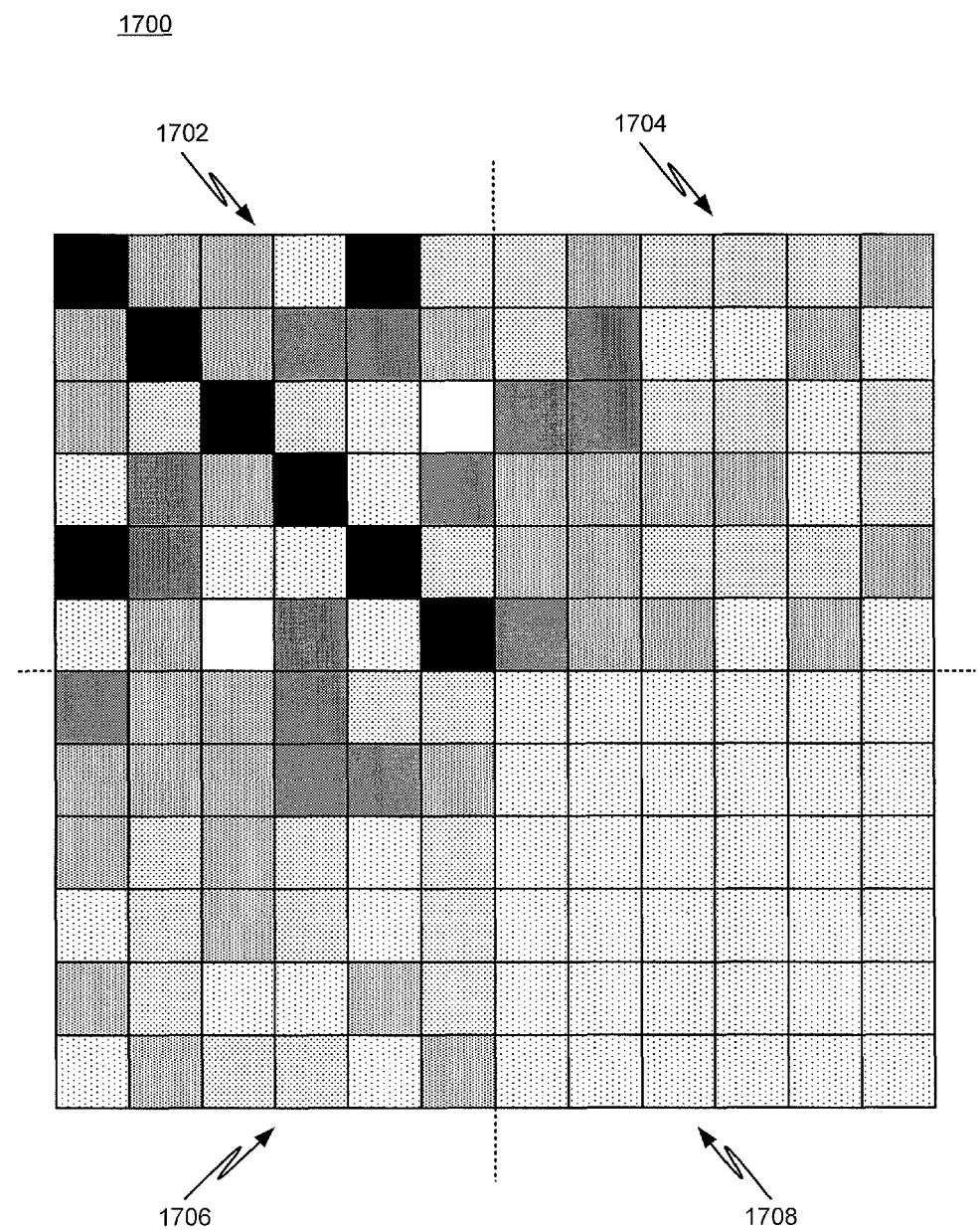
FIG. 17B is a schematic diagram showing an expanded weight matrix generated according to some embodiments of the disclosed subject matter.

FIG. 17B is a graphical illustration of an expanded weight matrix 1700 generated according to the coefficient matrix shown in FIG. 17A. The expanded weight matrix 1700 includes the original weight matrix 400 shown in FIG. 14 as the upper left quadrant 1702. The upper right 1704 and lower left 1706 quadrants, corresponding to edges between original nodes and dummy nodes, have been determined using coefficients as described above with respect to FIG. 17A. The lower right quadrant 1708, corresponding to edges between dummy nodes only, is a zero value quadrant.

Figure 18:
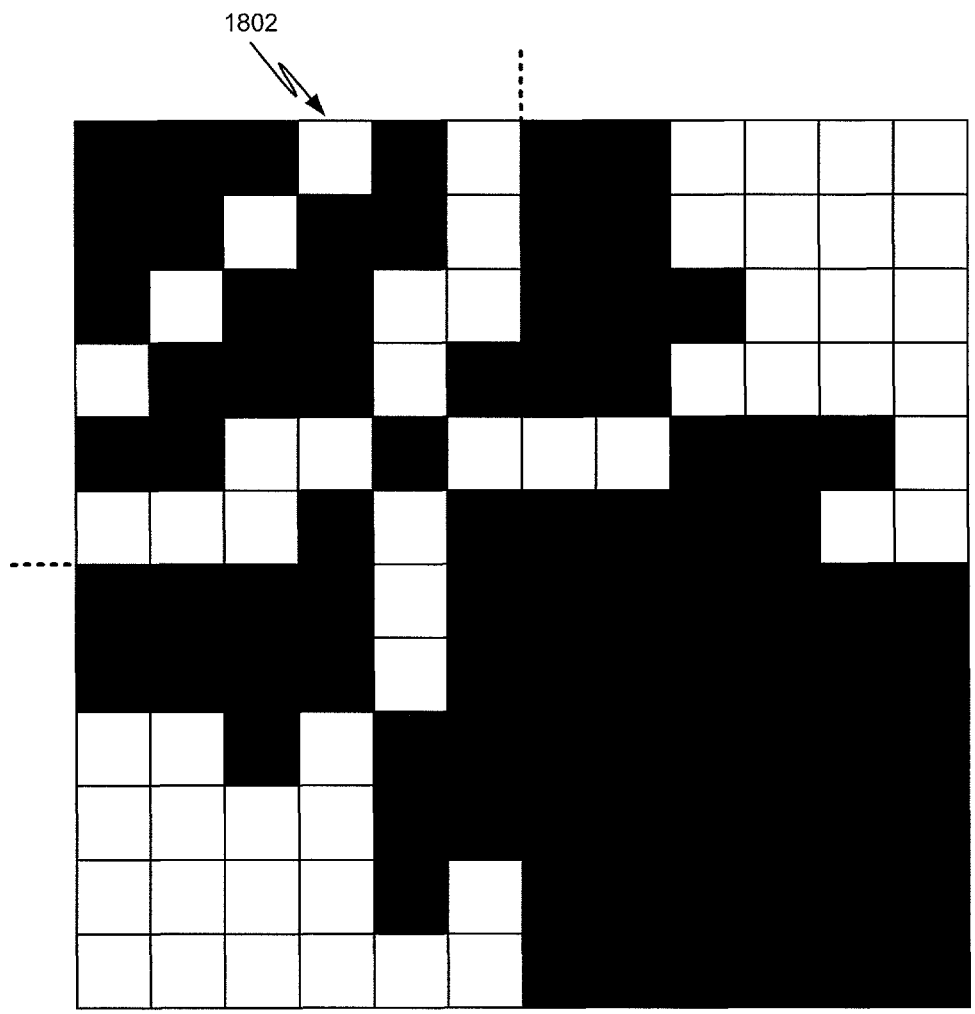
FIG. 18 is a schematic diagram showing an expanded weight matrix after b-matching and conversion to binary values generated according to some embodiments of the disclosed subject matter.
Figure 19:
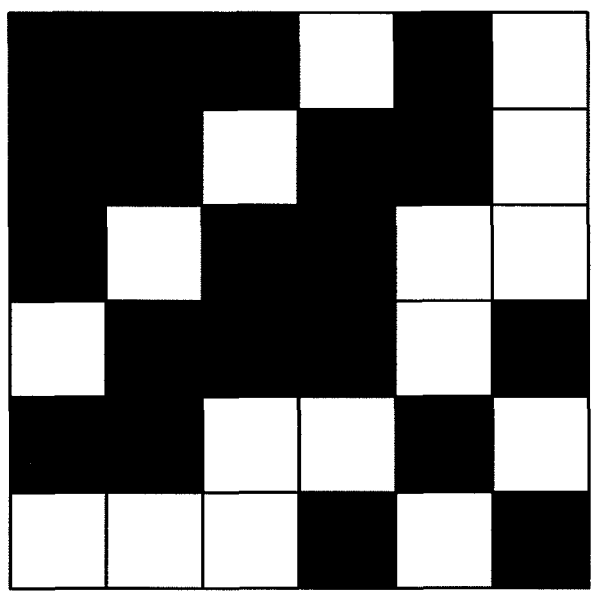
FIG. 19 is a schematic diagram of a matching result obtained by truncating the binary expanded weight matrix shown in FIG. 18, according to some embodiments of the disclosed subject matter.

FIG. 18 is a schematic diagram showing a resulting expanded weight matrix 1800 produced by performing a b-matching operation on the expanded graph structure and outputting match values as binary values. In the binary expanded result matrix, white cells indicate a match and black cells indicate no match. Within the expanded result matrix 1800, the upper right quadrant 1802 if of interest as a solution to the original matching problem with degree distribution and is extracted (or the dummy nodes can be truncated) to generate a final output result of the b-matching. FIG. 19 is a schematic diagram of a matching result obtained by truncating the binary expanded weight matrix shown in FIG. 18, according to some embodiments of the disclosed subject matter.

Figure 20:
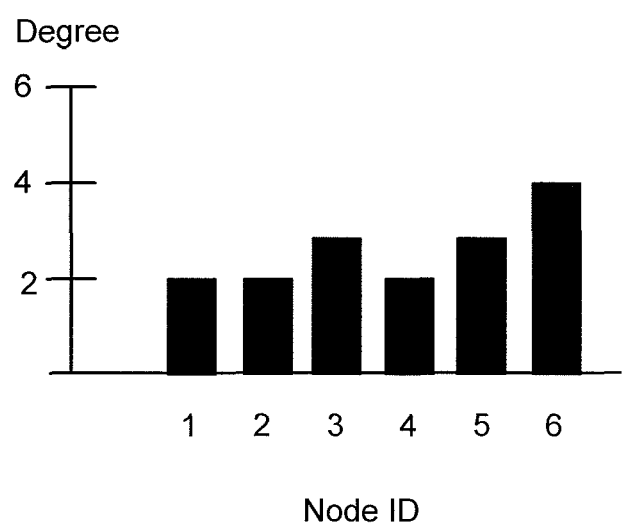
FIG. 20 is a schematic diagram of node degrees of the matching result shown in FIG. 19, according to some embodiments of the disclosed subject matter.

FIG. 20 is a schematic diagram of node degrees of the matching result shown in FIG. 19. For example, Nodes 1, 2 and 4 each has degree 3. Nodes 3 and 5 have degree 3 and Node 6 has degree 4. Comparing the match result degrees with the input degree distribution data shows that the matching using degree distribution provided results consistent with preferred or prior node degrees, with Nodes 3, 5 and 6 having a degree distribution favoring higher degrees and Nodes 1, 2 and 4 having degree distributions favoring lower degrees.

Figure 21:
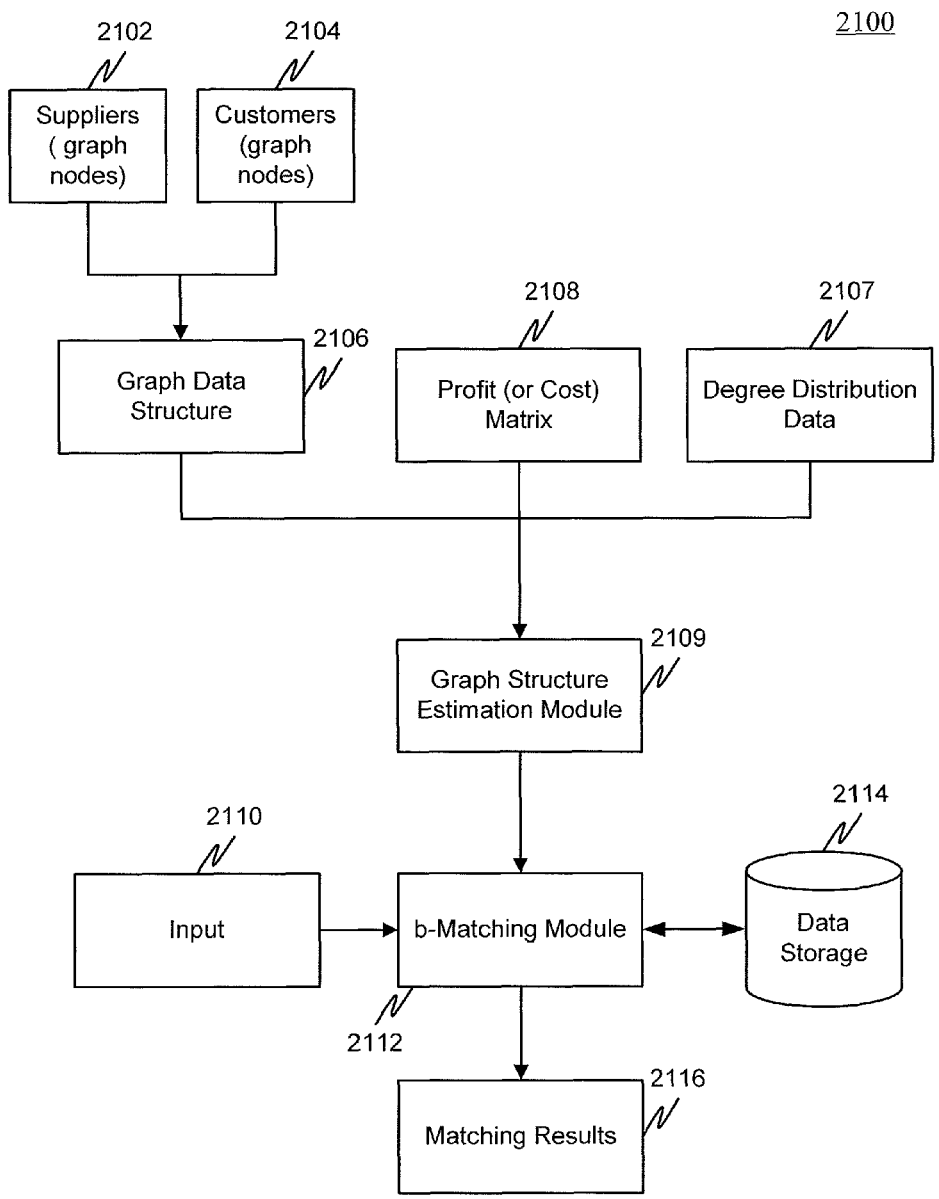
FIG. 21 is a diagram of a system for matching a first class of things to a second class of things using degree distribution information according to some embodiments of the disclosed subject matter.
Figure 22:
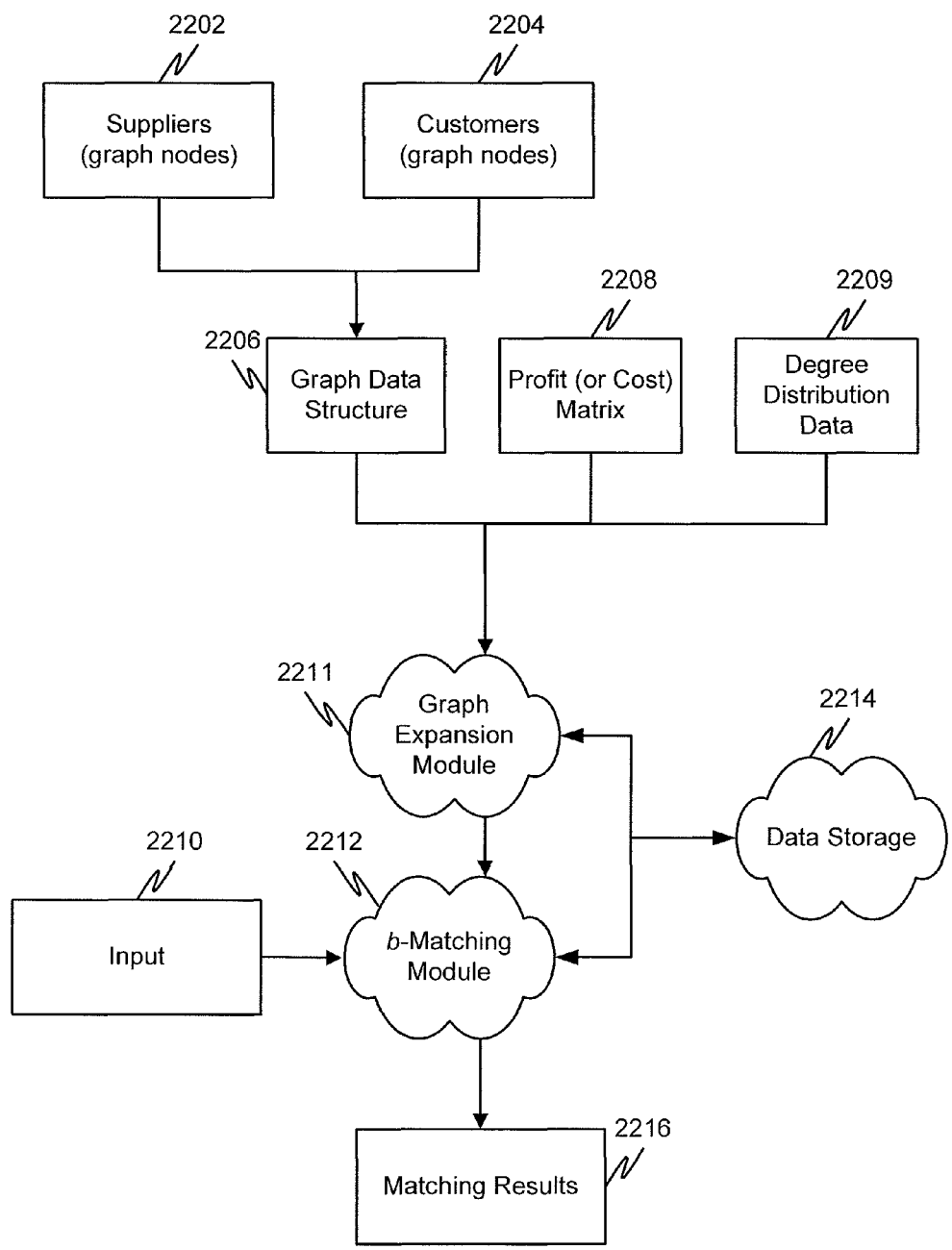
FIG. 22 is a block diagram of a system for matching using degree distribution including parallel processors according to some embodiments of the disclosed subject matter.
Figure 23:
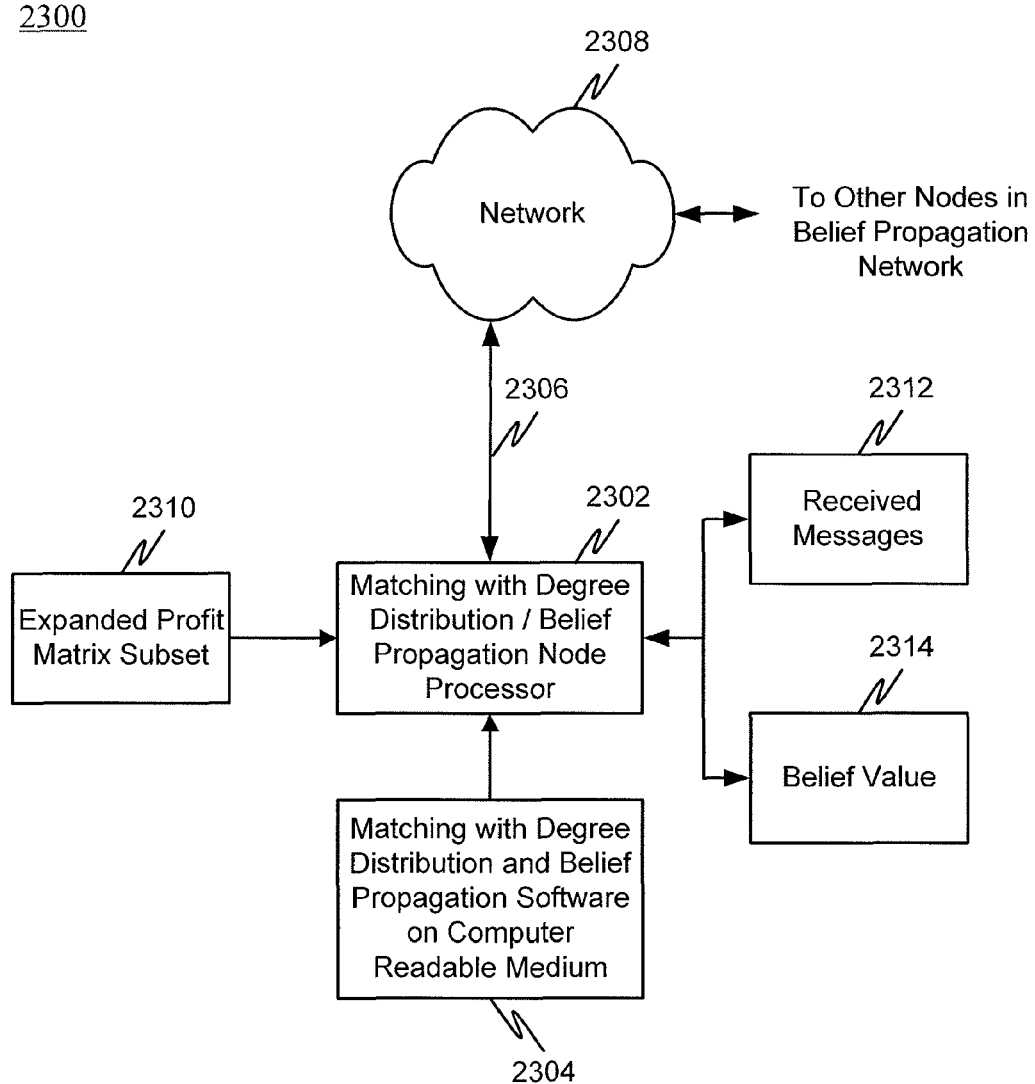
FIG. 23 is a diagram of a node processing system for matching using degree distribution and belief propagation according to some embodiments of the disclosed subject matter.

FIG. 21 is a diagram of a system for matching a first class of things to a second class of things using degree distribution information according to some embodiments of the disclosed subject matter. In particular, a belief propagation matching system 2100 includes a group of suppliers 2102 and a group of customers 2104. Each of the suppliers 2102 and customers 2104 are represented as nodes in a graph data structure 2106. The system 2100 also includes degree distribution data 2107 and a profit (or cost) matrix 2108. The graph data structure 2106 and profit matrix 2108 are provided as input to a graph structure estimation module 2109. Output from the graph structure estimation module is provided as input to a b-matching module 2112. Also provided as input to the b-matching module 2112 is input data 2110. The b-matching module 2112 is coupled to a data storage 2114 and provides matching results 2116 as output.

In operation, the suppliers 2102 and customers 2104 are stored as nodes or vertices of the graph data structure 2106. The degree distribution data 2107 represent distribution over degrees for each node. The profit matrix 2108 stores the edge profits (or weights) for each edge connecting a supplier and customer. The graph data structure 2106, the degree distribution data 2107 and the profit matrix 2108 can each be stored in the data storage 2114 for retrieval by the graph structure estimation module 2109 and the b-matching module 2112.

The graph structure estimation module 2109 obtains the graph data structure 2106, the degree distribution data 2107 and the profit matrix 2108 from the data storage 2114 and generates an expanded graph data structure and weight matrix (or profit) matrix according to the method described above with respect to FIG. 13.

The b-matching module 2112 receives the input 2110, which can be, for example, a node of interest for b-matching. In one example, the b-matching module 2112 uses an expanded graph data structure profit matrix to perform the b-matching using belief propagation according to the method described below with respect to FIGS. 9-10D. As discussed above, the b-matching may also be performed using max flow methods when the graph data structure is not a bipartite graph. The messages and beliefs are stored in the data storage 2114. Once the termination condition is met, the b-matching module 2112 outputs the matching results 2116. The termination condition can include any of the termination conditions described below with reference to the conditional branch 910 in FIG. 9.

The b-matching module 2112 can operate according to software instructions retrieved from a computer-readable medium. The software instructions, when executed by the b-matching module 2112, cause the b-matching module 2112 to perform the belief propagation generalized matching methods as described below.

For example, when adapted for an advertisement/keyword matching application, an implementation of software for the b-matching module 2112 can perform belief propagation according to the following pseudo code:

```
Begin Pseudo Code
// define data structures and variables
data structure GraphNode { float
received_msgs[ max_num_of_neighbors ] };
GraphNode ads [num_of_ads];
GraphNode keywords [num_of_keywords];
int Profit_Matrix [num_of_ads] [num_of_keywords];
int b=3;
Boolean Message_Changed = true;
initialize all received_msgs to 1; // to compute messages first time around
initialize Profit_Matrix with bid values;
// start a main loop to continue until no messages are changed
while ( Message_Changed == true ) {
    Message_Changed = false; // switch off loop unless a message
    changes
    // send messages from ads to keywords
    for i=1 to num_of_ads {
        for j=1 to num_of_keywords {
            sorted_msgs[ ] =
                sorted list of ads[i].received_msgs[ ] *
                    corresponding exp(Profit_Matrix[ ][ ]) values
                    excluding that from keyword node j;
            L = original index of sorted_msgs[b]; // get index (or
                node) of the bth received msg*profit;
            old_rcvd_msg = keywords[j].received_msgs[i];
            keywords[j].received_msgs[i] =
                exp(Profit_Matrix[i][j]) / (exp(Profit_Matrix[i][L]) *
                ads[i].received_msgs[L]);
            if old_rcvd_msg not equal to keywords[j].received_msgs[i]
                then Message_Changed = true;
        } end j loop
    } end i loop
// send messages from keywords to ads
for j=1 to num_of_keywords {
    for i=1 to num_of_ads {
        sorted_msgs[ ] = sorted list of keywords[j].received_msgs[ ] *
            corresponding exp(Profit_Matrix[ ][ ]) values
            excluding that from ad node i;
        L = original index of sorted_msgs[b]; // get index (or
            node) of the bth received msg*profit;
        old_rcvd_msg = ads[i].received_msgs[j];
        ads[i].received_msgs[j] =
            exp(Profit_Matrix[i][j]) / (exp(Profit_Matrix[L][j]) *
            keywords[j].received_msgs[L]);
        if old_rcvd_msg not equal to ads[i].received_msgs[j]
            then Message_Changed = true;
    } end i loop
} end j loop
} end while loop - we are now done - no messages are changing
// now get the belief values for a keyword node of interest
for i=1 to num_of_ads {
    belief_values[i] =
        keywords[keyword_of_interest].received_msgs[i] *
        Profit_Matrix[i][keyword_of_interest];
} end i loop
sort belief_values[ ];
output largest b belief_values[ ];
End Pseudo Code
```

The above pseudo code represents an example of a linear implementation of the belief propagation method described below. Several simplifications have been made for purposes of illustration including assuming that each node exchanges messages with all nodes of the corresponding type. In an actual implementation, nodes may only exchange messages with their respective neighbor nodes. Also, the pseudo code example continues until no messages are changed. As described above, there are other termination conditions that can be used with the belief propagation method. As mentioned above, the b value for the original graph nodes is constant set to the size of one of the groups of the original graph structure (e.g., n) for all. The dummy nodes remain unconstrained with regard to degree during the b-matching process.

The b-matching module 2112 can be a general-purpose computer adapted for generalized matching using belief propagation, one or more special-purpose computers for generalized matching using belief propagation, a programmed microprocessor or microcontroller and peripheral integrated circuit element, an ASIC or other integrated circuit, a digital signal processor, a hardwired electronic or logic circuit such as a discrete element circuit, a programmed logic device such as a PLD, PLA, FPGA, PAL, or the like.

The data storage 2114 can be a database such as a relational database or any other suitable arrangement of data. The data can be stored in a physical computer readable media such as a volatile or nonvolatile electronic memory, a magnetic storage device, and/or an optical storage device, or any known or later developed computer readable media.

Figure 24D:

FIGS. 24A-24D are diagrams of an initial weight matrix being expanded once to "square" the matrix and then expanded once again to include degree distribution data. FIG. 24A shows an initial weight matrix 2400 for a simplistic illustration of the dating service problem described above. The weight matrix 2400 is a 2×3 matrix and includes two men (M1 and M2) and three women (W1-W3). The values in the weight matrix correspond to hypothetical compatibility indexes between respective men and women. The weight matrix 2400 represents a bipartite problem having two classes of nodes (men and women). Also, it can be seen that the weight matrix 2400 is not square.

FIG. 24B shows a first expanded weight matrix 2402. In, the first expanded weight matrix 2402 the men and women have been placed on each side of the matrix to form a 5×5 matrix. This achieves two things. First, the first expanded weight matrix is now square, which will permit the b-matching to be performed more simply by not having to take into account a rectangular, but not square weight matrix. Second, by having both classes of nodes on each side of the graph, computation of the marginal degree distribution quadrants will be simpler. There is, of course, a computational cost to increasing the weight matrix size and depending on the particular problem may or may not be worthwhile.

FIG. 24C shows a second expanded weight matrix 2404 based on the first expanded weight matrix 2402 and on degree distribution values for each node. The second expanded weight matrix 2404 includes the first expanded weight matrix 2402 as the upper left quadrant. The second expanded weight matrix 2404 includes degree difference values as the upper right and lower left quadrants and a zero quadrant as the lower right quadrant.

FIG. 24D shows a diagram of the second expanded weight matrix 2406 with degree distribution values used to populate the weight matrix values for the upper right and lower left quadrants. For example, the first weight matrix value 2408 for the first row, column cell of the upper right quadrant is determined based on the degree distribution values for M1. For example, assuming the degree distribution values start at a value for one connection and that the probability for zero degree, i.e., $\phi_{M1}(0)$, is 0 for all users, the value at 2408 is computed as: $\phi_{M1}(0)-\phi_{M1}(1)$ or $(0-0.2)=-0.2$. Once the weight values for the second expanded weight matrix have been determined according to the method described above, a b-matching operation can be performed. Since the original bipartite graph having men and women nodes has essentially been recast as a unipartite problem (having men and women on each side of the weight matrix), the loopy belief propagation technique described herein can be used to solve the b-matching, where, in this case, b=5.

A result matrix (not shown, but similar in nature to that shown in FIG. 18) can be generated by selecting the top b matches for each node and setting them to a value of 1 in the result matrix, which has a size equivalent to the second expanded matrix. All other values of the result matrix can be set to zero. Thus, a binary result matrix is generated in which a 1 in a cell represents an edge of the subgraph solution. As discussed above, the upper left quadrant (in this case, the upper left 5×5 portion) of the result matrix is extracted as the final result matrix for the original problem. A value of one in a matrix cell represents an introduction between the man and woman corresponding to the edge represented by that cell, with the introduction representing a maximum weight subgraph satisfying the degree distributions of each user node.

In addition to being able to "square" a rectangular weight matrix, the technique described above with respect to FIGS. 24A-24D can be used to transform a bipartite problem into a unipartite problem for solving using the match with degree distribution technique. As mentioned, this technique incurs a computational cost, but may be useful for certain problems needing to be solved with the degree distributions of both classes of nodes being taken into account.

Figure 25:
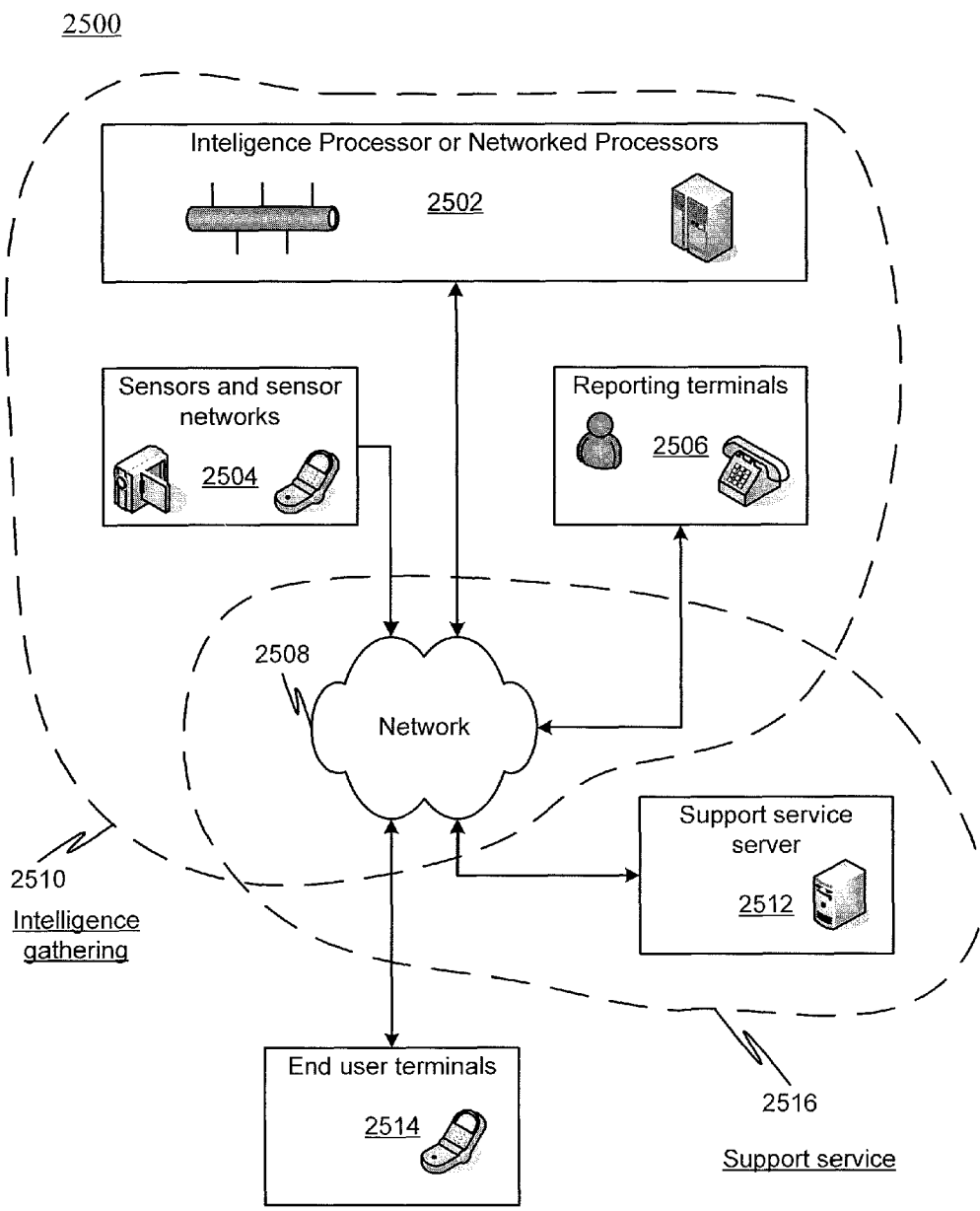
FIG. 25 illustrates a system for gathering information and delivering a service that predicts events of value, such as predicting, in real time, the best places for certain events that cannot necessarily be predicted with certainty in advance.

FIG. 25 illustrates a system for gathering information and delivering a service that predicts events of value, such as predicting, in real time, the best places for certain events that cannot necessarily be predicted with certainty in advance. In particular, the system 2500 includes intelligence gathering resources 2510 that gather and process information to deliver a service via support service resources 2516 to end user terminals 2514. The intelligence gathering resources 2510 include intelligence processors (or networked processors) 2502, sensors and sensor networks 2504, reporting terminals 2506 and a network 2508. The support service resources 2516 include a support service server 2512 and the network 2508.

The intelligence processors (or networked processors) 2502 can include one or more processors programmed to receive information and/or observation data from the sensors 2504 and/or reporting terminals 2506. The intelligence processors (or networked processors) 2502 can be programmed to process the received information or data in order to estimate, derive or predict events of value according to one or more of the MAP estimation techniques described above. The intelligence processors (or networked processors) 2502 can be programmed to match patterns or recognized an optimal configuration using a graphical problem representation. The intelligence processors (or networked processors) 2502 can include computer-readable media (not shown) for storing software program code and data.

The results from the intelligence processors (or networked processors) 2502 can be sent to the support service server 2512 so that the results can be provided as a service to end user terminals 2514. While the end user terminals are shown as mobile devices in FIG. 25, it will be appreciated that the end user terminals can include a mobile device, fixed location device, or combination of the two. The service provided by the support service server can be a web service, mobile telephony service, or the like.

The sensors and sensor network 2504 can provide observation data from one or more types of sensors such as audio, video, thermal, acoustic, motion, chemical, biological, x-ray, laser, magnetic, radio frequency, other electromagnetic sensor, other biological sensor, or other chemical sensor. In general, any now known or later developed sensor that is capable of providing observation data that can be used by the intelligence processors (or networked processors) 2502 can be used with an embodiment. The reporting terminals 2506 can include one or more devices such as computers, telephones, radios, other types of communication equipment, or the like. The network 2508 can include a wired or wireless network such as the Internet, a local area network, a wide area network, a WiFi network, and/or the like.

The system 2500 can be used to track multiple targets using distributed sensors in a network by applying the MAP estimation techniques discussed above to the problem of determining a past, present or future position of a mobile object based on received sensor data.

The system 2500 can also be used to recognize patterns such as human behavior. The sensors and sensor networks 2504 can include sensors suitable for detecting and providing observation data representing human activity, the sensors can include acoustic, image and radio frequency (e.g., wireless device) sensors, or the like. The data from the sensors 2504 can be transmitted to the processors 2502, which can be programmed to perform a MAP estimation process on the received data to produce an output result that indicates a recognition, or prediction, of human behavior. This result can be provided to the end user terminals 2514 via the support service server 2512 and the network 2508.

Figure 26:
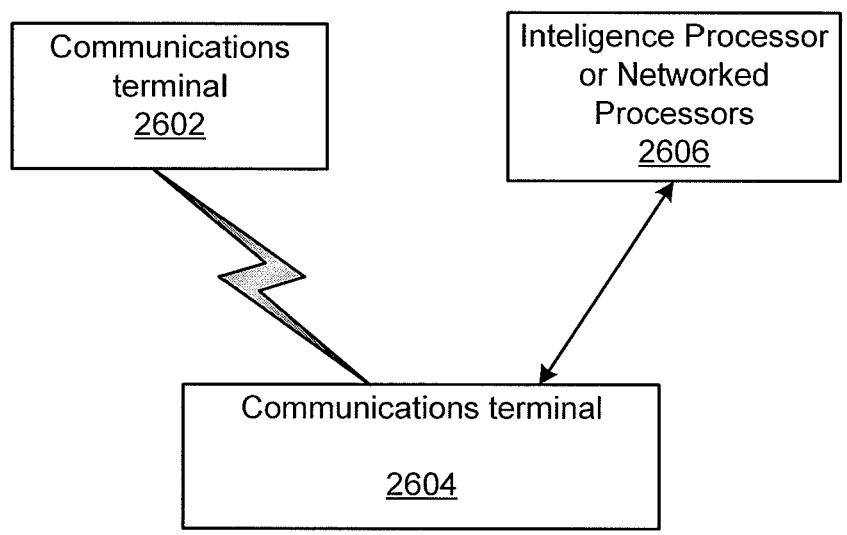
FIG. 26 illustrates a communication process according to embodiments of the disclosed subject matter.

FIG. 26 illustrates a communication process according to embodiments of the disclosed subject matter. In particular, communications terminal 2602 can transmit a signal (or observation data) to communications terminal 2604. The signal can be a noisy signal that may require signal processing in order to restore or recover the original signal values from the noisy received signal, which may have experienced a loss of data during transmission.

The intelligence processors (or networked processors) 2606 can include software instructions that cause one or more processors to perform a signal processing function to recover, decode or restore the received signal. The signal processing function can include decoding using one or more MAP estimation processes described above. For example, communications terminal 2602 may be a space vehicle such as an orbiter that uses turbo codes to encode a radio frequency signal for transmission through space. The signal may experience losses due to the transmission distance and noise sources. Upon reception, the signal can be decoded to correct errors introduced during transmission. Because turbo code decoding includes determining an a posteriori probability of a bit being a one or a zero, the above MAP estimation techniques are suitable for solving a turbo code signal decoding problem.

The intelligence processors (or networked processors) 2502 can be programmed to perform a specific application of the MAP estimation process that is tailored to decoding a turbo code encoded signal. The communications terminal 2604 would pass the encoded signal to the intelligence processors (or networked processors) 2502, which would decode the signal according to the MAP estimation process described above and then return a decoded signal to the communications terminal 2604.

In addition to turbo code decoding, the MAP estimation techniques described above can be used for other communications signal processing functions, such as mobile telephony encoding and/or decoding, terrestrial mobile television, wireless data networks, satellite communications or any other analog or digital communications which may benefit from the decoding of error correcting codes to restore a signal to a likely estimate of its original condition. The communication signal can be a speech signal, which can be processed to provide a speech recognition function.

Figure 27:
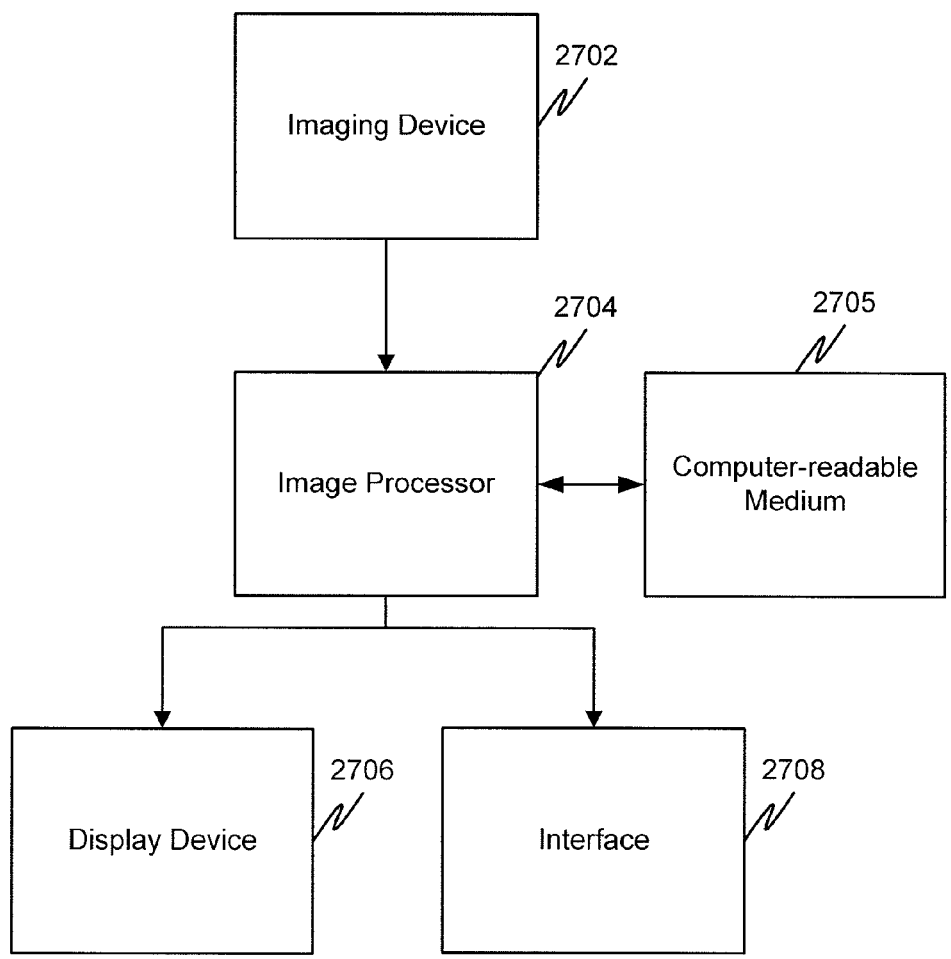
FIG. 27 illustrates an image processing system according to embodiments of the disclosed subject matter.

FIG. 27 illustrates an image processing system according to embodiments of the disclosed subject matter. In particular, a system 2700 includes an imaging device 2702 coupled to an image processor 2704. The image processor 2704 is shown coupled to a storage device 2705, an optional display device 2706 and an optional interface 2708.

In operation, the imaging device 2702 captures, acquires or obtains an image as observation data. For example, the imaging device can be a medical imaging device (such as a video, sonographic or radiographic imaging device) configured to acquire an image of a portion of the human body or other animal body. The imaging device can also be a geological, oceanographic, or meteorological imaging device. The imaging device can also include a video or radiographic imaging device adapted for acquiring images of objects for security scanning. In general, any imaging device capable of producing an image can be used with an embodiment.

Once an image is acquired, the image data can be transmitted to the image processor 2704. The image processor 2704 is programmed to perform one or more MAP estimation processes using software instructions stored in the storage device 2705. The image data can then be processed by the image processor 2704 using one or more of the MAP estimation techniques described above to obtain a desired result. For example, the image data can be processed for machine vision, character recognition, feature recognition, edge detection, object recognition, image reconstruction, or the like.

A result of image processing by the image processor 2704 can be stored in the storage device 2705, provided to the optional display device 2706 and/or to the optional interface 2708 for transmission to another device or system.

Figure 28:
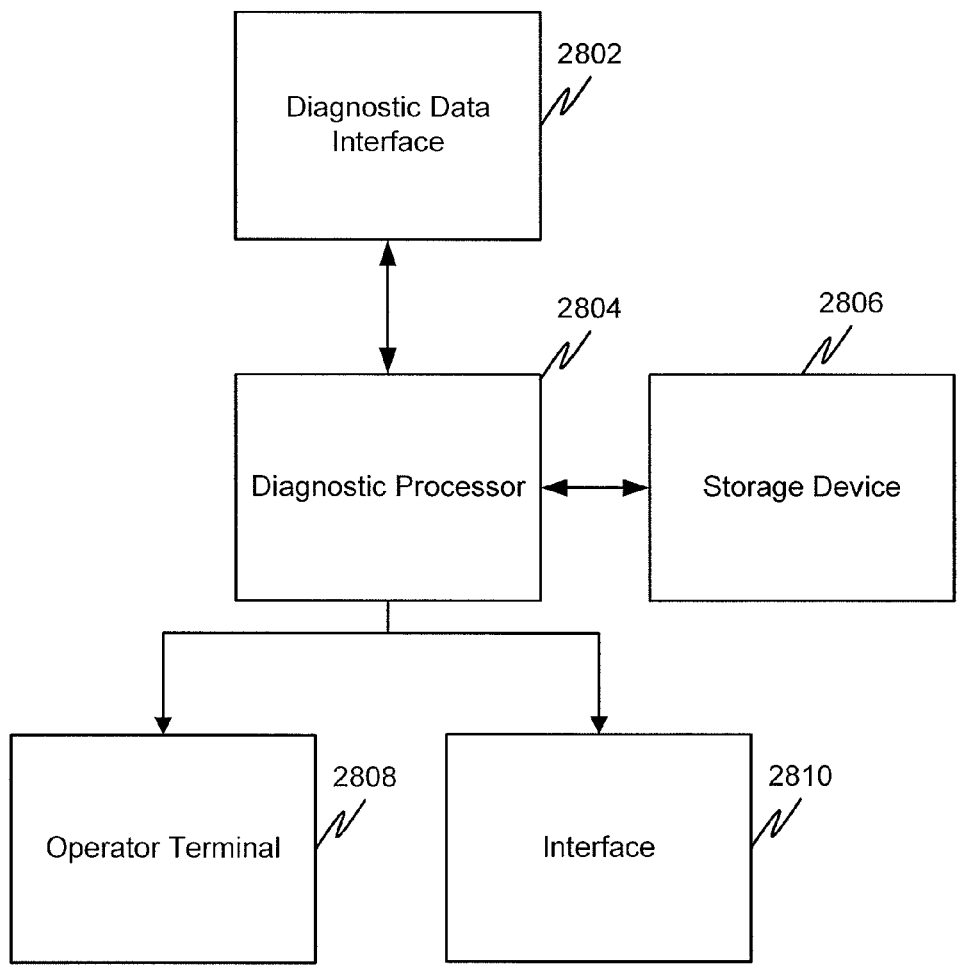
FIG. 28 illustrates diagnostic system according to embodiments of the disclosed subject matter.

FIG. 28 illustrates a diagnostic system according to embodiments of the disclosed subject matter. In particular, a diagnostic system 2800 includes an interface 2802 for receiving diagnostic information (i.e., observation data), a diagnostic processor 2804, a storage device 2806 coupled to the diagnostic processor 2804, an optional operator terminal 2808 and an optional interface 2810.

In operation, the diagnostic processor 2804 receives diagnostic information from the interface 2802. The diagnostic processor is programmed via software instruction stored in the storage device 2806 to receive the diagnostic data, store the diagnostic data in the storage and to process the diagnostic data in order to make an estimated or predicted diagnosis of a system. The system can include an electrical system, a mechanical system or a combination of the two. The system can also be a biological system (e.g., organism) or chemical system or process in which a diagnosis is desired.

The diagnostic processor 2804 can process the received diagnostic data according to one or more of the MAP estimation techniques discussed above to obtain a MAP estimation result. The result can be stored in the storage device 2806, provided to an operator via the optional operator terminal 2808 and/or the result can be provided to another device or system via the optional interface 2810.

The operator terminal 2808 can include a display screen and user input device(s) such as a keyboard, mouse or the like. The interface 2810 can be a wired or wireless network interface or the like.

The diagnostic system 2800 can be incorporated into the system being monitored or diagnosed, such as a vehicle, aircraft, spacecraft or other system.

Figure 29:
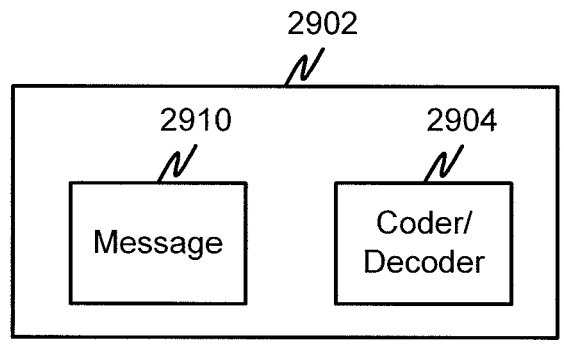
FIG. 29 illustrates a communication encoding/decoding system process according to embodiments of the disclosed subject matter.
Figure 29:
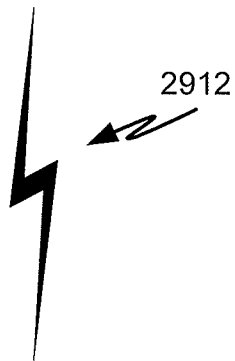
Figure 29:
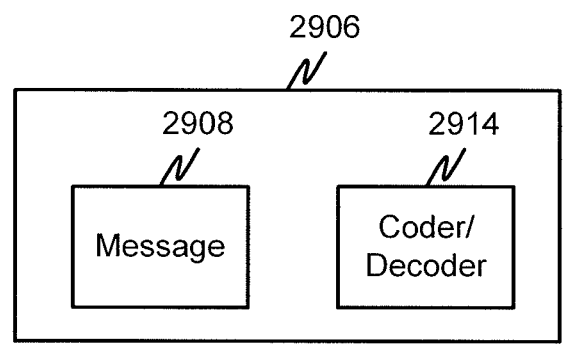

FIG. 29 illustrates a communication coding/decoding system 2900. In particular, the system 2900 includes a first wireless device 2902 having a coder/decoder 2904, and a second wireless device 2906 having a coder/decoder 2908. The coder/decoders (2904 and 2906) can be part of a 4G chipset, for example.

In an operation example, the first wireless device 2902 can be adapted to process a data message 2910 using the coder/decoder 2904 to generate an encoded data message that can be sent wirelessly over a cellular network as a signal 2912 to the second wireless device 2906. The signal 2912 can be a noisy signal that may require signal processing in order to restore or recover the original signal values (e.g., original message 2910) from the noisy received signal, which may have experienced a loss of data during transmission.

The wireless network can be a 4G wireless network, or a network employing an earlier or later developed standard different than 4G. Standard components of a cellular wireless network infrastructure have been omitted from FIG. 29 to simplify the figure for clarity of explanation.

The second wireless device 2906 can be adapted to process (e.g., decode) the received encoded data message using the coder/decoder 2908 in order to generate a decoded message 2914. While wireless devices 2902 and 2906 are shown with both a coder and decoder, it will be appreciated that a wireless device could be configured to include either a coder or a decoder, but not both.

The wireless devices (2902 and 2906) can each include software instructions that cause one or more processors within each respective device to perform a signal processing function to recover, decode or restore the received signal. The signal processing function can include decoding using one or more MAP estimation processes described above. For example, the wireless devices (2902 and 2906) may be 4G terminals operating on a network that uses concatenated codes to encode radio frequency signals for transmission. The signals may experience losses due to transmission distance and noise sources. Upon reception, the signals can be decoded to correct errors introduced during transmission. Because concatenated code decoding can include determining an a posteriori probability of a bit being a one or a zero, the above MAP estimation techniques are suitable for solving a concatenated code signal decoding problem.

The wireless devices (2902 and 2906) can each be programmed to perform a specific application of the MAP estimation process that is tailored to decoding a concatenated code encoded signal. For example, the wireless device 2906 would pass the received encoded signal to the coder/decoder 2908, which would decode the signal according to the MAP estimation process described above and provide a decoded signal to the wireless device 2902.

In addition to concatenated code decoding, the MAP estimation techniques described above can be used for other communications signal processing functions, such as mobile telephony encoding and/or decoding, terrestrial mobile television, wireless data networks, satellite communications or any other analog or digital communications which may benefit from the decoding of error correcting codes to restore a signal to a likely estimate of its original condition.

Types of mobile telephony codes capable of being processed by an embodiment include: AN codes; BCH code; constant-weight code; convolutional code; Forney codes; group codes; Golay codes (e.g., binary Golay code); Goppa code (as used in the McEliece cryptosystem); Hadamard code; Hagelbarger code; Hamming code; Latin square based code for non-white noise; lexicographic code; Long code; low-density parity-check code (also known as Gallager code); LT code; Fountain code; m of n codes; online code; raptor code; Reed-Solomon error correction; Reed-Muller code; repeat-accumulate code; repetition codes, such as Triple modular redundancy; tornado code; turbo code; Walsh-Hadamard code, and/or the like.

The wireless devices (2902 and 2906) can include smartphones (e.g., Droid phones, iPhones, Blackberry devices, Palm devices and the like), feature phones, wireless equipped laptop computers (or other wireless computing devices), tablet devices (e.g., iPad and the like), portable wireless book readers (e.g., Amazon Kindle, Barnes & Noble Nook, and the like), portable wireless media players (e.g., iPod, iTouch, mp3 players, and the like). The wireless devices 2902 and 2906 can also be a wireless base station (e.g., a base transceiver, mobile switching center, repeater, or the like).

Figure 30:
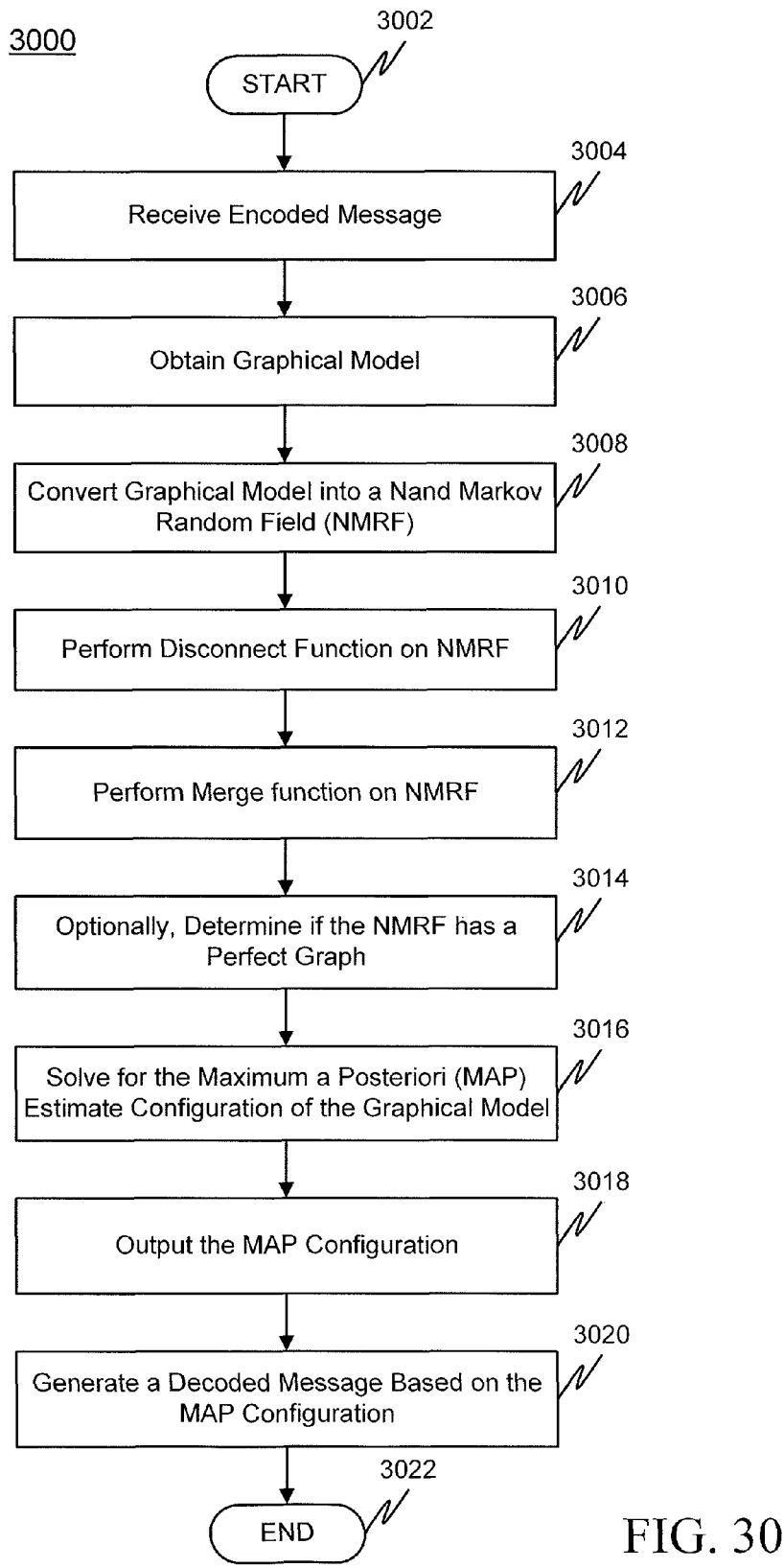
FIG. 30 is a chart showing a method for MAP estimation of a graphical model representing an encoded data message, according to some embodiments of the disclosed subject matter.

FIG. 30 is a chart showing a method 3000 for MAP estimation of a graphical model representing an encoded data message. Processing begins at 3002 and continues to 3004.

At 3004, an encoded data message is received. The message can be received, for example, from a cellular wireless network using the 4G standard. Processing continues to 3006.

At 3006, a graphical model of the received data message is obtained. Processing continues to 3008.

At 3008, the graphical model is converted into a nand Markov random field (NMRF) or a pre-existing NMRF can be retrieved from storage. Processing continues to 3010.

At 3010, the NMRF is pruned by first applying the disconnect function and then, at 3012, by applying the merge function (as discussed above). Processing continues to 3014.

At 3014, it is determined whether the NMRF has a perfect graph structure. This determination can be accomplished using linear programming or through the use of the Berge algorithm, which determines if the graph is a Berge graph. Processing continues to 3016.

At 3016, if it has been determined that the graph has a perfect graph structure, the NMRF is solved for a MAP estimate configuration. Processing continues to 3018.

At 3018, the MAP configuration is output. The output can be in the form of an electronic transmission to another system or other electronic signal. Processing continues to 3020.

At 3020, a decoded message is generated based on the MAP configuration. Processing continues to 3022, where processing ends.

It will be appreciated that 3004-3020 can be repeated in whole or in part in order to accomplish a contemplated wireless message decoding task using a MAP estimate.

It will be appreciated that the techniques described herein can also be applied to the problem of encoding a data message.

While some examples have been described above in terms of a bipartite matching problem, it will be appreciated that similar techniques can be applied to unipartite matching problems as well.

According to embodiments, the disclosed subject matter includes a system for maximum a posteriori (MAP) estimation of a graphical model. The system has a computer-readable medium, a MAP estimation processor coupled to the computer-readable medium, and a communication interface coupled to the MAP estimation processor. The processor receives and transmits electronic representations of graphical models to and from the MAP estimation processor, respectively. The computer-readable medium stores software instructions that, when executed by the MAP estimation processor, implements the following process: (1) obtaining, at the MAP estimation processor, an electronic representation of a graphical model via the communication interface; (2) converting the graphical model into a nand Markov random field (NMRF); (3) computing a MAP estimate configuration of the NMRF; and (4) outputting the MAP estimate configuration.

In the above embodiment, the NMRF may have minimal configuration nodes and the operation further include pruning the NMRF minimal configuration nodes prior to the determining. The NMRF may have nodes and the operations may further include merging pairs of nodes having a same connectivity in the NMRF after the pruning and prior to the determining. The determining may include determining whether the NMRF is a Berge graph and the process may include an operation that is responsive to the determining operation of generating a computer readable indicator indicating that an exact MAP estimate can be generated and performing further computations responsively to the indicator.

In the above embodiment, the determining may include using linear programming to determine whether the NMRF has a perfect graph structure. In response to this determination, a computer readable indicator may be set which indicates an exact MAP estimate result can be generated. Conditioned on this outcome, the further operations in may be performed in response to the indicator. The further operations may be to solve for an optimum of the NMRF such as a MAP estimate.

The computing can employ belief propagation which further includes passing messages between connected nodes of the NMRF. Alternatively linear programming or other method may be implemented.

Where belief propagation is employed, in certain cases, independent scalars are passed from a first node to each of one or more neighbor nodes of the first node where the two scalars are nontrivial and each is determined using respective non-identical maximum functions.

The disclosed subject matter includes methods, systems, devices, and nontransitory computer readable media storing methods based on the above.

According to embodiments, the disclosed subject matter also includes a system for estimating one or more configurations from observation data. The system includes one or more processors, an interface configured to receive observation data, and a data store storing a nand Markov random field (NMRF) network representing the value of output configurations conditioned on the observation data. The data store further contains a procedure for deriving at least one a posteriori estimation from the observation data, and the data store further storing a procedure for outputting a signal indicating the at least one a posteriori estimation. For an example application, the observation data may be a noisy signal delivered over a communications channel and the at least one a posteriori estimation may include a maximum a posteriori (MAP) estimation indicating disambiguated information content of the noisy signal. Many other applications can be envisaged based on the present disclosure. For example the observation data may include interaction energies of amino acids that can form a protein and the at least one a posteriori estimation may include a minimum energy conformation of the amino acids. For another example, the observation data may include image data and the at least one a posteriori estimation may include at least one feature of the image data. For yet another example, the observation data may be encrypted data and the at least one a posteriori estimation may indicate decrypted data contained within the encrypted data. And yet another application is one in which the observation data is lossy data delivered over a communications channel and the at least one a posteriori estimation includes a maximum a posteriori estimation indicating recovered information content of the lossy data. Or the observation data may include video data and the at least one a posteriori estimation may include at least one feature of the video data. And the observation data may include data representing observations of human activity and the at least one a posteriori estimation may include at least one feature of the human activity.

In any of the systems, the procedure for deriving includes a message passing process and the NMRF may include a perfect graph. The message passing function may include passing independent scalars from a first node to each of one or more neighbor nodes of the first node, the two scalars being nontrivial and each being determined using respective non-identical maximum functions.

Embodiments of the disclosed subject matter include a computer implemented method for maximum a posteriori (MAP) estimation of a graphical model, the method comprising. The method includes obtaining, at a MAP estimation processor, an electronic representation of a graphical model via a communication interface; converting, using the MAP estimation processor, the graphical model into an electronic representation of a nand Markov random field (NMRF); computing, using the MAP estimation processor, a MAP estimate configuration of the NMRF; outputting the MAP estimate configuration from the MAP estimation processor to an outside of the using the MAP estimation processor using the communication interface; computing at least one representation of an object feature from the MAP estimate configuration and storing the representation on a computer readable-medium; and generating an output indicator of a MAP configuration estimate and an indicator of a completion of the MAP estimation.

The method may include determining, using the MAP estimation processor, the computing a MAP estimate configuration of the NMRF by the MAP estimation processor being done responsively to whether the NMRF has a perfect graph structure. The NMRF may have minimal configuration nodes and the operation further include pruning the NMRF minimal configuration nodes prior to the determining. The NMRF may have nodes and the operations may further include merging pairs of nodes having a same connectivity in the NMRF after the pruning and prior to the determining. The determining may includes determining whether the NMRF is a Berge graph and, responsive to the determining, generating a computer readable indicator indicating that an exact MAP estimate can be generated; performing further computations responsively to the indicator. The determining may include using linear programming to determine whether the NMRF has a perfect graph structure and, responsive to the determining, setting a computer readable indicator indicating an exact MAP estimate result can be generated; performing further computer operations in response to the indicator. The computing may include a belief propagation method implementation which further includes passing messages between connected nodes of the NMRF. The computing may alternatively employ linear programming.

The MAP estimate computation may involve performing a message passing function according to digitally stored software instructions in which the message passing function includes passing independent scalars from a first node to each of one or more neighbor nodes of the first node, the two scalars being nontrivial and each being determined using respective non-identical maximum functions.

Embodiments of the disclosed subject matter include a computer-readable storage medium with instructions for the above-recited methods and systems.

The MAP estimation processor of any of the above systems may include multiple processors connected over a network and the computing includes passing messages over the network effective to distribute the computing over the multiple processors. Any of the methods or systems may include (perform) belief propagation.

The one or more processors of any of the above systems may include multiple processors connected over a network and the deriving includes passing messages over the network effective to distribute the computations in the deriving over the multiple processors.

Embodiments of the disclosed subject matter include an estimation computer system. The system has a plurality of processors each coupled to the others via a communication link. The system also has a storage device coupled to each of the processors and adapted to store software instructions, graphical model data and belief propagation message data. The software instructions are such that, when executed by the processors, cause each processor to perform predefined operations. The operations include receiving observation data represented as first graphical model data; storing the first graphical model data in the storage device; and converting the first graphical model data to second graphical model data including a nand Markov random field (NMRF) network representing output configuration values of the second graphical model conditioned on observed data. The operations further include storing the second graphical model data in the storage device; computing the NMRF network using a maximum weight independent set solver to produce converged solution data based on the second graphical model; converting the converged solution data to converted solution data based on the first graphical model; and outputting the converted solution data.

The computing with the maximum weight independent set solver may include computing using a belief propagation message passing network in which each of the processors corresponds to at least one node in belief propagation message passing network and the operations further include retrieving and processing two scalar values from each message received by a processor in the belief propagation message passing network. Alternatively, the computing with the maximum weight independent set solver may include computing using linear programming. The computing with the maximum weight independent set solver may include computing using semidefinite programming of a Lovasz theta function.

Embodiments of the disclosed subject matter include, an estimation system with a processor and a storage device coupled to the processor. The storage device has stored therein a nand Markov random field (NMRF) graphical model data structure. The NMRF data structure is generated by converting a data model incorporating conditional independencies to a larger state space such that the NMRF is a perfect graph. The processor receives the NMRF and observation data and computes a maximum a posteriori (MAP) estimate responsively to the NMRF and the observation data. The processor also is configured to output the MAP estimate.

According to some embodiments, the processor can be further configured to convert the MAP estimate to a signal indicating an information content of a digital communication signal, where the observation data includes a received digital communication signal. The processor may be further configured to convert the MAP estimate to a graphical image feature, where the observation data includes an input image. The graphical image feature may be one of a foreground and background image separated from the other of the foreground and background image.

Also, according to some embodiments, the processor can be further configured to convert the MAP estimate to a feature vector indicating an inferred state of a physical system, where the observation data includes data received from a sensor network. The processor may be further configured to convert the MAP estimate to a signal indicating an information content of a noisy physical signal, where the observation data includes the received noisy physical signal. The processor may be further configured to convert the MAP estimate to a signal indicating symbols, where the observation data is a representation of the symbols. The symbols may be words or letters and the representations are images of text. The processor may be further configured to convert the MAP estimate to an alarm indicator indicating a condition of a physical system, where the observation data includes data received from at least one of sensors and data terminals remote from the processor.

According to embodiments, the disclosed subject matter includes an information gathering and event prediction system comprising: one or more processors coupled via a network, processor coupled over a network and programmed to perform a maximum a posteriori configuration estimation function responsively to received sensor data and a nand Markov Random Field (NMRF) by passing messages over the network. The system may also include one or more sensors coupled to the network and adapted to provide sensor data to the processors; one or more reporting terminals coupled via the network and adapted to receive information from the one or more processors. In this embodiment, the NMRF may be a perfect graph.

According to embodiments, the disclosed subject matter includes an image processing system. The system has an image processor and an imaging device coupled to the image processor. The imaging device is adapted to acquire an image of an object and transmit the image to the image processor. The system further includes a storage coupled to the image processor and adapted to store program code and data for access by the image processor. The image processor is programmed to perform image processing by generating a nand Markov random field (NMRF) representation of a graphical model of an input image responsively to the image data form the image processor and to compute a maximum a posteriori (MAP) configuration estimate of the NMRF. The MAP configuration estimate is generated by performing, at the processor, a belief propagation message passing operation including passing messages between nodes of the NMRF. The message passing operation may include passing messages in which each one or two messages contains two nontrivial independent scalar values.

The disclosed subject matter includes a diagnostic system with a diagnostic data interface for receiving diagnostic data from a system being monitored; a diagnostic processor coupled to the diagnostic data interface and adapted to receive the diagnostic data and to process the diagnostic data according to a maximum a posteriori (MAP) estimate module; a storage device coupled to the diagnostic processor and adapted to store program code, diagnostic data and result data; and an interface coupled to the diagnostic computer and adapted to transfer data between the diagnostic processor and an external system. The MAP estimate module may include software instructions stored in the storage device. The software instructions, when executed by the diagnostic processor, cause the diagnostic processor to perform a MAP estimate operations on received diagnostic data. The operations include: receiving observed diagnostic data at the diagnostic processor and responsively to the diagnostic data, computing nand Markov random field (NMRF) network representing values of output configurations conditioned on observed diagnostic data; determining whether the NMRF has a perfect graph structure; if the second graphical model has a perfect graph, deriving at least one a posteriori (MAP) estimation result from the observed diagnostic data using belief propagation message passing in which each message passed between nodes of the NMRF network include two nontrivial scalar values; and deriving a diagnostic feature from the MAP estimate and outputting the diagnostic feature. The system may further include an operator terminal, wherein the diagnostic feature is displayed on the operator terminal.

The disclosed subject matter also includes a method for processing a received communication signal. The method includes receiving, at a radio frequency receiver, an input signal including an encoded data message, the input signal being subject to having data errors introduced during transmission. The method further includes obtaining a nand Markov random field (NMRF) having a perfect graph structure using a signal processor programmed to decode data messages with a maximum a posteriori (MAP) configuration estimating function. The method further includes combining the encoded data message with the NMRF using the signal processor to obtain a modified NMRF; computing the modified NMRF, using the signal processor, to obtain a MAP estimate configuration of the NMRF; and generating decoded data from the encoded data message using the MAP estimate configuration of the NMRF. The obtaining the NMRF may include retrieving a previously generated NMRF from a data storage device. The method may further include adjusting weight values for the NMRF based on the received encoded data message. The method may also include altering connectivity of the NMRF based on the received encoded data message. The obtaining the NMRF may include generating an NMRF based on an encoding scheme used to encode the received encoded data message. The computing the modified NMRF may include using the signal processor programmed to perform a linear programming function. The computing the modified NMRF may include using the signal processor programmed to perform a semidefinite programming of a Lovasz theta function. The computing the modified NMRF may include using the signal processor programmed to perform convergent message passing. The convergent message passing may include passing messages in a unipartite belief propagation network. The convergent message passing may include passing messages in a bipartite belief propagation network.

The embodiments of the disclosed subject matter include a method of processing observation data, the method comprising: acquiring observation data from a sensor coupled to a processor, where the sensors are configured to detect properties of one or more external objects; obtaining a nand Markov random field (NMRF) at the processor, the NMRF having a perfect graph structure; combining, using the processor, the observation data with the NMRF; determining a maximum a posteriori (MAP) configuration estimate of the NMRF by performing, using the processor, one of a linear programming function and a belief propagation message passing function including passing messages between nodes of the NMRF, each message having one or more nontrivial scalar values; and generating an output feature vector from the MAP configuration estimate and outputting the output feature vector on a display.

The obtaining the NMRF may includes retrieving a previously generated NMRF from a data storage device. The method may include adjusting weight values for the NMRF based on the acquired observation data. The method may include altering connectivity of the NMRF based on the acquired observation data. The belief propagation message passing function may include passing messages in a unipartite belief propagation network. The belief propagation message passing function may include passing messages in a bipartite belief propagation network.

Embodiments of the method, system, computer program product and computer readable media for maximum a posteriori estimation of graphical models, may be implemented on one or more general-purpose computers, one or more special-purpose computers, a programmed microprocessor or microcontroller and peripheral integrated circuit element, an ASIC or other integrated circuit, a digital signal processor, a hardwired electronic or logic circuit such as a discrete element circuit, a programmed logic device such as a PLD, PLA, FPGA, PAL, or the like. In general, any device or process capable of implementing the functions or processes described herein can be used to implement embodiments of the method, system, computer program product or computer readable media for maximum a posteriori estimation of graphical models.

Furthermore, embodiments of the disclosed method, software, and computer program product (or computer readable media) for maximum a posteriori estimation of graphical models may be readily implemented, fully or partially, in software using, for example, object or object-oriented software development environments that provide portable source code that can be used on a variety of computer platforms. Alternatively, embodiments of the disclosed method for maximum a posteriori estimation of graphical models can be implemented partially or fully in hardware using, for example, standard logic circuits or a VLSI design. Other hardware or software can be used to implement embodiments depending on the speed and/or efficiency requirements of the systems, the particular function, and/or a particular software or hardware system, microprocessor, or microcomputer system being utilized. Embodiments of the method, system, computer program product and computer readable media for maximum a posteriori estimation of graphical models can be implemented in hardware and/or software using any known or later developed systems or structures, devices and/or software by those of ordinary skill in the applicable art from the functional description provided herein and with a general basic knowledge of the computer arts.

Moreover, embodiments of the disclosed method for maximum a posteriori estimation of graphical models can be implemented in software stored on computer readable media (or provided as a computer program product) and adapted to be executed on a programmed general-purpose computer, a special purpose computer, a microprocessor, or the like. Also, maximum a posteriori estimation of graphical models method of this disclosed subject matter can be implemented as a program embedded on a personal computer such as a JAVA® or CGI script, as a resource residing on a server or graphics workstation, as a routine embedded in a dedicated processing system, or the like. The method and system can also be implemented by physically incorporating the method for maximum a posteriori estimation of graphical models into a software and/or hardware system, such as the hardware and software systems of a search engine, ecommerce platform, online auction, online dating, resource allocation, image processing system, or encoding/decoding system.

It should be appreciated that graph nodes in both the bipartite and unipartite matching process can be associated with any object, article, events, things, processes, or persons and/or data representation one or more of them represented as any form of data structure or vector. The weight (e.g., compatibility score) between nodes may be any function of their corresponding attributes, including but not limited to any distance function, generalized divergence function, generalized inner product, similarity function or kernel function between the pair of objects, data structures or vectors. For example, the nodes in a unipartite matching may correspond to vectors in Euclidean space and the distance may correspond to the Euclidean distance. Note also that, instead of ads and phrases or people in a social network, any dataset of n objects, such as n vectors or n data structures may for a basis for a graph of n nodes and a matrix of size n by n. Thus, the b-matching methods described herein may be applied in settings such as in image processing or in general analytics such as classification problems.

It is, therefore, apparent that there is provided in accordance with the presently disclosed subject matter, a method, system, a computer program product and a computer readable media with software for maximum a posteriori estimation of graphical models. While this disclosed subject matter has been described in conjunction with a number of embodiments, it is evident that many alternatives, modifications and variations would be or are apparent to those of ordinary skill in the applicable arts. Accordingly, applicants intend to embrace all such alternatives, modifications, equivalents and variations that are within the spirit and scope of disclosed subject matter.

What is claimed is:

1. A system for decoding an encoded data message, the system comprising:
   a processor;
   an interface coupled to the processor and configured to receive the encoded data message; and
   a data store coupled to the processor and storing a nand Markov random field (NMRF) network representing the value of output configurations conditioned on the encoded data message,
   the data store further storing a procedure for deriving at least one a posteriori estimation from the encoded data message, and
   the data store further storing a procedure for outputting a decoded data message based on the at least one a posteriori estimation.

2. The system of claim 1, wherein the encoded data message is a noisy signal delivered over a cellular wireless network communications channel and the at least one a posteriori estimation includes a maximum a posteriori (MAP) estimation indicating disambiguated information content of the noisy signal.

3. The system of claim 2, wherein the cellular wireless network is a 4G network.

4. The system of claim 1, wherein the encoded data message is lossy data delivered over a cellular wireless network communications channel and the at least one a posteriori estimation includes a maximum a posteriori estimation indicating recovered information content of the lossy data.

5. The system of claim 4, wherein the processor is a portion of a 4G chipset.

6. The system of claim 1, wherein the encoded data message is encoded with a concatenated code and the procedures for deriving and for outputting are both adapted to produce a decoded concatenated code data message.

7. The system of claim 1, wherein the deriving at least one a posteriori estimation includes a message passing function and the NMRF includes a perfect graph.

8. The system of claim 7, wherein the message passing function includes passing independent scalars from a first node to each of one or more neighbor nodes of the first node, the two scalars being nontrivial and each being determined using respective non-identical maximum functions.

* * * * *